United States Patent
Smith et al.

(10) Patent No.: US 12,541,280 B2
(45) Date of Patent: Feb. 3, 2026

(54) SYSTEM AND METHOD OF THREE-DIMENSIONAL PLACEMENT AND REFINEMENT IN MULTI-USER COMMUNICATION SESSIONS

(71) Applicant: Apple Inc., Cupertino, CA (US)

(72) Inventors: Connor A. Smith, Sunnyvale, CA (US); Benjamin H. Boesel, Cornelius, NC (US); David H. Huang, San Mateo, CA (US); Jeffrey S. Norris, Saratoga, CA (US); Jonathan Perron, Felton, CA (US); Jordan A. Cazamias, Conroe, TX (US); Miao Ren, Sunnyvale, CA (US); Shih-Sang Chiu, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 252 days.

(21) Appl. No.: 18/174,403

(22) Filed: Feb. 24, 2023

(65) Prior Publication Data

US 2023/0273706 A1    Aug. 31, 2023

Related U.S. Application Data

(60) Provisional application No. 63/268,692, filed on Feb. 28, 2022.

(51) Int. Cl.
*G06F 3/04815* (2022.01)
*G06T 9/00* (2006.01)
(Continued)

(52) U.S. Cl.
CPC ........ *G06F 3/04815* (2013.01); *G06T 19/006* (2013.01); *G06T 19/20* (2013.01);
(Continued)

(58) Field of Classification Search
CPC ... G06F 3/04815; G06T 19/006; G06T 19/20; G06T 2219/024; G06T 2219/2004;
(Continued)

(56) References Cited

U.S. PATENT DOCUMENTS

| 1,173,824 A | 2/1916 | Mckee |
| 5,015,188 A | 5/1991 | Pellosie et al. |

(Continued)

FOREIGN PATENT DOCUMENTS

| AU | 2022348895 A1 | 4/2024 |
| CA | 3033344 A1 | 2/2018 |

(Continued)

OTHER PUBLICATIONS

AquaSnap Window Manager: dock, snap, tile, organize [online], Nurgo Software, Available online at: <https://www.nurgo-software.com/products/aquasnap>, [retrieved on Jun. 27, 2023], 5 pages.

(Continued)

*Primary Examiner* — Michael Le
(74) *Attorney, Agent, or Firm* — Kubota & Basol LLP

(57) ABSTRACT

Some examples of the disclosure are directed to methods for spatial placement of avatars in a communication session. In some examples, while a first electronic device is presenting a three-dimensional environment, the first electronic device may receive an input corresponding to a request to enter a communication session with a second electronic device. In some examples, in response to receiving the input, the first electronic device may scan an environment surrounding the first electronic device. In some examples, the first electronic device may identify a placement location in the three-dimensional environment at which to display a virtual object representing a user of the second electronic device. In some examples, the first electronic device displays the virtual object representing the user of the second electronic device (Continued)

at the placement location in the three-dimensional environment. Some examples of the disclosure are directed to methods for spatial refinement in the communication session.

20 Claims, 29 Drawing Sheets

(51) Int. Cl.
    *G06T 19/00*            (2011.01)
    *G06T 19/20*            (2011.01)
    *G06V 20/20*            (2022.01)
    *H04L 65/1093*       (2022.01)

(52) U.S. Cl.
    CPC .......... *G06V 20/20* (2022.01); *H04L 65/1093* (2013.01); *G06T 2219/024* (2013.01); *G06T 2219/2004* (2013.01)

(58) Field of Classification Search
    CPC ... G06V 20/20; H04L 65/1093; A63F 13/212; A63F 13/213; A63F 13/25; A63F 13/35; A63F 13/428; A63F 13/5255; A63F 13/53; A63F 13/655; A63F 13/211
    See application file for complete search history.

(56) References Cited

U.S. PATENT DOCUMENTS

| | | |
|---|---|---|
| 5,422,812 A | 6/1995 | Knoll et al. |
| 5,515,488 A | 5/1996 | Hoppe et al. |
| 5,524,195 A | 6/1996 | Clanton et al. |
| 5,610,828 A | 3/1997 | Kodosky et al. |
| 5,731,805 A | 3/1998 | Tognazzini et al. |
| 5,737,553 A | 4/1998 | Bartok |
| 5,740,440 A | 4/1998 | West |
| 5,751,287 A | 5/1998 | Hahn et al. |
| 5,758,122 A | 5/1998 | Corda et al. |
| 5,794,178 A | 8/1998 | Caid et al. |
| 5,809,267 A | 9/1998 | Moran et al. |
| 5,877,766 A | 3/1999 | Bates et al. |
| 5,900,849 A | 5/1999 | Gallery |
| 5,933,143 A | 8/1999 | Kobayashi |
| 5,990,886 A | 11/1999 | Serdy et al. |
| 6,061,060 A | 5/2000 | Berry et al. |
| 6,108,004 A | 8/2000 | Medl |
| 6,112,015 A | 8/2000 | Planas et al. |
| 6,154,559 A | 11/2000 | Beardsley |
| 6,167,433 A | 12/2000 | Maples et al. |
| 6,295,069 B1 | 9/2001 | Shirur |
| 6,426,745 B1 | 7/2002 | Isaacs et al. |
| 6,456,296 B1 | 9/2002 | Cataudella et al. |
| 6,584,465 B1 | 6/2003 | Zhu et al. |
| 6,714,201 B1 | 3/2004 | Grinstein et al. |
| 6,750,873 B1 | 6/2004 | Bernardini et al. |
| 6,756,997 B1 | 6/2004 | Ward et al. |
| 6,968,511 B1 | 11/2005 | Robertson et al. |
| 7,035,903 B1 | 4/2006 | Baldonado |
| 7,096,120 B2 | 8/2006 | Hull |
| 7,137,074 B1 | 11/2006 | Newton et al. |
| 7,230,629 B2 | 6/2007 | Reynolds et al. |
| 7,298,370 B1 | 11/2007 | Middler et al. |
| 7,580,576 B2 | 8/2009 | Wang et al. |
| 7,634,718 B2 | 12/2009 | Nakajima |
| 7,706,579 B2 | 4/2010 | Oijer |
| 7,721,226 B2 | 5/2010 | Barabe et al. |
| 8,122,341 B1 | 2/2012 | Dayan et al. |
| 8,436,872 B2 | 5/2013 | Wright et al. |
| 8,593,558 B2 | 11/2013 | Gardiner et al. |
| 8,730,156 B2 | 5/2014 | Weising et al. |
| 8,767,045 B2 | 7/2014 | Kitazato et al. |
| 8,793,620 B2 | 7/2014 | Stafford |
| 8,803,873 B2 | 8/2014 | Yoo et al. |
| 8,805,690 B1 | 8/2014 | Lebeau et al. |
| 8,866,880 B2 | 10/2014 | Tan et al. |
| 8,896,632 B2 | 11/2014 | Macdougall et al. |
| 8,947,323 B1 | 2/2015 | Raffle et al. |
| 8,970,478 B2 | 3/2015 | Johansson |
| 8,970,629 B2 | 3/2015 | Kim et al. |
| 8,994,718 B2 | 3/2015 | Latta et al. |
| 9,007,301 B1 | 4/2015 | Raffle et al. |
| 9,108,109 B2 | 8/2015 | Pare et al. |
| 9,158,115 B1 | 10/2015 | Worley et al. |
| 9,164,975 B2 | 10/2015 | Milewski et al. |
| 9,183,672 B1 | 11/2015 | Hickman et al. |
| 9,185,062 B1 | 11/2015 | Yang et al. |
| 9,196,072 B2 | 11/2015 | Oh et al. |
| 9,201,500 B2 | 12/2015 | Srinivasan et al. |
| 9,214,137 B2 | 12/2015 | Bala et al. |
| 9,222,787 B2 | 12/2015 | Blumenberg et al. |
| 9,230,368 B2 | 1/2016 | Keane et al. |
| 9,237,334 B2 | 1/2016 | Cheng et al. |
| 9,241,149 B2 | 1/2016 | Redmann |
| 9,245,388 B2 | 1/2016 | Poulos et al. |
| 9,256,785 B2 | 2/2016 | Qvarfordt |
| 9,293,118 B2 | 3/2016 | Matsui |
| 9,294,757 B1 | 3/2016 | Lewis et al. |
| 9,298,334 B1 | 3/2016 | Zimmerman et al. |
| 9,383,189 B2 | 7/2016 | Bridges et al. |
| 9,384,594 B2 | 7/2016 | Maciocci et al. |
| 9,396,580 B1 | 7/2016 | Nowrouzezahrai et al. |
| 9,400,559 B2 | 7/2016 | Latta et al. |
| 9,426,193 B2 | 8/2016 | Goodman |
| 9,436,357 B2 | 9/2016 | Pallakoff et al. |
| 9,437,047 B2 | 9/2016 | Chang et al. |
| 9,448,635 B2 | 9/2016 | Macdougall et al. |
| 9,448,687 B1 | 9/2016 | Mckenzie et al. |
| 9,465,479 B2 | 10/2016 | Cho et al. |
| 9,491,374 B1 | 11/2016 | Avrahami et al. |
| 9,519,371 B2 | 12/2016 | Nishida |
| 9,526,127 B1 | 12/2016 | Taubman et al. |
| 9,544,257 B2 | 1/2017 | Ogundokun et al. |
| 9,563,331 B2 | 2/2017 | Poulos et al. |
| 9,575,559 B2 | 2/2017 | Andrysco |
| 9,588,651 B1 | 3/2017 | Buchanan et al. |
| 9,612,722 B2 | 4/2017 | Miller et al. |
| 9,619,105 B1 | 4/2017 | Dal Mutto |
| 9,681,112 B2 | 6/2017 | Son |
| 9,684,372 B2 | 6/2017 | Xun et al. |
| 9,704,230 B2 | 7/2017 | Hofmann et al. |
| 9,734,402 B2 | 8/2017 | Jang et al. |
| 9,778,814 B2 | 10/2017 | Ambrus et al. |
| 9,779,512 B2 | 10/2017 | Tomlin et al. |
| 9,851,866 B2 | 12/2017 | Goossens et al. |
| 9,870,130 B2 | 1/2018 | Schubert et al. |
| 9,886,087 B1 | 2/2018 | Wald et al. |
| 9,911,232 B2 | 3/2018 | Shapira et al. |
| 9,933,833 B2 | 4/2018 | Tu et al. |
| 9,934,614 B2 | 4/2018 | Ramsby et al. |
| 9,952,042 B2 | 4/2018 | Abovitz et al. |
| 10,026,209 B1 | 7/2018 | Dagley et al. |
| 10,049,460 B2 | 8/2018 | Romano et al. |
| 10,101,803 B2 | 10/2018 | Faaborg et al. |
| 10,139,985 B2 | 11/2018 | Mildrew et al. |
| 10,163,198 B2 | 12/2018 | Rochford et al. |
| 10,175,483 B2 | 1/2019 | Salter et al. |
| 10,186,086 B2 | 1/2019 | Giraldi et al. |
| 10,192,347 B2 | 1/2019 | Bui et al. |
| 10,203,764 B2 | 2/2019 | Katz et al. |
| 10,210,664 B1 | 2/2019 | Chaturvedi |
| 10,303,427 B2 | 5/2019 | Shintani et al. |
| 10,307,671 B2 | 6/2019 | Barney et al. |
| 10,318,034 B1 | 6/2019 | Hauenstein et al. |
| 10,331,205 B2 | 6/2019 | Kim et al. |
| 10,339,721 B1 | 7/2019 | Dascola et al. |
| 10,353,532 B1 | 7/2019 | Holz et al. |
| 10,373,381 B2 | 8/2019 | Nuernberger et al. |
| 10,394,320 B2 | 8/2019 | George-svahn et al. |
| 10,401,958 B2 | 9/2019 | Peana et al. |
| 10,402,081 B1 | 9/2019 | Andersen et al. |
| 10,424,124 B2 | 9/2019 | Takahashi |
| 10,431,216 B1 | 10/2019 | Lemon et al. |

(56) References Cited

U.S. PATENT DOCUMENTS

| | | |
|---|---|---|
| 10,448,189 B2 | 10/2019 | Link |
| 10,484,641 B2 | 11/2019 | Zhou et al. |
| 10,488,941 B2 | 11/2019 | Lam et al. |
| 10,499,044 B1 | 12/2019 | Giokaris et al. |
| 10,530,731 B1 | 1/2020 | Wu et al. |
| 10,534,439 B2 | 1/2020 | Raffa et al. |
| 10,540,005 B2 | 1/2020 | Yoon et al. |
| 10,545,584 B2 | 1/2020 | Tome et al. |
| 10,564,714 B2 | 2/2020 | Marggraff et al. |
| 10,565,761 B2 | 2/2020 | Deluca et al. |
| 10,573,067 B1 | 2/2020 | Naik et al. |
| 10,599,570 B1 | 3/2020 | Ding et al. |
| 10,630,803 B2 | 4/2020 | Hwang et al. |
| 10,642,368 B2 | 5/2020 | Chen |
| 10,645,332 B2 | 5/2020 | Zhang |
| 10,664,043 B2 | 5/2020 | Ikuta et al. |
| 10,664,048 B2 | 5/2020 | Cieplinski et al. |
| 10,664,050 B2 | 5/2020 | Alcaide et al. |
| 10,671,241 B1 | 6/2020 | Jia et al. |
| 10,671,243 B2 | 6/2020 | Ryu et al. |
| 10,691,216 B2 | 6/2020 | Geisner et al. |
| 10,698,562 B1 | 6/2020 | Zhou et al. |
| 10,699,488 B1 | 6/2020 | Terrano |
| 10,701,661 B1 | 6/2020 | Coelho et al. |
| 10,708,965 B1 | 7/2020 | Subramanian et al. |
| 10,712,900 B2 | 7/2020 | Osman et al. |
| 10,732,721 B1 | 8/2020 | Clements |
| 10,754,434 B2 | 8/2020 | Hall et al. |
| 10,762,716 B1 | 9/2020 | Paul et al. |
| 10,768,421 B1 | 9/2020 | Rosenberg et al. |
| 10,768,693 B2 | 9/2020 | Powderly et al. |
| 10,776,933 B2 | 9/2020 | Faulkner |
| 10,846,864 B2 | 11/2020 | Kim et al. |
| 10,861,242 B2 | 12/2020 | Lacey et al. |
| 10,877,645 B2 | 12/2020 | Lee et al. |
| 10,885,701 B1 | 1/2021 | Patel |
| 10,890,967 B2 | 1/2021 | Stellmach et al. |
| 10,922,744 B1 | 2/2021 | Mahajan |
| 10,929,099 B2 | 2/2021 | Querze et al. |
| 10,936,148 B1 | 3/2021 | Merkl et al. |
| 10,956,724 B1 | 3/2021 | Terrano |
| 10,983,663 B2 | 4/2021 | Iglesias |
| 11,003,308 B1 | 5/2021 | Dryer et al. |
| 11,017,611 B1 | 5/2021 | Mount et al. |
| 11,023,035 B1 | 6/2021 | Atlas et al. |
| 11,055,920 B1 | 7/2021 | Bramwell et al. |
| 11,079,995 B1 | 8/2021 | Hulbert et al. |
| 11,082,463 B2 | 8/2021 | Felman |
| 11,095,857 B1 | 8/2021 | Krol et al. |
| 11,112,875 B1 | 9/2021 | Zhou et al. |
| 11,126,850 B1 | 9/2021 | Ichim et al. |
| 11,132,840 B2 | 9/2021 | Sarangdhar et al. |
| 11,138,798 B2 | 10/2021 | Paul et al. |
| 11,146,909 B1 | 10/2021 | Pinto et al. |
| 11,175,791 B1 | 11/2021 | Patnaikuni et al. |
| 11,176,755 B1 | 11/2021 | Tichenor et al. |
| 11,199,898 B2 | 12/2021 | Blume et al. |
| 11,200,742 B1 | 12/2021 | Post et al. |
| 11,204,678 B1 | 12/2021 | Baker et al. |
| 11,232,643 B1 | 1/2022 | Stevens et al. |
| 11,243,734 B2 | 2/2022 | Boissière et al. |
| 11,249,556 B1 | 2/2022 | Schwarz et al. |
| 11,262,885 B1 | 3/2022 | Burckel |
| 11,266,919 B2 | 3/2022 | Bear et al. |
| 11,294,472 B2 | 4/2022 | Tang et al. |
| 11,294,475 B1 | 4/2022 | Pinchon et al. |
| 11,307,653 B1 | 4/2022 | Qian et al. |
| 11,340,756 B2 | 5/2022 | Faulkner et al. |
| 11,347,319 B2 | 5/2022 | Goel et al. |
| 11,348,300 B2 * | 5/2022 | Zimmermann .... G02B 27/0093 |
| 11,379,033 B2 | 7/2022 | O'hern et al. |
| 11,380,323 B2 | 7/2022 | Shin et al. |
| 11,382,611 B1 | 7/2022 | Westling et al. |
| 11,406,896 B1 | 8/2022 | Cheung et al. |
| 11,409,363 B2 | 8/2022 | Chen et al. |
| 11,416,080 B2 | 8/2022 | Heo et al. |
| 11,432,095 B1 | 8/2022 | Satongar et al. |
| 11,461,973 B2 | 10/2022 | Pinchon |
| 11,496,571 B2 | 11/2022 | Berliner et al. |
| 11,500,510 B2 | 11/2022 | Tokuchi et al. |
| 11,531,402 B1 | 12/2022 | Stolzenberg |
| 11,531,459 B2 | 12/2022 | Poupyrev et al. |
| 11,557,102 B2 | 1/2023 | Palangie et al. |
| 11,567,625 B2 | 1/2023 | Faulkner et al. |
| 11,573,363 B2 | 2/2023 | Zou et al. |
| 11,574,452 B2 | 2/2023 | Berliner et al. |
| 11,599,239 B2 | 3/2023 | Rockel et al. |
| 11,604,080 B2 | 3/2023 | Paoletti et al. |
| 11,615,596 B2 | 3/2023 | Faulkner et al. |
| 11,641,460 B1 | 5/2023 | Geusz et al. |
| 11,669,155 B2 | 6/2023 | Bowman et al. |
| 11,682,180 B1 | 6/2023 | Willkie |
| 11,689,632 B2 | 6/2023 | Raisher et al. |
| 11,720,171 B2 | 8/2023 | Pastrana Vicente et al. |
| 11,726,577 B2 | 8/2023 | Katz |
| 11,730,226 B2 | 8/2023 | Stolarz et al. |
| 11,733,824 B2 | 8/2023 | Iskandar et al. |
| 11,743,215 B1 | 8/2023 | Murillo et al. |
| 11,762,457 B1 | 9/2023 | Ikkai et al. |
| 11,762,473 B2 | 9/2023 | Cipoletta et al. |
| 11,768,544 B2 | 9/2023 | Schwarz et al. |
| 11,842,454 B1 | 12/2023 | Lin et al. |
| 11,847,748 B2 | 12/2023 | Liu et al. |
| 11,861,056 B2 | 1/2024 | Burns et al. |
| 11,861,136 B1 | 1/2024 | Faulkner et al. |
| 11,868,582 B2 | 1/2024 | Kim et al. |
| 11,875,013 B2 | 1/2024 | Lemay et al. |
| 11,875,162 B2 | 1/2024 | Garstenauer et al. |
| 11,886,643 B2 | 1/2024 | Irie et al. |
| 11,899,845 B2 | 2/2024 | Chung et al. |
| 11,909,453 B2 | 2/2024 | Javaudin et al. |
| 11,914,759 B2 | 2/2024 | Klein et al. |
| 11,922,588 B2 | 3/2024 | Fillhardt et al. |
| 11,928,263 B2 | 3/2024 | Jung et al. |
| 11,934,569 B2 | 3/2024 | Pastrana Vicente et al. |
| 11,948,263 B1 | 4/2024 | Rudman et al. |
| 11,954,242 B2 | 4/2024 | Dascola et al. |
| 11,972,092 B2 | 4/2024 | Zurmoehle et al. |
| 11,983,326 B2 | 5/2024 | Lacey |
| 11,988,832 B2 | 5/2024 | Singh et al. |
| 11,989,965 B2 | 5/2024 | Tarighat Mehrabani |
| 12,020,387 B2 | 6/2024 | Maharaja |
| 12,023,579 B2 | 7/2024 | Azmandian et al. |
| 12,032,803 B2 | 7/2024 | Pastrana Vicente et al. |
| 12,099,653 B2 | 9/2024 | Chawda et al. |
| 12,099,695 B1 | 9/2024 | Smith et al. |
| 12,112,011 B2 | 10/2024 | Smith et al. |
| 12,113,948 B1 | 10/2024 | Smith et al. |
| 12,118,200 B1 | 10/2024 | Shutzberg et al. |
| 12,154,236 B1 | 11/2024 | Herman et al. |
| 12,182,325 B2 | 12/2024 | Calderone et al. |
| 12,236,546 B1 | 2/2025 | Lipton |
| 12,254,127 B2 | 3/2025 | Burns et al. |
| 12,321,515 B2 | 6/2025 | Calderone et al. |
| 12,394,167 B1 | 8/2025 | Scully et al. |
| 12,408,804 B2 | 9/2025 | Schneider et al. |
| 12,456,271 B1 | 10/2025 | Bernstein et al. |
| 2001/0047250 A1 | 11/2001 | Schuller et al. |
| 2002/0030692 A1 | 3/2002 | Griesert |
| 2002/0044152 A1 | 4/2002 | Abbott et al. |
| 2003/0151611 A1 | 8/2003 | Turpin et al. |
| 2003/0222924 A1 | 12/2003 | Baron |
| 2004/0059784 A1 | 3/2004 | Caughey |
| 2004/0230912 A1 | 11/2004 | Clow et al. |
| 2004/0243926 A1 | 12/2004 | Trenbeath et al. |
| 2005/0062738 A1 | 3/2005 | Handley et al. |
| 2005/0073136 A1 | 4/2005 | Larsson et al. |
| 2005/0100210 A1 | 5/2005 | Rice et al. |
| 2005/0138572 A1 | 6/2005 | Good et al. |
| 2005/0144570 A1 | 6/2005 | Loverin et al. |
| 2005/0144571 A1 | 6/2005 | Loverin et al. |
| 2005/0198143 A1 | 9/2005 | Moody et al. |
| 2005/0216866 A1 | 9/2005 | Rosen et al. |
| 2005/0231532 A1 | 10/2005 | Suzuki et al. |

(56) References Cited

U.S. PATENT DOCUMENTS

| | | |
|---|---|---|
| 2005/0248299 A1 | 11/2005 | Chemel et al. |
| 2006/0034590 A1 | 2/2006 | Teramoto |
| 2006/0080702 A1 | 4/2006 | Diez et al. |
| 2006/0283214 A1 | 12/2006 | Donadon et al. |
| 2007/0172112 A1 | 7/2007 | Paley et al. |
| 2008/0132249 A1 | 6/2008 | Hamilton |
| 2008/0186255 A1 | 8/2008 | Cohen et al. |
| 2008/0211771 A1 | 9/2008 | Richardson |
| 2008/0222710 A1 | 9/2008 | Blagsvedt et al. |
| 2008/0310707 A1 | 12/2008 | Kansal et al. |
| 2009/0037844 A1 | 2/2009 | Kim et al. |
| 2009/0049408 A1 | 2/2009 | Naaman et al. |
| 2009/0064035 A1 | 3/2009 | Shibata et al. |
| 2009/0146961 A1 | 6/2009 | Cheung et al. |
| 2009/0164219 A1 | 6/2009 | Yeung et al. |
| 2009/0231356 A1 | 9/2009 | Barnes et al. |
| 2009/0254843 A1 | 10/2009 | Van et al. |
| 2009/0319181 A1 | 12/2009 | Khosravy et al. |
| 2009/0326810 A1 | 12/2009 | Callaghan et al. |
| 2010/0097375 A1 | 4/2010 | Tadaishi et al. |
| 2010/0115459 A1 | 5/2010 | Kinnunen et al. |
| 2010/0150526 A1 | 6/2010 | Rose et al. |
| 2010/0185949 A1 | 7/2010 | Jaeger |
| 2010/0188503 A1 | 7/2010 | Tsai et al. |
| 2010/0188572 A1 | 7/2010 | Card |
| 2010/0293504 A1 | 11/2010 | Hachiya |
| 2010/0302245 A1 | 12/2010 | Best |
| 2010/0328432 A1 | 12/2010 | Tanaka |
| 2010/0332196 A1 | 12/2010 | Fisker et al. |
| 2011/0018895 A1 | 1/2011 | Buzyn et al. |
| 2011/0018896 A1 | 1/2011 | Buzyn et al. |
| 2011/0029185 A1 | 2/2011 | Aoki et al. |
| 2011/0032365 A1 | 2/2011 | Yett |
| 2011/0066981 A1 | 3/2011 | Chmielewski et al. |
| 2011/0142321 A1 | 6/2011 | Huffman |
| 2011/0164163 A1* | 7/2011 | Bilbrey ............... G06F 3/0488 348/E5.022 |
| 2011/0169927 A1 | 7/2011 | Mages et al. |
| 2011/0216060 A1 | 9/2011 | Weising et al. |
| 2011/0243448 A1 | 10/2011 | Kawabuchi et al. |
| 2011/0254865 A1 | 10/2011 | Yee et al. |
| 2011/0289691 A1 | 12/2011 | Laflèche et al. |
| 2011/0304557 A1 | 12/2011 | Wilburn et al. |
| 2011/0310001 A1 | 12/2011 | Madau et al. |
| 2011/0320969 A1 | 12/2011 | Hwang et al. |
| 2012/0038751 A1 | 2/2012 | Yuan et al. |
| 2012/0086624 A1 | 4/2012 | Thompson et al. |
| 2012/0113223 A1 | 5/2012 | Hilliges et al. |
| 2012/0151416 A1 | 6/2012 | Bell et al. |
| 2012/0170089 A1 | 7/2012 | Kim et al. |
| 2012/0170840 A1 | 7/2012 | Caruso et al. |
| 2012/0194547 A1 | 8/2012 | Johnson et al. |
| 2012/0218395 A1 | 8/2012 | Andersen et al. |
| 2012/0223885 A1 | 9/2012 | Perez |
| 2012/0249416 A1 | 10/2012 | Maciocci et al. |
| 2012/0249741 A1 | 10/2012 | Maciocci et al. |
| 2012/0256956 A1 | 10/2012 | Kasahara |
| 2012/0256967 A1 | 10/2012 | Baldwin et al. |
| 2012/0257035 A1 | 10/2012 | Larsen |
| 2012/0272179 A1 | 10/2012 | Stafford |
| 2012/0290401 A1 | 11/2012 | Neven |
| 2012/0304087 A1 | 11/2012 | Walkin et al. |
| 2013/0010062 A1 | 1/2013 | Redmann |
| 2013/0088516 A1 | 4/2013 | Ota et al. |
| 2013/0093727 A1 | 4/2013 | Eriksson et al. |
| 2013/0103313 A1 | 4/2013 | Moore et al. |
| 2013/0127850 A1 | 5/2013 | Bindon |
| 2013/0147820 A1 | 6/2013 | Kalai et al. |
| 2013/0169533 A1 | 7/2013 | Jahnke |
| 2013/0191160 A1 | 7/2013 | Oran |
| 2013/0207963 A1 | 8/2013 | Stirbu et al. |
| 2013/0211843 A1 | 8/2013 | Clarkson |
| 2013/0212470 A1 | 8/2013 | Karunamuni et al. |
| 2013/0222227 A1 | 8/2013 | Johansson et al. |
| 2013/0222410 A1 | 8/2013 | Kameyama et al. |
| 2013/0229345 A1 | 9/2013 | Day et al. |
| 2013/0232430 A1 | 9/2013 | Reitan |
| 2013/0246955 A1 | 9/2013 | Schwesig et al. |
| 2013/0249922 A1 | 9/2013 | Hachiya |
| 2013/0263016 A1 | 10/2013 | Lehtiniemi et al. |
| 2013/0265227 A1 | 10/2013 | Julian |
| 2013/0271397 A1 | 10/2013 | Hildreth et al. |
| 2013/0278501 A1 | 10/2013 | Bulzacki |
| 2013/0286004 A1 | 10/2013 | Mcculloch et al. |
| 2013/0293468 A1 | 11/2013 | Perez et al. |
| 2013/0307945 A1 | 11/2013 | Cheng et al. |
| 2013/0321462 A1 | 12/2013 | Salter et al. |
| 2013/0325326 A1 | 12/2013 | Blumenberg et al. |
| 2013/0326341 A1 | 12/2013 | Nonaka |
| 2013/0326364 A1 | 12/2013 | Latta et al. |
| 2013/0328925 A1 | 12/2013 | Latta et al. |
| 2013/0332890 A1 | 12/2013 | Ramic et al. |
| 2013/0335301 A1 | 12/2013 | Wong et al. |
| 2013/0342564 A1 | 12/2013 | Kinnebrew et al. |
| 2013/0342570 A1 | 12/2013 | Kinnebrew et al. |
| 2013/0345975 A1 | 12/2013 | Vulcano et al. |
| 2014/0002338 A1 | 1/2014 | Raffa et al. |
| 2014/0002444 A1 | 1/2014 | Bennett et al. |
| 2014/0024324 A1 | 1/2014 | Mumick |
| 2014/0028548 A1 | 1/2014 | Bychkov et al. |
| 2014/0040832 A1 | 2/2014 | Regelous |
| 2014/0063058 A1 | 3/2014 | Fialho et al. |
| 2014/0071241 A1 | 3/2014 | Yang et al. |
| 2014/0075361 A1 | 3/2014 | Reynolds et al. |
| 2014/0078176 A1 | 3/2014 | Kim et al. |
| 2014/0092018 A1 | 4/2014 | Geithner |
| 2014/0104206 A1 | 4/2014 | Anderson |
| 2014/0108942 A1 | 4/2014 | Freeman et al. |
| 2014/0125584 A1 | 5/2014 | Xun et al. |
| 2014/0125585 A1 | 5/2014 | Song et al. |
| 2014/0129990 A1 | 5/2014 | Xin et al. |
| 2014/0132633 A1 | 5/2014 | Fekete et al. |
| 2014/0164928 A1 | 6/2014 | Kim |
| 2014/0168267 A1 | 6/2014 | Kim et al. |
| 2014/0181683 A1 | 6/2014 | Lim et al. |
| 2014/0198017 A1 | 7/2014 | Lamb et al. |
| 2014/0232639 A1 | 8/2014 | Hayashi et al. |
| 2014/0237366 A1 | 8/2014 | Poulos et al. |
| 2014/0247208 A1 | 9/2014 | Henderek et al. |
| 2014/0258942 A1 | 9/2014 | Kutliroff et al. |
| 2014/0267046 A1 | 9/2014 | Ellsworth et al. |
| 2014/0267400 A1 | 9/2014 | Mabbutt et al. |
| 2014/0268925 A1 | 9/2014 | Lee et al. |
| 2014/0282272 A1 | 9/2014 | Kies et al. |
| 2014/0298273 A1 | 10/2014 | Blackstone et al. |
| 2014/0320404 A1 | 10/2014 | Kasahara |
| 2014/0331187 A1 | 11/2014 | Hicks et al. |
| 2014/0333666 A1 | 11/2014 | Poulos et al. |
| 2014/0347391 A1 | 11/2014 | Keane et al. |
| 2014/0351727 A1 | 11/2014 | Danton et al. |
| 2014/0351753 A1 | 11/2014 | Shin et al. |
| 2014/0362111 A1 | 12/2014 | Kim |
| 2014/0363074 A1 | 12/2014 | Dolfing et al. |
| 2014/0368537 A1 | 12/2014 | Salter et al. |
| 2014/0368620 A1 | 12/2014 | Li et al. |
| 2014/0372957 A1 | 12/2014 | Keane et al. |
| 2014/0375541 A1 | 12/2014 | Nister et al. |
| 2014/0375683 A1 | 12/2014 | Salter et al. |
| 2015/0035822 A1 | 2/2015 | Arsan et al. |
| 2015/0035832 A1 | 2/2015 | Sugden et al. |
| 2015/0042679 A1 | 2/2015 | Järvenpää |
| 2015/0058718 A1 | 2/2015 | Kim et al. |
| 2015/0067580 A1 | 3/2015 | Um et al. |
| 2015/0121466 A1 | 4/2015 | Brands et al. |
| 2015/0123890 A1 | 5/2015 | Kapur et al. |
| 2015/0123901 A1 | 5/2015 | Schwesinger et al. |
| 2015/0131850 A1 | 5/2015 | Qvarfordt |
| 2015/0135108 A1 | 5/2015 | Pope et al. |
| 2015/0143251 A1 | 5/2015 | Bailiang et al. |
| 2015/0145887 A1 | 5/2015 | Forutanpour et al. |
| 2015/0149961 A1 | 5/2015 | Karakotsios |
| 2015/0153833 A1 | 6/2015 | Pinault et al. |
| 2015/0169506 A1 | 6/2015 | Leventhal et al. |
| 2015/0177937 A1 | 6/2015 | Poletto et al. |

(56) References Cited

U.S. PATENT DOCUMENTS

| | | |
|---|---|---|
| 2015/0187093 A1 | 7/2015 | Chu et al. |
| 2015/0193982 A1 | 7/2015 | Mihelich et al. |
| 2015/0199081 A1 | 7/2015 | Wheeler |
| 2015/0205106 A1 | 7/2015 | Norden |
| 2015/0220152 A1 | 8/2015 | Tait et al. |
| 2015/0221132 A1 | 8/2015 | Kruglick |
| 2015/0227285 A1 | 8/2015 | Lee et al. |
| 2015/0242095 A1 | 8/2015 | Sonnenberg |
| 2015/0253957 A1 | 9/2015 | Crocker |
| 2015/0254905 A1 | 9/2015 | Ramsby et al. |
| 2015/0255067 A1 | 9/2015 | White et al. |
| 2015/0262428 A1 | 9/2015 | Tatzgern et al. |
| 2015/0277699 A1 | 10/2015 | Algreatly |
| 2015/0286741 A1 | 10/2015 | Zhu et al. |
| 2015/0287403 A1 | 10/2015 | Holzer Zaslansky et al. |
| 2015/0312561 A1 | 10/2015 | Hoof et al. |
| 2015/0317831 A1 | 11/2015 | Ebstyne et al. |
| 2015/0317832 A1 | 11/2015 | Ebstyne et al. |
| 2015/0331576 A1 | 11/2015 | Piya et al. |
| 2015/0332091 A1 | 11/2015 | Kim et al. |
| 2015/0350141 A1 | 12/2015 | Yang et al. |
| 2015/0370323 A1 | 12/2015 | Cieplinski et al. |
| 2015/0370404 A1 | 12/2015 | Hu et al. |
| 2015/0381974 A1 | 12/2015 | Hoffman et al. |
| 2016/0012642 A1 | 1/2016 | Lee et al. |
| 2016/0015470 A1 | 1/2016 | Border |
| 2016/0018898 A1 | 1/2016 | Tu et al. |
| 2016/0018900 A1 | 1/2016 | Tu et al. |
| 2016/0025971 A1 | 1/2016 | Crow et al. |
| 2016/0026242 A1 | 1/2016 | Burns et al. |
| 2016/0026253 A1 | 1/2016 | Bradski et al. |
| 2016/0028961 A1 | 1/2016 | Thurairatnam |
| 2016/0041391 A1 | 2/2016 | Van et al. |
| 2016/0050642 A1 | 2/2016 | Brown et al. |
| 2016/0062636 A1 | 3/2016 | Jung et al. |
| 2016/0070448 A1 | 3/2016 | Krol |
| 2016/0085301 A1 | 3/2016 | Lopez |
| 2016/0093108 A1 | 3/2016 | Mao et al. |
| 2016/0098093 A1 | 4/2016 | Cheon et al. |
| 2016/0098094 A1 | 4/2016 | Minkkinen |
| 2016/0098972 A1 | 4/2016 | Feit et al. |
| 2016/0127690 A1 | 5/2016 | Kaehler et al. |
| 2016/0133044 A1 | 5/2016 | Lynch |
| 2016/0133052 A1 | 5/2016 | Choi et al. |
| 2016/0171304 A1 | 6/2016 | Golding et al. |
| 2016/0179191 A1 | 6/2016 | Kim et al. |
| 2016/0179336 A1 | 6/2016 | Ambrus et al. |
| 2016/0189426 A1 | 6/2016 | Thomas et al. |
| 2016/0193104 A1 | 7/2016 | Du |
| 2016/0196692 A1 | 7/2016 | Kjallstrom et al. |
| 2016/0210784 A1 | 7/2016 | Ramsby et al. |
| 2016/0216768 A1 | 7/2016 | Goetz et al. |
| 2016/0224122 A1 | 8/2016 | Dietz et al. |
| 2016/0225012 A1 | 8/2016 | Ha et al. |
| 2016/0225164 A1 | 8/2016 | Tomlin et al. |
| 2016/0227267 A1 | 8/2016 | Tsurutani et al. |
| 2016/0239165 A1 | 8/2016 | Chen et al. |
| 2016/0253063 A1 | 9/2016 | Critchlow |
| 2016/0253821 A1 | 9/2016 | Romano et al. |
| 2016/0275702 A1 | 9/2016 | Reynolds et al. |
| 2016/0279516 A1 | 9/2016 | Gupta et al. |
| 2016/0291922 A1 | 10/2016 | Montgomerie et al. |
| 2016/0306434 A1 | 10/2016 | Ferrin |
| 2016/0309081 A1 | 10/2016 | Frahm et al. |
| 2016/0313890 A1 | 10/2016 | Walline et al. |
| 2016/0334940 A1 | 11/2016 | Kandadai et al. |
| 2016/0349063 A1 | 12/2016 | Maurer et al. |
| 2016/0350973 A1 | 12/2016 | Shapira et al. |
| 2016/0363774 A1 | 12/2016 | Kawasima |
| 2016/0370858 A1 | 12/2016 | Leppänen et al. |
| 2016/0373647 A1 | 12/2016 | García Morate et al. |
| 2016/0373714 A1 | 12/2016 | Lee et al. |
| 2016/0379409 A1 | 12/2016 | Gavriliuc et al. |
| 2016/0379418 A1 | 12/2016 | Osborn et al. |
| 2017/0032568 A1 | 2/2017 | Gharpure et al. |
| 2017/0038829 A1 | 2/2017 | Lanier et al. |
| 2017/0038837 A1 | 2/2017 | Faaborg et al. |
| 2017/0038849 A1 | 2/2017 | Hwang |
| 2017/0039770 A1 | 2/2017 | Lanier et al. |
| 2017/0046872 A1 | 2/2017 | Geselowitz et al. |
| 2017/0052373 A1 | 2/2017 | Memmott et al. |
| 2017/0052393 A1 | 2/2017 | Kweon |
| 2017/0052595 A1 | 2/2017 | Poulos et al. |
| 2017/0053383 A1 | 2/2017 | Heo |
| 2017/0060230 A1 | 3/2017 | Faaborg et al. |
| 2017/0061694 A1 | 3/2017 | Giraldi et al. |
| 2017/0090566 A1 | 3/2017 | George-svahn et al. |
| 2017/0109930 A1 | 4/2017 | Holzer et al. |
| 2017/0115728 A1 | 4/2017 | Park et al. |
| 2017/0123487 A1 | 5/2017 | Hazra et al. |
| 2017/0131964 A1 | 5/2017 | Baek et al. |
| 2017/0132694 A1 | 5/2017 | Damy |
| 2017/0132822 A1 | 5/2017 | Marschke et al. |
| 2017/0146801 A1 | 5/2017 | Stempora |
| 2017/0147180 A1 | 5/2017 | Yoon et al. |
| 2017/0148339 A1 | 5/2017 | Van Curen et al. |
| 2017/0153866 A1 | 6/2017 | Grinberg et al. |
| 2017/0154326 A1 | 6/2017 | Jo et al. |
| 2017/0162177 A1 | 6/2017 | Lebeck et al. |
| 2017/0169616 A1 | 6/2017 | Wiley et al. |
| 2017/0178392 A1 | 6/2017 | Zuccarino et al. |
| 2017/0185276 A1 | 6/2017 | Lee et al. |
| 2017/0206691 A1 | 7/2017 | Harrises et al. |
| 2017/0206692 A1 | 7/2017 | Sheaffer et al. |
| 2017/0212583 A1 | 7/2017 | Krasadakis |
| 2017/0213388 A1 | 7/2017 | Margolis et al. |
| 2017/0214782 A1 | 7/2017 | Brinda |
| 2017/0221264 A1 | 8/2017 | Perry |
| 2017/0228130 A1 | 8/2017 | Palmaro |
| 2017/0236332 A1 | 8/2017 | Kipman et al. |
| 2017/0243352 A1 | 8/2017 | Kutliroff et al. |
| 2017/0251143 A1 | 8/2017 | Peruch et al. |
| 2017/0256096 A1 | 9/2017 | Faaborg et al. |
| 2017/0270715 A1 | 9/2017 | Lindsay et al. |
| 2017/0285737 A1 | 10/2017 | Khalid et al. |
| 2017/0287215 A1 | 10/2017 | Lalonde et al. |
| 2017/0287225 A1 | 10/2017 | Powderly et al. |
| 2017/0302903 A1 | 10/2017 | Ng et al. |
| 2017/0315715 A1 | 11/2017 | Fujita et al. |
| 2017/0326457 A1 | 11/2017 | Tilton et al. |
| 2017/0344223 A1 | 11/2017 | Holzer et al. |
| 2017/0351094 A1 | 12/2017 | Poulos et al. |
| 2017/0357389 A1 | 12/2017 | Fleizach et al. |
| 2017/0357390 A1 | 12/2017 | Alonso Ruiz et al. |
| 2017/0358141 A1* | 12/2017 | Stafford ............ G06T 7/246 |
| 2017/0364198 A1 | 12/2017 | Yoganandan et al. |
| 2018/0005433 A1 | 1/2018 | Kohler et al. |
| 2018/0024681 A1 | 1/2018 | Bernstein et al. |
| 2018/0045963 A1 | 2/2018 | Hoover et al. |
| 2018/0046363 A1 | 2/2018 | Miller et al. |
| 2018/0075658 A1 | 3/2018 | Lanier et al. |
| 2018/0077383 A1 | 3/2018 | Akao et al. |
| 2018/0081519 A1 | 3/2018 | Kim |
| 2018/0084287 A1 | 3/2018 | Shimura |
| 2018/0088787 A1 | 3/2018 | Bereza et al. |
| 2018/0095542 A1 | 4/2018 | Mallinson |
| 2018/0095634 A1 | 4/2018 | Alexander |
| 2018/0095635 A1 | 4/2018 | Valdivia et al. |
| 2018/0095636 A1 | 4/2018 | Valdivia et al. |
| 2018/0095649 A1 | 4/2018 | Valdivia et al. |
| 2018/0101223 A1 | 4/2018 | Ishihara et al. |
| 2018/0103209 A1 | 4/2018 | Fischler et al. |
| 2018/0114364 A1 | 4/2018 | Mcphee et al. |
| 2018/0120944 A1 | 5/2018 | Wang et al. |
| 2018/0122043 A1 | 5/2018 | Energin et al. |
| 2018/0122138 A1 | 5/2018 | Piya et al. |
| 2018/0130255 A1 | 5/2018 | Hazeghi et al. |
| 2018/0136815 A1 | 5/2018 | Tomizuka et al. |
| 2018/0143693 A1 | 5/2018 | Calabrese et al. |
| 2018/0150204 A1* | 5/2018 | Macgillivray ...... G06F 3/04815 |
| 2018/0150997 A1 | 5/2018 | Austin |
| 2018/0158222 A1 | 6/2018 | Hayashi |
| 2018/0165853 A1 | 6/2018 | Inagi et al. |
| 2018/0173404 A1 | 6/2018 | Smith |

(56) References Cited

U.S. PATENT DOCUMENTS

| | | |
|---|---|---|
| 2018/0181199 A1 | 6/2018 | Harvey et al. |
| 2018/0181272 A1 | 6/2018 | Olsson et al. |
| 2018/0183986 A1 | 6/2018 | Smith et al. |
| 2018/0188048 A1 | 7/2018 | Ding et al. |
| 2018/0188802 A1 | 7/2018 | Okumura |
| 2018/0190003 A1 | 7/2018 | Upadhyay et al. |
| 2018/0197336 A1 | 7/2018 | Rochford et al. |
| 2018/0197341 A1 | 7/2018 | Loberg et al. |
| 2018/0210628 A1 | 7/2018 | Mcphee et al. |
| 2018/0218214 A1 | 8/2018 | Pestun et al. |
| 2018/0220195 A1 | 8/2018 | Panchaksharaiah et al. |
| 2018/0239144 A1 | 8/2018 | Woods et al. |
| 2018/0247449 A1 | 8/2018 | Park et al. |
| 2018/0275753 A1 | 9/2018 | Publicover et al. |
| 2018/0286126 A1 | 10/2018 | Schwarz et al. |
| 2018/0288206 A1 | 10/2018 | Stimpson et al. |
| 2018/0300023 A1 | 10/2018 | Hein |
| 2018/0300952 A1 | 10/2018 | Evans et al. |
| 2018/0302687 A1 | 10/2018 | Bhattacharjee et al. |
| 2018/0315248 A1 | 11/2018 | Bastov et al. |
| 2018/0322701 A1 | 11/2018 | Pahud et al. |
| 2018/0330544 A1 | 11/2018 | Corso et al. |
| 2018/0330550 A1 | 11/2018 | Takahashi |
| 2018/0348010 A1 | 12/2018 | Coleman et al. |
| 2018/0348861 A1 | 12/2018 | Uscinski et al. |
| 2018/0348986 A1 | 12/2018 | Sawaki |
| 2018/0350099 A1 | 12/2018 | Yerkes et al. |
| 2018/0350119 A1 | 12/2018 | Kocharlakota et al. |
| 2018/0352374 A1 | 12/2018 | Ball et al. |
| 2019/0004683 A1 | 1/2019 | Pahud et al. |
| 2019/0005055 A1 | 1/2019 | Andrew et al. |
| 2019/0012060 A1 | 1/2019 | Moore et al. |
| 2019/0018479 A1 | 1/2019 | Minami |
| 2019/0018498 A1 | 1/2019 | West et al. |
| 2019/0034076 A1 | 1/2019 | Vinayak et al. |
| 2019/0037137 A1 | 1/2019 | Toksvig et al. |
| 2019/0043259 A1 | 2/2019 | Wang et al. |
| 2019/0050062 A1 | 2/2019 | Chen et al. |
| 2019/0056785 A1 | 2/2019 | Suk |
| 2019/0065027 A1 | 2/2019 | Hauenstein et al. |
| 2019/0073109 A1 | 3/2019 | Zhang et al. |
| 2019/0080572 A1 | 3/2019 | Kim et al. |
| 2019/0088149 A1 | 3/2019 | Fink et al. |
| 2019/0094963 A1 | 3/2019 | Nijs |
| 2019/0094979 A1 | 3/2019 | Hall et al. |
| 2019/0096134 A1 | 3/2019 | Amacker et al. |
| 2019/0101991 A1 | 4/2019 | Brennan |
| 2019/0102953 A1 | 4/2019 | Lindsay et al. |
| 2019/0130622 A1 | 5/2019 | Hoover et al. |
| 2019/0130633 A1 | 5/2019 | Haddad et al. |
| 2019/0130733 A1 | 5/2019 | Hodge |
| 2019/0138183 A1 | 5/2019 | Rosas et al. |
| 2019/0146128 A1 | 5/2019 | Cao et al. |
| 2019/0155495 A1 | 5/2019 | Klein et al. |
| 2019/0164340 A1 | 5/2019 | Pejic et al. |
| 2019/0172261 A1 | 6/2019 | Alt et al. |
| 2019/0172262 A1 | 6/2019 | Mchugh et al. |
| 2019/0180504 A1 | 6/2019 | Pomerantz et al. |
| 2019/0188895 A1 | 6/2019 | Miller et al. |
| 2019/0188918 A1 | 6/2019 | Brewer et al. |
| 2019/0204906 A1 | 7/2019 | Ross et al. |
| 2019/0212827 A1 | 7/2019 | Kin et al. |
| 2019/0213389 A1 | 7/2019 | Peruch et al. |
| 2019/0227763 A1 | 7/2019 | Kaufthal |
| 2019/0228503 A1 | 7/2019 | Tokuchi |
| 2019/0228589 A1 | 7/2019 | Dascola et al. |
| 2019/0238818 A1 | 8/2019 | Held et al. |
| 2019/0244434 A1 | 8/2019 | Pahud et al. |
| 2019/0251884 A1 | 8/2019 | Burns et al. |
| 2019/0258365 A1 | 8/2019 | Zurmoehle et al. |
| 2019/0265828 A1 | 8/2019 | Hauenstein et al. |
| 2019/0266774 A1 | 8/2019 | Sommerlade et al. |
| 2019/0277651 A1 | 9/2019 | Ruikar |
| 2019/0278432 A1 | 9/2019 | Bennett et al. |
| 2019/0279407 A1 | 9/2019 | Mchugh et al. |
| 2019/0287307 A1 | 9/2019 | Rogers et al. |
| 2019/0294312 A1 | 9/2019 | Rohrbacher |
| 2019/0302977 A1 | 10/2019 | Pendergast et al. |
| 2019/0310757 A1 | 10/2019 | Lee et al. |
| 2019/0311547 A1 | 10/2019 | Ohmori |
| 2019/0324529 A1 | 10/2019 | Stellmach et al. |
| 2019/0325654 A1 | 10/2019 | Stisser et al. |
| 2019/0332250 A1 | 10/2019 | Lee et al. |
| 2019/0333278 A1* | 10/2019 | Palangie ................ G06T 19/20 |
| 2019/0339770 A1 | 11/2019 | Kurlethimar et al. |
| 2019/0340816 A1 | 11/2019 | Rogers |
| 2019/0340832 A1 | 11/2019 | Srinivasan et al. |
| 2019/0346678 A1 | 11/2019 | Nocham |
| 2019/0346922 A1 | 11/2019 | Young et al. |
| 2019/0349575 A1 | 11/2019 | Knepper et al. |
| 2019/0354259 A1 | 11/2019 | Park |
| 2019/0361521 A1 | 11/2019 | Stellmach et al. |
| 2019/0362557 A1 | 11/2019 | Lacey et al. |
| 2019/0362560 A1 | 11/2019 | Choi et al. |
| 2019/0369569 A1 | 12/2019 | Olsen et al. |
| 2019/0370492 A1 | 12/2019 | Falchuk et al. |
| 2019/0371072 A1 | 12/2019 | Lindberg et al. |
| 2019/0377487 A1 | 12/2019 | Bailey et al. |
| 2019/0379765 A1 | 12/2019 | Fajt et al. |
| 2019/0384406 A1 | 12/2019 | Smith et al. |
| 2019/0392830 A1 | 12/2019 | Abdollahian |
| 2020/0004401 A1 | 1/2020 | Hwang et al. |
| 2020/0005539 A1 | 1/2020 | Hwang et al. |
| 2020/0012341 A1 | 1/2020 | Stellmach et al. |
| 2020/0020157 A1 | 1/2020 | Powers et al. |
| 2020/0026349 A1 | 1/2020 | Fontanel et al. |
| 2020/0026922 A1 | 1/2020 | Pekelny et al. |
| 2020/0038120 A1 | 2/2020 | Ziraknejad et al. |
| 2020/0043243 A1 | 2/2020 | Bhushan et al. |
| 2020/0045249 A1 | 2/2020 | Francois et al. |
| 2020/0048825 A1 | 2/2020 | Schultz et al. |
| 2020/0051527 A1 | 2/2020 | Ngo |
| 2020/0073521 A1 | 3/2020 | Peebler et al. |
| 2020/0081526 A1 | 3/2020 | Walker et al. |
| 2020/0082602 A1 | 3/2020 | Jones |
| 2020/0089314 A1 | 3/2020 | Poupyrev et al. |
| 2020/0092537 A1 | 3/2020 | Sutter et al. |
| 2020/0097077 A1 | 3/2020 | Nguyen et al. |
| 2020/0098140 A1 | 3/2020 | Jagnow et al. |
| 2020/0098173 A1 | 3/2020 | Mccall |
| 2020/0099989 A1 | 3/2020 | Niemirska et al. |
| 2020/0106965 A1* | 4/2020 | Malia ..................... A63F 13/92 |
| 2020/0112711 A1 | 4/2020 | Enriquez et al. |
| 2020/0117213 A1 | 4/2020 | Tian et al. |
| 2020/0126291 A1 | 4/2020 | Nguyen et al. |
| 2020/0128227 A1 | 4/2020 | Chavez et al. |
| 2020/0128232 A1 | 4/2020 | Hwang et al. |
| 2020/0129850 A1 | 4/2020 | Ohashi |
| 2020/0135141 A1 | 4/2020 | Day et al. |
| 2020/0159017 A1 | 5/2020 | Lin et al. |
| 2020/0201444 A1 | 6/2020 | Stoyles et al. |
| 2020/0214682 A1 | 7/2020 | Zaslavsky et al. |
| 2020/0218074 A1 | 7/2020 | Hoover et al. |
| 2020/0225735 A1 | 7/2020 | Schwarz |
| 2020/0225746 A1 | 7/2020 | Bar-zeev et al. |
| 2020/0225747 A1 | 7/2020 | Bar-zeev et al. |
| 2020/0225830 A1 | 7/2020 | Tang et al. |
| 2020/0226814 A1 | 7/2020 | Tang et al. |
| 2020/0226823 A1 | 7/2020 | Stachniak et al. |
| 2020/0242844 A1 | 7/2020 | Bae et al. |
| 2020/0257245 A1 | 8/2020 | Linville et al. |
| 2020/0257484 A1 | 8/2020 | Qian et al. |
| 2020/0258481 A1 | 8/2020 | Woo et al. |
| 2020/0267326 A1 | 8/2020 | Yim |
| 2020/0272303 A1 | 8/2020 | Jia et al. |
| 2020/0286299 A1 | 9/2020 | Wang et al. |
| 2020/0301513 A1 | 9/2020 | Mejia Cobo |
| 2020/0318955 A1 | 10/2020 | Sharapov et al. |
| 2020/0319704 A1 | 10/2020 | Kathuria et al. |
| 2020/0322178 A1 | 10/2020 | Wang et al. |
| 2020/0322575 A1 | 10/2020 | Valli |
| 2020/0328913 A1 | 10/2020 | Wyas et al. |
| 2020/0356221 A1 | 11/2020 | Behzadi et al. |
| 2020/0357184 A1 | 11/2020 | Paul et al. |

(56) References Cited

U.S. PATENT DOCUMENTS

| | | |
|---|---|---|
| 2020/0357374 A1 | 11/2020 | Verweij et al. |
| 2020/0363867 A1 | 11/2020 | Azimi et al. |
| 2020/0371602 A1 | 11/2020 | Kanda |
| 2020/0371673 A1 | 11/2020 | Faulkner |
| 2020/0379626 A1 | 12/2020 | Guyomard et al. |
| 2020/0387214 A1 | 12/2020 | Ravasz et al. |
| 2020/0387228 A1 | 12/2020 | Ravasz et al. |
| 2020/0387287 A1 | 12/2020 | Ravasz et al. |
| 2020/0401687 A1 | 12/2020 | Mak |
| 2020/0410960 A1 | 12/2020 | Saito et al. |
| 2020/0412862 A1 | 12/2020 | Oh et al. |
| 2021/0011556 A1 | 1/2021 | Atlas et al. |
| 2021/0019036 A1 | 1/2021 | Wang et al. |
| 2021/0034163 A1 | 2/2021 | Goel et al. |
| 2021/0034319 A1 | 2/2021 | Wang et al. |
| 2021/0049826 A1 | 2/2021 | Takahashi |
| 2021/0055789 A1 | 2/2021 | Tsai et al. |
| 2021/0056748 A1 | 2/2021 | Pritchett |
| 2021/0067418 A1 | 3/2021 | Ely et al. |
| 2021/0074062 A1 | 3/2021 | Madonna et al. |
| 2021/0090222 A1 | 3/2021 | Lee et al. |
| 2021/0090337 A1 | 3/2021 | Ravasz et al. |
| 2021/0090348 A1 | 3/2021 | Croxford et al. |
| 2021/0096726 A1 | 4/2021 | Faulkner et al. |
| 2021/0097766 A1 | 4/2021 | Palangie et al. |
| 2021/0097776 A1 | 4/2021 | Faulkner et al. |
| 2021/0102820 A1 | 4/2021 | Le et al. |
| 2021/0125414 A1 | 4/2021 | Berkebile |
| 2021/0132687 A1 | 5/2021 | Luo et al. |
| 2021/0134069 A1 | 5/2021 | Sorrento |
| 2021/0134248 A1 | 5/2021 | Wan et al. |
| 2021/0142552 A1 | 5/2021 | Kimura et al. |
| 2021/0158624 A1 | 5/2021 | Moon et al. |
| 2021/0165484 A1 | 6/2021 | Suguhara et al. |
| 2021/0165923 A1 | 6/2021 | Johnston |
| 2021/0173340 A1 | 6/2021 | Kim |
| 2021/0173536 A1 | 6/2021 | Kondo |
| 2021/0191600 A1 | 6/2021 | Lemay et al. |
| 2021/0225043 A1 | 7/2021 | Tang et al. |
| 2021/0227601 A1 | 7/2021 | Eom et al. |
| 2021/0241483 A1 | 8/2021 | Dryer et al. |
| 2021/0248674 A1 | 8/2021 | Ogunbunmi |
| 2021/0272367 A1 | 9/2021 | Richter |
| 2021/0272537 A1 | 9/2021 | Mak |
| 2021/0279957 A1 | 9/2021 | Eder et al. |
| 2021/0279967 A1 | 9/2021 | Gernoth et al. |
| 2021/0286502 A1 | 9/2021 | Lemay et al. |
| 2021/0287439 A1 | 9/2021 | Goodrich et al. |
| 2021/0295592 A1 | 9/2021 | Von Cramon |
| 2021/0295602 A1 | 9/2021 | Scapel et al. |
| 2021/0303074 A1 | 9/2021 | Vanblon et al. |
| 2021/0312684 A1* | 10/2021 | Zimmermann ..... A63F 13/5255 |
| 2021/0312713 A1 | 10/2021 | Peri et al. |
| 2021/0312717 A1 | 10/2021 | Mao |
| 2021/0319617 A1 | 10/2021 | Ahn et al. |
| 2021/0326094 A1 | 10/2021 | Buerli et al. |
| 2021/0327140 A1* | 10/2021 | Rothkopf ............. G06T 13/205 |
| 2021/0331069 A1 | 10/2021 | Gustafson et al. |
| 2021/0333864 A1 | 10/2021 | Harvey et al. |
| 2021/0339134 A1 | 11/2021 | Knoppert |
| 2021/0350564 A1 | 11/2021 | Peuhkurinen et al. |
| 2021/0350604 A1 | 11/2021 | Pejsa et al. |
| 2021/0350634 A1 | 11/2021 | Major et al. |
| 2021/0352172 A1 | 11/2021 | Kim et al. |
| 2021/0358294 A1 | 11/2021 | Parashar et al. |
| 2021/0365108 A1 | 11/2021 | Burns et al. |
| 2021/0366440 A1 | 11/2021 | Burns et al. |
| 2021/0368136 A1 | 11/2021 | Chalmers et al. |
| 2021/0374221 A1 | 12/2021 | Markhasin et al. |
| 2021/0375022 A1 | 12/2021 | Lee et al. |
| 2021/0383097 A1 | 12/2021 | Guerard et al. |
| 2021/0400744 A1 | 12/2021 | Chen et al. |
| 2021/0402306 A1 | 12/2021 | Huang |
| 2021/0405760 A1 | 12/2021 | Schoen |
| 2021/0409903 A1 | 12/2021 | Shapiro et al. |
| 2022/0011577 A1 | 1/2022 | Lawver et al. |
| 2022/0011855 A1 | 1/2022 | Hazra et al. |
| 2022/0012002 A1 | 1/2022 | Bar-zeev et al. |
| 2022/0027115 A1 | 1/2022 | Haapoja et al. |
| 2022/0028108 A1 | 1/2022 | Haapoja et al. |
| 2022/0030197 A1* | 1/2022 | Ishimoto ............... H04L 41/145 |
| 2022/0070241 A1 | 3/2022 | Yerli |
| 2022/0076496 A1 | 3/2022 | Palangie et al. |
| 2022/0083145 A1 | 3/2022 | Matsunaga et al. |
| 2022/0083197 A1 | 3/2022 | Rockel et al. |
| 2022/0084279 A1 | 3/2022 | Lindmeier et al. |
| 2022/0086203 A1 | 3/2022 | Morris et al. |
| 2022/0086205 A1 | 3/2022 | Lebeau et al. |
| 2022/0091722 A1 | 3/2022 | Faulkner et al. |
| 2022/0091723 A1 | 3/2022 | Faulkner et al. |
| 2022/0092862 A1 | 3/2022 | Faulkner et al. |
| 2022/0100265 A1 | 3/2022 | Kies et al. |
| 2022/0100270 A1 | 3/2022 | Pastrana Vicente et al. |
| 2022/0101593 A1 | 3/2022 | Rockel et al. |
| 2022/0101612 A1 | 3/2022 | Palangie et al. |
| 2022/0104910 A1 | 4/2022 | Shelton et al. |
| 2022/0121275 A1 | 4/2022 | Balaji et al. |
| 2022/0121344 A1 | 4/2022 | Pastrana Vicente et al. |
| 2022/0122303 A1 | 4/2022 | Sasikumar et al. |
| 2022/0124286 A1 | 4/2022 | Punwani et al. |
| 2022/0130107 A1 | 4/2022 | Lindh |
| 2022/0130126 A1 | 4/2022 | Delgado et al. |
| 2022/0137701 A1 | 5/2022 | Bowman et al. |
| 2022/0137705 A1 | 5/2022 | Hashimoto et al. |
| 2022/0148257 A1 | 5/2022 | Boubekeur et al. |
| 2022/0155853 A1 | 5/2022 | Fan et al. |
| 2022/0155863 A1 | 5/2022 | Wang et al. |
| 2022/0155909 A1 | 5/2022 | Kawashima et al. |
| 2022/0157029 A1 | 5/2022 | Horita et al. |
| 2022/0157083 A1 | 5/2022 | Jandhyala et al. |
| 2022/0165013 A1 | 5/2022 | Velez et al. |
| 2022/0179503 A1 | 6/2022 | Timonen et al. |
| 2022/0187907 A1 | 6/2022 | Lee et al. |
| 2022/0191570 A1 | 6/2022 | Reid et al. |
| 2022/0197403 A1 | 6/2022 | Hughes et al. |
| 2022/0198755 A1 | 6/2022 | Pinchon |
| 2022/0206298 A1 | 6/2022 | Goodman |
| 2022/0206588 A1 | 6/2022 | Canberk et al. |
| 2022/0207840 A1 | 6/2022 | Cansizoglu et al. |
| 2022/0214743 A1 | 7/2022 | Dascola et al. |
| 2022/0221976 A1 | 7/2022 | Agarwal et al. |
| 2022/0229524 A1 | 7/2022 | Mckenzie et al. |
| 2022/0229534 A1 | 7/2022 | Terre et al. |
| 2022/0232191 A1 | 7/2022 | Kawakami et al. |
| 2022/0236801 A1 | 7/2022 | Serbanati et al. |
| 2022/0239718 A1 | 7/2022 | Song et al. |
| 2022/0244536 A1 | 8/2022 | Sha et al. |
| 2022/0245888 A1 | 8/2022 | Singh et al. |
| 2022/0252882 A1 | 8/2022 | Berliner et al. |
| 2022/0253125 A1 | 8/2022 | Wallen et al. |
| 2022/0253136 A1 | 8/2022 | Holder et al. |
| 2022/0253149 A1 | 8/2022 | Berliner et al. |
| 2022/0253194 A1 | 8/2022 | Berliner et al. |
| 2022/0255995 A1 | 8/2022 | Berliner et al. |
| 2022/0276720 A1 | 9/2022 | Yasui |
| 2022/0277533 A1 | 9/2022 | Park |
| 2022/0279303 A1 | 9/2022 | Marculescu et al. |
| 2022/0286488 A1 | 9/2022 | Berliner et al. |
| 2022/0287676 A1 | 9/2022 | Steines et al. |
| 2022/0291808 A1 | 9/2022 | Stevens et al. |
| 2022/0292783 A1 | 9/2022 | Jayaram et al. |
| 2022/0292784 A1 | 9/2022 | Jayaram et al. |
| 2022/0292785 A1 | 9/2022 | Jayaram et al. |
| 2022/0295032 A1 | 9/2022 | Jayaram et al. |
| 2022/0295040 A1 | 9/2022 | Jayaram et al. |
| 2022/0295139 A1 | 9/2022 | Jayaram et al. |
| 2022/0301264 A1 | 9/2022 | O'leary et al. |
| 2022/0303680 A1 | 9/2022 | Ahmed et al. |
| 2022/0311950 A1 | 9/2022 | Ith et al. |
| 2022/0319134 A1 | 10/2022 | Rodrigues et al. |
| 2022/0319453 A1 | 10/2022 | Llull et al. |
| 2022/0326837 A1 | 10/2022 | Dessero et al. |
| 2022/0335697 A1 | 10/2022 | Harding et al. |
| 2022/0350463 A1 | 11/2022 | Walkin et al. |

(56) References Cited

U.S. PATENT DOCUMENTS

| | | |
|---|---|---|
| 2022/0365740 A1 | 11/2022 | Chang et al. |
| 2022/0374136 A1 | 11/2022 | Chang et al. |
| 2022/0382385 A1 | 12/2022 | Chen et al. |
| 2022/0383592 A1 | 12/2022 | Hare et al. |
| 2022/0391158 A1 | 12/2022 | Lemmens et al. |
| 2022/0392169 A1 | 12/2022 | Simpson et al. |
| 2022/0397962 A1 | 12/2022 | Goel et al. |
| 2022/0408164 A1 | 12/2022 | Lee et al. |
| 2022/0413691 A1 | 12/2022 | Becker et al. |
| 2022/0414975 A1 | 12/2022 | Becker et al. |
| 2022/0414999 A1 | 12/2022 | Ravasz et al. |
| 2022/0415094 A1 | 12/2022 | Kim et al. |
| 2023/0004216 A1 | 1/2023 | Rodgers et al. |
| 2023/0007335 A1 | 1/2023 | Gupta et al. |
| 2023/0008537 A1 | 1/2023 | Henderson et al. |
| 2023/0009683 A1 | 1/2023 | Biran et al. |
| 2023/0021861 A1 | 1/2023 | Fujiwara et al. |
| 2023/0027040 A1 | 1/2023 | Wang et al. |
| 2023/0030699 A1 | 2/2023 | Zion et al. |
| 2023/0031832 A1 | 2/2023 | Lipton et al. |
| 2023/0032545 A1 | 2/2023 | Mindlin et al. |
| 2023/0032771 A1 | 2/2023 | Zion et al. |
| 2023/0068660 A1 | 3/2023 | Brent et al. |
| 2023/0069764 A1 | 3/2023 | Jonker et al. |
| 2023/0074080 A1 | 3/2023 | Miller et al. |
| 2023/0076326 A1 | 3/2023 | Xu et al. |
| 2023/0086766 A1 | 3/2023 | Olwal et al. |
| 2023/0092282 A1 | 3/2023 | Boesel et al. |
| 2023/0092874 A1 | 3/2023 | Krivoruchko et al. |
| 2023/0093979 A1 | 3/2023 | Stauber et al. |
| 2023/0094522 A1 | 3/2023 | Stauber et al. |
| 2023/0100610 A1 | 3/2023 | Pastrana Vicente et al. |
| 2023/0100689 A1 | 3/2023 | Chiu et al. |
| 2023/0103161 A1 | 3/2023 | Li et al. |
| 2023/0114080 A1 | 4/2023 | Yang et al. |
| 2023/0119162 A1 | 4/2023 | Lipton et al. |
| 2023/0120052 A1 | 4/2023 | Wallen et al. |
| 2023/0130520 A1 | 4/2023 | Kaptelinin |
| 2023/0133579 A1 | 5/2023 | Chang et al. |
| 2023/0152935 A1 | 5/2023 | Mckenzie et al. |
| 2023/0154122 A1 | 5/2023 | Dascola et al. |
| 2023/0163987 A1 | 5/2023 | Young et al. |
| 2023/0168745 A1 | 6/2023 | Yoda |
| 2023/0168788 A1 | 6/2023 | Faulkner et al. |
| 2023/0176806 A1 | 6/2023 | Chen et al. |
| 2023/0185426 A1 | 6/2023 | Rockel et al. |
| 2023/0186577 A1 | 6/2023 | Rockel et al. |
| 2023/0206572 A1 | 6/2023 | Pazmino et al. |
| 2023/0206921 A1 | 6/2023 | Edelsburg et al. |
| 2023/0221833 A1 | 7/2023 | Holder et al. |
| 2023/0236660 A1 | 7/2023 | Kundu |
| 2023/0244857 A1 | 8/2023 | Weiss et al. |
| 2023/0260240 A1 | 8/2023 | Jayaram et al. |
| 2023/0266859 A1 | 8/2023 | Day et al. |
| 2023/0274504 A1 | 8/2023 | Ren et al. |
| 2023/0290042 A1 | 9/2023 | Casella et al. |
| 2023/0308610 A1 | 9/2023 | Henderson et al. |
| 2023/0308630 A1 | 9/2023 | Delgado |
| 2023/0314801 A1 | 10/2023 | Bove et al. |
| 2023/0315270 A1 | 10/2023 | Hylak et al. |
| 2023/0315385 A1 | 10/2023 | Akmal et al. |
| 2023/0316634 A1 | 10/2023 | Chiu et al. |
| 2023/0316658 A1 | 10/2023 | Smith et al. |
| 2023/0325004 A1 | 10/2023 | Burns et al. |
| 2023/0325046 A1 | 10/2023 | De Almeida E De Vincenzo et al. |
| 2023/0333646 A1 | 10/2023 | Pastrana Vicente et al. |
| 2023/0334808 A1 | 10/2023 | Sundstrom et al. |
| 2023/0341932 A1 | 10/2023 | Silva et al. |
| 2023/0343049 A1 | 10/2023 | Boesel et al. |
| 2023/0350539 A1 | 11/2023 | Owen et al. |
| 2023/0351702 A1 | 11/2023 | Tan et al. |
| 2023/0353398 A1 | 11/2023 | White |
| 2023/0359199 A1 | 11/2023 | Adachi et al. |
| 2023/0360264 A1 | 11/2023 | Wu et al. |
| 2023/0368475 A1 | 11/2023 | Chan et al. |
| 2023/0377259 A1 | 11/2023 | Becker et al. |
| 2023/0377268 A1 | 11/2023 | Hopkins et al. |
| 2023/0377295 A1 | 11/2023 | Angevine et al. |
| 2023/0377299 A1 | 11/2023 | Becker et al. |
| 2023/0377300 A1 | 11/2023 | Becker et al. |
| 2023/0384907 A1 | 11/2023 | Boesel et al. |
| 2023/0385532 A1 | 11/2023 | Mcveigh et al. |
| 2023/0388357 A1 | 11/2023 | Faulkner et al. |
| 2023/0394755 A1 | 12/2023 | Negoita et al. |
| 2023/0396854 A1 | 12/2023 | Sanders et al. |
| 2023/0400958 A1 | 12/2023 | Morrison et al. |
| 2024/0012530 A1 | 1/2024 | Lin et al. |
| 2024/0037886 A1 | 2/2024 | Chiu et al. |
| 2024/0062279 A1 | 2/2024 | Scully et al. |
| 2024/0070948 A1 | 2/2024 | Bradley et al. |
| 2024/0086031 A1 | 3/2024 | Palangie et al. |
| 2024/0086032 A1 | 3/2024 | Palangie et al. |
| 2024/0087256 A1 | 3/2024 | Hylak et al. |
| 2024/0094863 A1 | 3/2024 | Smith et al. |
| 2024/0094866 A1 | 3/2024 | Lemay et al. |
| 2024/0094882 A1 | 3/2024 | Brewer et al. |
| 2024/0095984 A1 | 3/2024 | Ren et al. |
| 2024/0102821 A1 | 3/2024 | Vallet et al. |
| 2024/0103613 A1 | 3/2024 | Chawda et al. |
| 2024/0103616 A1 | 3/2024 | Yerkes et al. |
| 2024/0103636 A1 | 3/2024 | Lindmeier et al. |
| 2024/0103676 A1 | 3/2024 | Pastrana Vicente et al. |
| 2024/0103681 A1 | 3/2024 | Broughton et al. |
| 2024/0103684 A1 | 3/2024 | Yu et al. |
| 2024/0103685 A1 | 3/2024 | Pazmino et al. |
| 2024/0103686 A1 | 3/2024 | Pazmino et al. |
| 2024/0103687 A1 | 3/2024 | Pastrana Vicente et al. |
| 2024/0103701 A1 | 3/2024 | Pastrana Vicente et al. |
| 2024/0103704 A1 | 3/2024 | Pastrana Vicente et al. |
| 2024/0103707 A1 | 3/2024 | Henderson et al. |
| 2024/0103716 A1 | 3/2024 | Pastrana Vicente et al. |
| 2024/0103803 A1 | 3/2024 | Krivoruchko et al. |
| 2024/0104836 A1 | 3/2024 | Dessero et al. |
| 2024/0104843 A1 | 3/2024 | Mckenzie et al. |
| 2024/0104870 A1 | 3/2024 | Fuste Lleixa et al. |
| 2024/0104873 A1 | 3/2024 | Pastrana Vicente et al. |
| 2024/0104875 A1 | 3/2024 | Couche et al. |
| 2024/0104876 A1 | 3/2024 | Couche et al. |
| 2024/0104877 A1 | 3/2024 | Henderson et al. |
| 2024/0111479 A1 | 4/2024 | Paul |
| 2024/0119682 A1 | 4/2024 | Rudman et al. |
| 2024/0126362 A1 | 4/2024 | Burns et al. |
| 2024/0135612 A1 | 4/2024 | Hold-geoffroy et al. |
| 2024/0152245 A1 | 5/2024 | Broughton et al. |
| 2024/0152256 A1 | 5/2024 | Dascola et al. |
| 2024/0185514 A1 | 6/2024 | Singh et al. |
| 2024/0192764 A1 | 6/2024 | Dascola et al. |
| 2024/0193892 A1 | 6/2024 | Lutter et al. |
| 2024/0200967 A1 | 6/2024 | Arroyo et al. |
| 2024/0203066 A1 | 6/2024 | Kawashima et al. |
| 2024/0205509 A1 | 6/2024 | Kim et al. |
| 2024/0221273 A1 | 7/2024 | Dusseau et al. |
| 2024/0221291 A1 | 7/2024 | Henderson et al. |
| 2024/0233097 A1 | 7/2024 | Ngo et al. |
| 2024/0233288 A1 | 7/2024 | Stauber et al. |
| 2024/0256032 A1 | 8/2024 | Holder et al. |
| 2024/0265656 A1 | 8/2024 | Victor-faichney et al. |
| 2024/0272722 A1 | 8/2024 | Gitter et al. |
| 2024/0272782 A1 | 8/2024 | Pastrana Vicente et al. |
| 2024/0273838 A1 | 8/2024 | Palangie et al. |
| 2024/0281108 A1 | 8/2024 | Krivoruchko et al. |
| 2024/0281109 A1 | 8/2024 | Manjunath et al. |
| 2024/0291953 A1 | 8/2024 | Cerra et al. |
| 2024/0297919 A1 | 9/2024 | Berliner et al. |
| 2024/0302948 A1 | 9/2024 | Hylak et al. |
| 2024/0310971 A1 | 9/2024 | Kawashima et al. |
| 2024/0338104 A1 | 10/2024 | Salter et al. |
| 2024/0338921 A1 | 10/2024 | Burgner et al. |
| 2024/0361832 A1 | 10/2024 | Calderone et al. |
| 2024/0361833 A1 | 10/2024 | Calderone et al. |
| 2024/0361835 A1 | 10/2024 | Hylak et al. |
| 2024/0361901 A1 | 10/2024 | Ravasz et al. |
| 2024/0393876 A1 | 11/2024 | Chawda et al. |

(56) References Cited

U.S. PATENT DOCUMENTS

| | | |
|---|---|---|
| 2024/0402800 A1 | 12/2024 | Shutzberg et al. |
| 2024/0402821 A1 | 12/2024 | Meyer et al. |
| 2024/0403080 A1 | 12/2024 | Laurita et al. |
| 2024/0404206 A1 | 12/2024 | Chiu et al. |
| 2024/0404207 A1 | 12/2024 | Laurita et al. |
| 2024/0404232 A1 | 12/2024 | Rockwell et al. |
| 2024/0404233 A1 | 12/2024 | Boesel et al. |
| 2024/0411444 A1 | 12/2024 | Shutzberg et al. |
| 2024/0420435 A1 | 12/2024 | Gitter et al. |
| 2024/0428488 A1 | 12/2024 | Ren et al. |
| 2025/0005855 A1 | 1/2025 | Holder et al. |
| 2025/0005864 A1 | 1/2025 | Dessero et al. |
| 2025/0008057 A1 | 1/2025 | Chiu et al. |
| 2025/0013343 A1 | 1/2025 | Smith et al. |
| 2025/0013344 A1 | 1/2025 | Smith et al. |
| 2025/0024008 A1 | 1/2025 | Cerra et al. |
| 2025/0028423 A1 | 1/2025 | Dessero et al. |
| 2025/0029319 A1 | 1/2025 | Boesel et al. |
| 2025/0029328 A1 | 1/2025 | Smith et al. |
| 2025/0031002 A1 | 1/2025 | Hawkins et al. |
| 2025/0036255 A1 | 1/2025 | Pastrana Vicente et al. |
| 2025/0069328 A1 | 2/2025 | Herscher et al. |
| 2025/0077060 A1 | 3/2025 | Becker et al. |
| 2025/0077066 A1 | 3/2025 | Lutter |
| 2025/0078420 A1 | 3/2025 | Dessero et al. |
| 2025/0078429 A1 | 3/2025 | Dascola et al. |
| 2025/0103132 A1 | 3/2025 | Rickwald et al. |
| 2025/0104335 A1 | 3/2025 | Huang et al. |
| 2025/0104367 A1 | 3/2025 | Huang et al. |
| 2025/0106581 A1 | 3/2025 | Lutter et al. |
| 2025/0106582 A1 | 3/2025 | Lutter et al. |
| 2025/0110605 A1 | 4/2025 | Huang et al. |
| 2025/0111472 A1 | 4/2025 | Lutter et al. |
| 2025/0111605 A1 | 4/2025 | Huang et al. |
| 2025/0111622 A1 | 4/2025 | Stern et al. |
| 2025/0111626 A1 | 4/2025 | Deliz Centeno et al. |
| 2025/0117079 A1 | 4/2025 | Chiu et al. |
| 2025/0118038 A1 | 4/2025 | Sorrentino et al. |
| 2025/0130707 A1 | 4/2025 | Stauber et al. |
| 2025/0156031 A1 | 5/2025 | Holder et al. |
| 2025/0157136 A1 | 5/2025 | Lindmeier et al. |
| 2025/0165069 A1 | 5/2025 | Calderone et al. |
| 2025/0199656 A1 | 6/2025 | Lipton et al. |
| 2025/0200901 A1 | 6/2025 | Ren et al. |
| 2025/0209744 A1 | 6/2025 | Piemonte et al. |
| 2025/0209753 A1 | 6/2025 | Piemonte et al. |
| 2025/0224811 A1 | 7/2025 | Lindmeier et al. |
| 2025/0232541 A1 | 7/2025 | Chand et al. |
| 2025/0258577 A1 | 8/2025 | Palangie et al. |
| 2025/0278134 A1 | 9/2025 | Pastrana Vicente et al. |
| 2025/0278166 A1 | 9/2025 | Mckenzie et al. |
| 2025/0278907 A1 | 9/2025 | Pazmino et al. |
| 2025/0284344 A1 | 9/2025 | Sundstrom et al. |
| 2025/0291470 A1 | 9/2025 | Hylak et al. |
| 2025/0306727 A1 | 10/2025 | Kawashima et al. |
| 2025/0322612 A1 | 10/2025 | Cerra et al. |

FOREIGN PATENT DOCUMENTS

| | | |
|---|---|---|
| CN | 102298493 A | 12/2011 |
| CN | 104714771 A | 6/2015 |
| CN | 104981681 A | 10/2015 |
| CN | 105264461 A | 1/2016 |
| CN | 105264478 A | 1/2016 |
| CN | 106575149 A | 4/2017 |
| CN | 106990838 A | 7/2017 |
| CN | 108519818 A | 9/2018 |
| CN | 108563335 A | 9/2018 |
| CN | 108633307 A | 10/2018 |
| CN | 110413171 A | 11/2019 |
| CN | 110476142 A | 11/2019 |
| CN | 110543230 A | 12/2019 |
| CN | 110673718 A | 1/2020 |
| CN | 110830786 A | 2/2020 |
| CN | 111033572 A | 4/2020 |
| CN | 111213183 A | 5/2020 |
| CN | 111488056 A | 8/2020 |
| CN | 111580652 A | 8/2020 |
| CN | 111641843 A | 9/2020 |
| CN | 111913565 A | 11/2020 |
| CN | 112068757 A | 12/2020 |
| CN | 113168737 A | 7/2021 |
| CN | 109491508 B | 8/2022 |
| CN | 115309271 A | 11/2022 |
| CN | 116132905 A | 5/2023 |
| CN | 117043722 A | 11/2023 |
| CN | 117857981 A | 4/2024 |
| CN | 118102204 A | 5/2024 |
| DE | 102016125811 A1 | 11/2017 |
| DE | 102020101675 A1 | 7/2020 |
| DE | 102020128536 A1 | 5/2021 |
| EP | 1562021 A1 | 8/2005 |
| EP | 2393056 A1 | 12/2011 |
| EP | 2458486 A1 | 5/2012 |
| EP | 2741175 A2 | 6/2014 |
| EP | 2893297 A1 | 7/2015 |
| EP | 2947545 A1 | 11/2015 |
| EP | 3088997 A1 | 11/2016 |
| EP | 3118722 A1 | 1/2017 |
| EP | 3249497 A1 | 11/2017 |
| EP | 3306444 A1 | 4/2018 |
| EP | 3316075 A1 | 5/2018 |
| EP | 3336805 A1 | 6/2018 |
| EP | 3451135 A1 | 3/2019 |
| EP | 3503101 A1 | 6/2019 |
| EP | 3506151 A1 | 7/2019 |
| EP | 3570144 A1 | 11/2019 |
| EP | 3588255 A1 | 1/2020 |
| EP | 3654147 A1 | 5/2020 |
| EP | 4155867 A1 | 3/2023 |
| EP | 3688726 B1 | 8/2023 |
| GB | 2540791 A | 2/2017 |
| JP | H10-51711 A | 2/1998 |
| JP | H10-78845 A | 3/1998 |
| JP | H11-289555 A | 10/1999 |
| JP | 2004-510239 A | 4/2004 |
| JP | 2005-215144 A | 8/2005 |
| JP | 2005-333524 A | 12/2005 |
| JP | 2006-4093 A | 1/2006 |
| JP | 2006-146803 A | 6/2006 |
| JP | 2006-295236 A | 10/2006 |
| JP | 2012-234550 A | 11/2012 |
| JP | 2013-178639 A | 9/2013 |
| JP | 2013-196158 A | 9/2013 |
| JP | 2013-254358 A | 12/2013 |
| JP | 2013-257716 A | 12/2013 |
| JP | 2014-59840 A | 4/2014 |
| JP | 2014-71663 A | 4/2014 |
| JP | 2014-99184 A | 5/2014 |
| JP | 2014-514652 A | 6/2014 |
| JP | 2014-514653 A | 6/2014 |
| JP | 2015-515040 A | 5/2015 |
| JP | 2015-118332 A | 6/2015 |
| JP | 2015-222565 A | 12/2015 |
| JP | 2016-96513 A | 5/2016 |
| JP | 2016-194744 A | 11/2016 |
| JP | 2017-27206 A | 2/2017 |
| JP | 2017-58528 A | 3/2017 |
| JP | 2017-126009 A | 7/2017 |
| JP | 2017-525002 A | 8/2017 |
| JP | 2017-531221 A | 10/2017 |
| JP | 2018-5516 A | 1/2018 |
| JP | 2018-5517 A | 1/2018 |
| JP | 2018-514005 A | 5/2018 |
| JP | 2018-88118 A | 6/2018 |
| JP | 2018-101019 A | 6/2018 |
| JP | 2018-106499 A | 7/2018 |
| JP | 6438869 B2 | 12/2018 |
| JP | 2019-515361 A | 6/2019 |
| JP | 2019-169154 A | 10/2019 |
| JP | 2019-175449 A | 10/2019 |
| JP | 2019-527881 A | 10/2019 |
| JP | 2019-532382 A | 11/2019 |
| JP | 2020-503595 A | 1/2020 |

(56) References Cited

FOREIGN PATENT DOCUMENTS

| | | | |
|---|---|---|---|
| JP | 2020-86913 A | 6/2020 | |
| JP | 2022-53334 A | 4/2022 | |
| JP | 2022-175629 A | 11/2022 | |
| JP | 2023-52278 A | 4/2023 | |
| KR | 10-2011-0017236 A | 2/2011 | |
| KR | 10-2011-0128487 A | 11/2011 | |
| KR | 10-2014-0097654 A | 8/2014 | |
| KR | 10-2016-0012139 A | 2/2016 | |
| KR | 10-2017-0027240 A | 3/2017 | |
| KR | 10-2018-0102171 A | 9/2018 | |
| KR | 10-2019-0100957 A | 8/2019 | |
| KR | 10-2020-0010296 A | 1/2020 | |
| KR | 10-2020-0035103 A | 4/2020 | |
| KR | 10-2020-0110788 A | 9/2020 | |
| KR | 10-2020-0135496 A | 12/2020 | |
| KR | 10-2020-0140378 A | 12/2020 | |
| KR | 10-2021-0083016 A | 7/2021 | |
| KR | 10-2021-0123530 A | 10/2021 | |
| WO | 2010/026519 A1 | 3/2010 | |
| WO | 2012/145180 A1 | 10/2012 | |
| WO | 2013/184447 A2 | 12/2013 | |
| WO | 2014/190106 A1 | 11/2014 | |
| WO | 2015/130150 A1 | 9/2015 | |
| WO | 2015/192117 A1 | 12/2015 | |
| WO | 2016/014877 A1 | 1/2016 | |
| WO | 2016/118344 A1 | 7/2016 | |
| WO | 2016/126522 A1 | 8/2016 | |
| WO | 2017/024142 A1 | 2/2017 | |
| WO | 2017/088487 A1 | 6/2017 | |
| WO | 2018/005557 A1 | 1/2018 | |
| WO | 2018/090060 A1 | 5/2018 | |
| WO | 2018/106299 A1 | 6/2018 | |
| WO | 2018/116556 A1 | 6/2018 | |
| WO | 2018/125428 A1 | 7/2018 | |
| WO | 2018/175735 A1 | 9/2018 | |
| WO | 2018/213801 A1 | 11/2018 | |
| WO | 2019/067902 A1 | 4/2019 | |
| WO | 2019/074771 A1 | 4/2019 | |
| WO | 2019/142560 A1 | 7/2019 | |
| WO | 2019/152286 A2 | 8/2019 | |
| WO | 2019/172678 A1 | 9/2019 | |
| WO | 2019/213111 A1 | 11/2019 | |
| WO | 2019/217163 A1 | 11/2019 | |
| WO | 2020/066682 A1 | 4/2020 | |
| WO | 2020/105349 A1 | 5/2020 | |
| WO | 2020/121483 A1 | 6/2020 | |
| WO | 2020/179027 A1 | 9/2020 | |
| WO | 2020/247256 A1 | 12/2020 | |
| WO | 2021/061349 A1 | 4/2021 | |
| WO | 2021/061351 A1 | 4/2021 | |
| WO | 2021/133053 A1 | 7/2021 | |
| WO | 2021/173839 A1 | 9/2021 | |
| WO | 2021/202783 A1 | 10/2021 | |
| WO | 2021/203856 A1 | 10/2021 | |
| WO | 2022/046340 A1 | 3/2022 | |
| WO | 2022/055821 A1 | 3/2022 | |
| WO | 2022/055822 A1 | 3/2022 | |
| WO | 2022/066399 A1 | 3/2022 | |
| WO | 2022/066535 A2 | 3/2022 | |
| WO | 2022/067075 A1 | 3/2022 | |
| WO | 2022/067343 A2 | 3/2022 | |
| WO | 2022/072187 A2 | 4/2022 | |
| WO | 2022/146936 A1 | 7/2022 | |
| WO | 2022/146938 A1 | 7/2022 | |
| WO | 2022/147146 A1 | 7/2022 | |
| WO | 2022/164881 A1 | 8/2022 | |
| WO | 2022/192040 A1 | 9/2022 | |
| WO | 2022/204664 A1 | 9/2022 | |
| WO | 2022/208797 A1 | 10/2022 | |
| WO | 2022/225795 A1 | 10/2022 | |
| WO | 2023/043646 A1 | 3/2023 | |
| WO | 2023/096940 A2 | 6/2023 | |
| WO | 2023/141535 A1 | 7/2023 | |
| WO | 2024/064036 A1 | 3/2024 | |
| WO | 2024/064373 A1 | 3/2024 | |

OTHER PUBLICATIONS

Corrected Notice of Allowability received for U.S. Appl. No. 17/448,875, mailed on Apr. 24, 2024, 4 pages.
Corrected Notice of Allowability received for U.S. Appl. No. 17/479,791, mailed on May 19, 2023, 2 pages.
Corrected Notice of Allowability received for U.S. Appl. No. 17/659,147, mailed on Feb. 14, 2024, 6 pages.
Corrected Notice of Allowability received for U.S. Appl. No. 17/932,655, mailed on Oct. 12, 2023, 2 pages.
Corrected Notice of Allowability received for U.S. Appl. No. 18/465,098, mailed on Mar. 13, 2024, 3 pages.
Corrected Notice of Allowance received for U.S. Appl. No. 17/478,593, mailed on Dec. 21, 2022, 2 pages.
European Search Report received for European Patent Application No. 21791153.6, mailed on Mar. 22, 2024, 5 pages.
Extended European Search Report received for European Patent Application No. 23158818.7, mailed on Jul. 3, 2023, 12 pages.
Extended European Search Report received for European Patent Application No. 23158929.2, mailed on Jun. 27, 2023, 12 pages.
Extended European Search Report received for European Patent Application No. 23197572.3, mailed on Feb. 19, 2024, 7 pages.
Final Office Action received for U.S. Appl. No. 17/448,875, mailed on Mar. 16, 2023, 24 pages.
Final Office Action received for U.S. Appl. No. 17/580,495, mailed on May 13, 2024, 29 pages.
Final Office Action received for U.S. Appl. No. 17/659,147, mailed on Oct. 4, 2023, 17 pages.
Final Office Action received for U.S. Appl. No. 18/182,300, mailed on Feb. 16, 2024, 32 pages.
Home | Virtual Desktop [online], Virtual Desktop, Available online at: <https://www.vrdesktop.net>, [retrieved on Jun. 29, 2023], 4 pages.
International Search Report for PCT Application No. PCT/US2022/076608, mailed Feb. 24, 2023, 8 pages.
International Search Report received for PCT Application No. PCT/US2022/076603, mailed on Jan. 9, 2023, 4 pages.
International Search Report received for PCT Application No. PCT/US2022/076719, mailed on Mar. 3, 2023, 8 pages.
International Search Report received for PCT Application No. PCT/US2023/017335, mailed on Aug. 22, 2023, 6 pages.
International Search Report received for PCT Application No. PCT/US2023/018213, mailed on Jul. 26, 2023, 6 pages.
International Search Report received for PCT Application No. PCT/US2023/019458, mailed on Aug. 8, 2023, 7 pages.
International Search Report received for PCT Application No. PCT/US2023/060943, mailed on Jun. 6, 2023, 7 pages.
International Search Report received for PCT Patent Application No. PCT/US2021/049130, mailed on Dec. 7, 2021, 4 pages.
International Search Report received for PCT Patent Application No. PCT/US2021/049131, mailed on Dec. 21, 2021, 4 pages.
International Search Report received for PCT Patent Application No. PCT/US2021/050948, mailed on Mar. 4, 2022, 6 pages.
International Search Report received for PCT Patent Application No. PCT/US2021/065240, mailed on May 23, 2022, 6 pages.
International Search Report received for PCT Patent Application No. PCT/US2021/071518, mailed on Feb. 25, 2022, 7 pages.
International Search Report received for PCT Patent Application No. PCT/US2021/071595, mailed on Mar. 17, 2022, 7 pages.
International Search Report received for PCT Patent Application No. PCT/US2021/071596, mailed on Apr. 8, 2022, 7 pages.
International Search Report received for PCT Patent Application No. PCT/US2022/013208, mailed on Apr. 26, 2022, 7 pages.
International Search Report received for PCT Patent Application No. PCT/US2022/071704, mailed on Aug. 26, 2022, 6 pages.
International Search Report received for PCT Patent Application No. PCT/US2023/074257, mailed on Nov. 21, 2023, 5 pages.
International Search Report received for PCT Patent Application No. PCT/US2023/074950, mailed on Jan. 3, 2024, 9 pages.
International Search Report received for PCT Patent Application No. PCT/US2023/074979, mailed on Feb. 26, 2024, 6 pages.
International Search Report received for PCT Patent Application No. PCT/US2021/065242, mailed on Apr. 4, 2022, 3 pages.

(56) References Cited

OTHER PUBLICATIONS

Non-Final Office Action received for U.S. Appl. No. 17/448,875, mailed on Oct. 6, 2022, 25 pages.
Non-Final Office Action received for U.S. Appl. No. 17/448,875, mailed on Sep. 29, 2023, 30 pages.
Non-Final Office Action received for U.S. Appl. No. 17/479,791, mailed on May 11, 2022, 18 pages.
Non-Final Office Action received for U.S. Appl. No. 17/580,495, mailed on Dec. 11, 2023, 27 pages.
Non-Final Office Action received for U.S. Appl. No. 17/659,147, mailed on Mar. 16, 2023, 19 pages.
Non-Final Office Action received for U.S. Appl. No. 17/932,655, mailed on Apr. 20, 2023, 10 pages.
Non-Final Office Action received for U.S. Appl. No. 17/932,999, mailed on Feb. 23, 2024, 22 pages.
Non-Final Office Action received for U.S. Appl. No. 18/157,040, mailed on May 2, 2024, 25 pages.
Non-Final Office Action received for U.S. Appl. No. 18/182,300, mailed on May 29, 2024, 33 pages.
Non-Final Office Action received for U.S. Appl. No. 18/182,300, mailed on Oct. 26, 2023, 29 pages.
Non-Final Office Action received for U.S. Appl. No. 18/305,201, mailed on May 23, 2024, 11 pages.
Non-Final Office Action received for U.S. Appl. No. 18/336,770, mailed on Jun. 5, 2024, 12 pages.
Notice of Allowance received for U.S. Appl. No. 17/448,875, mailed on Apr. 17, 2024, 8 pages.
Notice of Allowance received for U.S. Appl. No. 17/448,876, mailed on Apr. 7, 2022, 9 pages.
Notice of Allowance received for U.S. Appl. No. 17/448,876, mailed on Jul. 20, 2022, 8 pages.
Notice of Allowance received for U.S. Appl. No. 17/478,593, mailed on Aug. 31, 2022, 10 pages.
Notice of Allowance received for U.S. Appl. No. 17/479,791, mailed on Mar. 13, 2023, 9 pages.
Notice of Allowance received for U.S. Appl. No. 17/479,791, mailed on Nov. 17, 2022, 9 pages.
Notice of Allowance received for U.S. Appl. No. 17/580,495, mailed on Jun. 6, 2023, 6 pages.
Notice of Allowance received for U.S. Appl. No. 17/580,495, mailed on Nov. 30, 2022, 12 pages.
Notice of Allowance received for U.S. Appl. No. 17/650,775, mailed on Jan. 25, 2024, 10 pages.
Notice of Allowance received for U.S. Appl. No. 17/650,775, mailed on Sep. 18, 2023, 10 pages.
Notice of Allowance received for U.S. Appl. No. 17/659,147, mailed on Jan. 26, 2024, 13 pages.
Notice of Allowance received for U.S. Appl. No. 17/659,147, mailed on May 29, 2024, 13 pages.
Notice of Allowance received for U.S. Appl. No. 17/932,655, mailed on Jan. 24, 2024, 7 pages.
Notice of Allowance received for U.S. Appl. No. 17/932,655, mailed on Sep. 29, 2023, 7 pages.
Notice of Allowance received for U.S. Appl. No. 17/933,707, mailed on Jun. 28, 2024, 8 pages.
Notice of Allowance received for U.S. Appl. No. 17/933,707, mailed on Mar. 6, 2024, 9 pages.
Notice of Allowance received for U.S. Appl. No. 18/154,757, mailed on Jan. 23, 2024, 10 pages.
Notice of Allowance received for U.S. Appl. No. 18/154,757, mailed on May 10, 2024, 12 pages.
Notice of Allowance received for U.S. Appl. No. 18/182,304, mailed on Jan. 24, 2024, 9 pages.
Notice of Allowance received for U.S. Appl. No. 18/182,304, mailed on Oct. 2, 2023, 9 pages.
Notice of Allowance received for U.S. Appl. No. 18/421,675, mailed on Apr. 11, 2024, 9 pages.
Notice of Allowance received for U.S. Appl. No. 18/423,187, mailed on Jun. 5, 2024, 9 pages.
Notice of Allowance received for U.S. Appl. No. 18/463,739, mailed on Feb. 1, 2024, 10 pages.
Notice of Allowance received for U.S. Appl. No. 18/463,739, mailed on Jun. 17, 2024, 9 pages.
Notice of Allowance received for U.S. Appl. No. 18/463,739, mailed on Oct. 30, 2023, 11 pages.
Notice of Allowance received for U.S. Appl. No. 18/465,098, mailed on Jun. 20, 2024, 8 pages.
Notice of Allowance received for U.S. Appl. No. 18/465,098, mailed on Mar. 4, 2024, 6 pages.
Notice of Allowance received for U.S. Appl. No. 18/465,098, mailed on Nov. 17, 2023, 8 pages.
Restriction Requirement received for U.S. Appl. No. 17/932,999, mailed on Oct. 3, 2023, 6 pages.
Search Report received for Chinese Patent Application No. 202310873465.7, mailed on Feb. 1, 2024, 5 pages (2 pages of English Translation and 3 pages of Official Copy).
Bhowmick Shimmila, "Explorations on Body-Gesture Based Object Selection on HMD Based VR Interfaces for Dense and Occluded Dense Virtual Environments", Report: State of the Art Seminar, Department of Design Indian Institute of Technology, Guwahati, Nov. 2018, 25 pages.
Bolt et al., "Two-Handed Gesture in Multi-Modal Natural Dialog", Uist '92, 5th Annual Symposium on User Interface Software and Technology. Proceedings of the ACM Symposium on User Interface Software and Technology, Monterey, Nov. 15-18, 1992, pp. 7-14.
Brennan Dominic, "4 Virtual Reality Desktops for Vive, Rift, and Windows VR Compared", [online]. Road to VR, Available online at: <https://www.roadtovr.com/virtual-reality-desktop-compared-oculus-rift-htc-vive/>, [retrieved on Jun. 29, 2023], Jan. 3, 2018, 4 pages.
Camalich Sergio, "CSS Buttons with Pseudo-elements", Available online at: <https://tympanus.net/codrops/2012/01/11/css-buttons-with-pseudo-elements/>, [retrieved on Jul. 12, 2017], Jan. 11, 2012, 8 pages.
Chatterjee et al., "Gaze+Gesture: Expressive, Precise and Targeted Free-Space Interactions", ICMI '15, Nov. 9-13, 2015, 8 pages.
Lin et al., "Towards Naturally Grabbing and Moving Objects in VR", IS&T International Symposium on Electronic Imaging and the Engineering Reality of Virtual Reality, 2016, 6 pages.
Mcgill et al., "Expanding the Bounds of Seated Virtual Workspaces", University of Glasgow, Available online at: <https://core.ac.uk/download/pdf/323988271.pdf>, [retrieved on Jun. 27, 2023], Jun. 5, 2020, 44 pages.
Pfeuffer et al., "Gaze + Pinch Interaction in Virtual Reality", In Proceedings of SUI '17, Brighton, United Kingdom, Oct. 16-17, 2017, pp. 99-108.
Simple Modal Window With Background Blur Effect, Available online at: <http://web.archive.org/web/20160313233427/https://www.cssscript.com/simple-modal-window-with-background-blur-effect/>, Mar. 13, 2016, 5 pages.
Yamada Yoshihiro, "How to Generate a Modal Window with ModalPopup Control", Available online at: <http://web.archive.org/web/20210920015801/https://atmarkit.itmedia.co.jp/fdotnet/dotnettips/580aspajaxmodalpopup/aspajaxmodalpopup.html > [Search Date Aug. 22, 2023], Sep. 20, 2021, 8 pages (1 page of English Abstract and 7 pages of Official Copy).
Corrected Notice of Allowability received for U.S. Appl. No. 17/932,999, mailed on Jan. 23, 2025, 9 pages.
Corrected Notice of Allowability received for U.S. Appl. No. 17/935,095, mailed on Oct. 18, 2024, 3 pages.
Corrected Notice of Allowability received for U.S. Appl. No. 18/174,337, mailed on Jan. 15, 2025, 2 pages.
Extended European Search Report received for European Patent Application No. 24178730.8, mailed on Oct. 14, 2024, 8 pages.
Extended European Search Report received for European Patent Application No. 24178752.2, mailed on Oct. 4, 2024, 8 pages.
Extended European Search Report received for European Patent Application No. 24179233.2, mailed on Oct. 2, 2024, 10 pages.
Extended European Search Report received for European Patent Application No. 24190323.6, mailed on Dec. 12, 2024, 9 pages.
Final Office Action received for U.S. Appl. No. 17/202,034, mailed on Nov. 4, 2024, 50 pages.

(56) References Cited

OTHER PUBLICATIONS

Final Office Action received for U.S. Appl. No. 17/935,095, mailed on Dec. 29, 2023, 15 pages.
Final Office Action received for U.S. Appl. No. 18/157,040, mailed on Dec. 2, 2024, 25 pages.
Final Office Action received for U.S. Appl. No. 18/473,196, mailed on Dec. 6, 2024, 22 pages.
International Search Report received for PCT Application No. PCT/US2023/074962, mailed on Jan. 19, 2024, 9 pages.
International Search Report received for PCT Application No. PCT/US2024/030107, mailed on Oct. 23, 2024, 9 pages.
International Search Report received for PCT Application No. PCT/US2024/032314, mailed on Nov. 11, 2024, 6 pages.
International Search Report received for PCT Application No. PCT/US2024/032451, mailed on Nov. 15, 2024, 6 pages.
International Search Report received for PCT Application No. PCT/US2024/032456, mailed on Nov. 14, 2024, 6 pages.
International Search Report received for PCT Patent Application No. PCT/US2022/076985, mailed on Feb. 20, 2023, 5 pages.
International Search Report received for PCT Patent Application No. PCT/US2023/074793, mailed on Feb. 6, 2024, 6 pages.
International Search Report received for PCT Patent Application No. PCT/US2024/039190, mailed on Nov. 22, 2024, 5 pages.
Non-Final Office Action received for U.S. Appl. No. 17/935,095, mailed on Jun. 22, 2023, 15 pages.
Non-Final Office Action received for U.S. Appl. No. 18/149,640, mailed on Jan. 15, 2025, 17 pages.
Non-Final Office Action received for U.S. Appl. No. 18/322,469, mailed on Nov. 15, 2024, 34 pages.
Non-Final Office Action received for U.S. Appl. No. 18/375,280, mailed on Nov. 27, 2024, 17 pages.
Non-Final Office Action received for U.S. Appl. No. 18/473,196, mailed on Aug. 16, 2024, 21 pages.
Notice of Allowance received for U.S. Appl. No. 17/935,095, mailed on Jul. 3, 2024, 9 pages.
Notice of Allowance received for U.S. Appl. No. 18/154,697, mailed on Aug. 6, 2024, 8 pages.
Notice of Allowance received for U.S. Appl. No. 18/154,697, mailed on Dec. 3, 2024, 7 pages.
Notice of Allowance received for U.S. Appl. No. 18/154,757, mailed on Jan. 23, 2025, 12 pages.
Notice of Allowance received for U.S. Appl. No. 18/174,337, mailed on Jan. 2, 2025, 8 pages.
Notice of Allowance received for U.S. Appl. No. 18/336,770, mailed on Nov. 29, 2024, 9 pages.
Notice of Allowance received for U.S. Appl. No. 18/515,188, mailed on Nov. 27, 2024, 9 pages.
Notice of Allowance received for U.S. Appl. No. 18/671,936, mailed on Jan. 15, 2025, 9 pages.
Restriction Requirement received for U.S. Appl. No. 18/473,187, mailed on Dec. 30, 2024, 5 pages.
Supplemental Notice of Allowance received for U.S. Appl. No. 18/515,188, mailed on Dec. 12, 2024, 2 pages.
Pfeiffer, et al., Gaze and Touch Interaction on Tablets, UIST '16, Tokyo, Japan, ACM, Oct. 16-19, 2016, pp. 301-311.
Schenk, et al., SPOCK: A Smooth Pursuit Oculomotor Control Kit, CHI'16 Extended Abstracts, San Jose, CA, USA, ACM, May 7-12, 2016, pp. 2681-2687.
Corrected Notice of Allowability received for U.S. Appl. No. 18/154,757, mailed on Aug. 30, 2024, 2 pages.
Corrected Notice of Allowability received for U.S. Appl. No. 18/421,827, mailed on Aug. 29, 2024, 2 pages.
Corrected Notice of Allowability received for U.S. Appl. No. 18/463,739, mailed on Oct. 4, 2024, 2 pages.
European Search Report received for European Patent Application No. 21801378.7, mailed on Jul. 10, 2024, 5 pages.
Extended European Search Report received for European Patent Application No. 24159868.9, mailed on Oct. 9, 2024, 13 pages.
Extended European Search Report received for European Patent Application No. 24179830.5, mailed on Nov. 5, 2024, 11 Pages.
Final Office Action received for U.S. Appl. No. 18/182,300, mailed on Oct. 31, 2024, 34 pages.
Final Office Action received for U.S. Appl. No. 18/375,280, mailed on Jul. 12, 2024, 19 pages.
International Search Report received for PCT Patent Application No. PCT/US2024/013602, mailed on Apr. 29, 2024, 4 pages.
International Search Report received for PCT Patent Application No. PCT/US2024/026102, mailed on Aug. 26, 2024, 5 pages.
Non-Final Office Action received for U.S. Appl. No. 17/580,495, mailed on Aug. 15, 2024, 28 pages.
Non-Final Office Action received for U.S. Appl. No. 18/327,318, mailed on Sep. 16, 2024, 13 pages.
Notice of Allowance received for U.S. Appl. No. 18/154,757, mailed on Aug. 26, 2024, 12 pages.
Notice of Allowance received for U.S. Appl. No. 17/448,875, mailed on Jul. 12, 2024, 8 pages.
Notice of Allowance received for U.S. Appl. No. 17/932,999, mailed on Sep. 12, 2024, 9 pages.
Notice of Allowance received for U.S. Appl. No. 18/421,675, mailed on Jul. 31, 2024, 8 pages.
Notice of Allowance received for U.S. Appl. No. 18/421,827, mailed on Aug. 14, 2024, 10 pages.
Extended European Search Report received for European Patent Application No. 25169060.8, mailed on May 12, 2025, 10 pages.
Extended European Search Report received for European Patent Application No. 25169059.0, mailed on May 12, 2025, 11 pages.
Non-Final Office Action received for U.S. Appl. No. 18/473,197, mailed on May 1, 2025, 14 pages.
Non-Final Office Action received for U.S. Appl. No. 18/896,227, mailed on May 29, 2025, 14 pages.
Notice of Allowance received for U.S. Appl. No. 18/322,469, mailed on Mar. 19, 2025, 14 pages.
Non-Final Office Action received for U.S. Appl. No. 18/473,187, mailed on May 16, 2025, 15 pages.
Non-Final Office Action received for U.S. Appl. No. 18/467,523, mailed on Jun. 17, 2025, 19 pages.
Non-Final Office Action received for U.S. Appl. No. 18/471,729, mailed on Jun. 17, 2025, 19 pages.
Corrected Notice of Allowability received for U.S. Appl. No. 18/146,234, mailed on Mar. 20, 2025, 2 pages.
Corrected Notice of Allowability received for U.S. Appl. No. 18/473,180, mailed on Apr. 1, 2025, 2 pages.
Non-Final Office Action received for U.S. Appl. No. 18/473,176, mailed on May 14, 2025, 23 pages.
Final Office Action received for U.S. Appl. No. 18/149,640, mailed on May 21, 2025, 24 pages.
Non-Final Office Action received for U.S. Appl. No. 18/317,890, mailed on Apr. 17, 2025, 26 pages.
Non-Final Office Action received for U.S. Appl. No. 18/327,844, mailed on Mar. 24, 2025, 27 pages.
Final Office Action received for U.S. Appl. No. 17/933,020, mailed on May 21, 2025, 28 pages.
Non-Final Office Action received for U.S. Appl. No. 18/317,886, mailed on Apr. 30, 2025, 34 pages.
European Search Report received for European Patent Application No. 22723527.2, mailed on May 12, 2025, 4 pages.
International Search Report received for PCT Patent Application No. PCT/US2023/074978, mailed on Apr. 4, 2024, 4 pages.
International Search Report received for PCT Patent Application No. PCT/US2024/012828, mailed on May 6, 2024, 4 pages.
International Search Report received for PCT Patent Application No. PCT/US2024/032109, mailed on Sep. 13, 2024, 4 pages.
International Search Report received for PCT Patent Application No. PCT/US2024/043470, mailed on Oct. 29, 2024, 4 pages.
Non-Final Office Action received for U.S. Appl. No. 17/202,034, mailed on Jun. 4, 2025, 40 pages.
Final Office Action received for U.S. Appl. No. 18/645,292, mailed on Jun. 2, 2025, 41 pages.
Notice of Allowance received for U.S. Appl. No. 18/424,644, mailed on Jun. 11, 2025, 6 pages.
International Search Report received for PCT Patent Application No. PCT/US2023/074960, mailed on Feb. 12, 2024, 6 pages.

(56) References Cited

OTHER PUBLICATIONS

International Search Report received for PCT Patent Application No. PCT/US2024/032153, mailed on Nov. 11, 2024, 6 pages.
Extended European Search Report received for European Patent Application No. 24221722.2, mailed on Apr. 17, 2025, 7 pages.
International Search Report received for PCT Patent Application No. PCT/US2023/074973, mailed on Mar. 7, 2024, 7 pages.
Notice of Allowance received for U.S. Appl. No. 18/153,943, mailed on Jun. 17, 2025, 7 pages.
Non-Final Office Action received for U.S. Appl. No. 18/882,622, mailed on May 22, 2025, 8 pages.
Notice of Allowance received for U.S Appl. No. 18/473,182, mailed on Apr. 23, 2025, 8 pages.
Notice of Allowance received for U.S. Appl. No. 17/655,521, mailed on Apr. 16, 2025, 8 pages.
Notice of Allowance received for U.S. Appl. No. 18/427,434, mailed on Apr. 17, 2025, 9 pages.
Notice of Allowance received for U.S. Appl. No. 18/471,850, mailed on Jun. 10, 2025, 9 pages.
Notice of Allowance received for U.S. Appl. No. 18/473,179, mailed on May 8, 2025, 9 pages.
Notice of Allowance received for U.S. Appl. No. 18/473,262, mailed on Jun. 10, 2025, 9 pages.
Notice of Allowance received for U.S. Appl. No. 18/515,188, mailed on Mar. 20, 2025, 9 pages.
Adding Environments, Available online at: https://manual.keyshot.com/manual/environments/adding-environments/, [retrieved on Jun. 9, 2023], 2 pages.
Applicant-Initiated Interview Summary received for U.S. Appl. No. 18/119,219, mailed on May 21, 2024, 3 pages.
Area Light, Available online at: https://manual.keyshot.com/manual/materials/material-types/light-sources/area-light/, [retrieved on Jun. 9, 2023], 24 pages.
Artec Leo, Artec 3D [online], 2018 [retrieved on Apr. 25, 2024]. Retrieved from the Internet: <URL: https://artec3d.com/portable-3d-scanners/artec-leo>, 39 pages.
Artec Leo Full 3D Scanning Demo w/ Sample Data, Digitize Designs, LLC, Available online at: <https://www.youtube.com/watch?v=ecBKo_h3Pug>, [retrieved on Sep. 1, 2022], Feb. 22, 2019, 3 pages.
Corrected Notice of Allowability received for U.S. Appl. No. 17/469,788, mailed on Feb. 12, 2025, 2 pages.
Corrected Notice of Allowability received for U.S. Appl. No. 18/146,234, mailed on Feb. 6, 2025, 2 pages.
Corrected Notice of Allowance received for U.S. Appl. No. 17/407,675, mailed on Dec. 24, 2024, 2 pages.
Corrected Notice of Allowance received for U.S. Appl. No. 18/119,219, mailed on Sep. 11, 2024, 2 pages.
Corrected Notice of Allowance received for U.S. Appl. No. 18/152,656, mailed on Dec. 20, 2024, 5 pages.
Curious Blocks Alternatives 12, progsoft [online]. Profsoft, Available Online at: <URL: https://progsoft.net/en/software/curious-blocks>, [retrieved on Apr. 25, 2024], 2024, 7 pages.
Ex Parte Quayle Action received for U.S. Appl. No. 17/655,347, mailed on Jul. 8, 2024, 6 pages.
Extended European Search Report received for European Patent Application No. 24158036.4, mailed on Jul. 18, 2024, 12 pages.
Extended European Search Report received for European Patent Application No. 24171800.6, mailed on Sep. 5, 2024, 15 pages.
Extended European Search Report received for European Patent Application No. 24171804.8, mailed on Sep. 5, 2024, 13 pages.
Eye-supported target positioning in MRTK, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/EyeTracking/EyeTracking_Positioning.html>, 2 pages.
Feature Highlights, Available online at: https://manual.keyshot.com/manual/whats-new/feature-highlights/, [retrieved on Jun. 9, 2023], 28 pages.
Final Office Action received for U.S. Appl. No. 17/407,675, mailed on May 22, 2024, 18 pages.
Final Office Action received for U.S. Appl. No. 17/469,788, mailed on Nov. 16, 2023, 24 pages.
Final Office Action received for U.S. Appl. No. 17/655,521, mailed on Apr. 10, 2024, 18 pages.
Final Office Action received for U.S. Appl. No. 17/807,226, mailed on Nov. 30, 2023, 23 pages.
Final Office Action received for U.S. Appl. No. 17/812,965, mailed on Jan. 31, 2024, 9 pages.
Final Office Action received for U.S. Appl. No. 17/814,462, mailed on Nov. 1, 2024, 44 pages.
Final Office Action received for U.S. Appl. No. 17/905,483, mailed on Jan. 8, 2025, 19 pages.
Final Office Action received for U.S. Appl. No. 17/934,104, mailed on Oct. 18, 2024, 28 pages.
Final Office Action received for U.S. Appl. No. 18/327,844, mailed on Nov. 29, 2024, 25 pages.
How to Use Your Phone or Tablet in VR! | iOS and Android, YouTube [online]. YouTube, Dec. 20, 2017, Available online at <https://www.youtube.com/watch?v=QhfZjbVUxZE>, [Retrieved from Internet on Dec. 23, 2022], 4 pages.
International Search Report received for PCT Patent Application No. PCT/US2021/049520, mailed on Apr. 8, 2022, 8 pages.
International Search Report received for PCT Patent Application No. PCT/US2022/071208, mailed on Aug. 18, 2022, 9 pages.
International Search Report received for PCT Patent Application No. PCT/US2022/071228, mailed on Aug. 25, 2022, 6 pages.
International Search Report received for PCT Patent Application No. PCT/US2022/076808, mailed on Mar. 28, 2023, 6 pages.
International Search Report received for PCT Patent Application No. PCT/US2022/082379, mailed on May 30, 2023, 7 pages.
International Search Report received for PCT Patent Application No. PCT/US2023/019309, mailed on Sep. 1, 2023, 6 pages.
International Search Report received for PCT Patent Application No. PCT/US2023/060429, mailed on Jun. 28, 2023, 7 pages.
International Search Report received for PCT Patent Application No. PCT/US2023/074955, mailed on Feb. 1, 2024, 6 pages.
International Search Report received for PCT Patent Application No. PCT/US2023/074957, mailed on Jan. 30, 2024, 7 pages.
International Search Report received for PCT Patent Application No. PCT/US2023/074968, mailed on Feb. 26, 2024, 7 pages.
International Search Report received for PCT Patent Application No. PCT/US2024/030661, mailed on Nov. 4, 2024, 5 pages.
International Search Report received for PCT Patent Application No. PCT/US2024/032140, mailed on Sep. 10, 2024, 4 pages.
International Search Report received for PCT Patent Application No. PCT/US2024/032423, mailed on Sep. 25, 2024, 5 pages.
International Search Report received for PCT Patent Application No. PCT/US2024/032455, mailed on Sep. 25, 2024, 4 pages.
International Search Report received for PCT Patent Application No. PCT/US2024/039204, mailed on Nov. 14, 2024, 4 pages.
Kitasenju Design, X [online], X Corp., Available Online at: <URL: https://twitter.com/kitasenjudesign/status/1282665402812608513>, [retrieved on Apr. 25, 2024], 2024, 1 page.
Light Manager, Available online at: https://manual.keyshot.com/manual/lighting/lighting-manager/, [retrieved on Jun. 9, 2023], 3 pages.
MagicaVoxel 0.99.5 Review, YouTube [online], Google LLC, Available Online at: <URL: https://www.youtube.com/watch?v=WPPFnHQWwFk>, [retrieved on Apr. 25, 2024], 2024, 2 pages.
Non-Final Office Action received for U.S. Appl. No. 17/407,675, mailed on Sep. 11, 2023, 16 pages.
Non-Final Office Action received for U.S. Appl. No. 17/469,788, mailed on Mar. 2, 2023, 22 pages.
Non-Final Office Action received for U.S. Appl. No. 17/469,788, mailed on Mar. 21, 2024, 24 pages.
Non-Final Office Action received for U.S. Appl. No. 17/655,521, mailed on Aug. 23, 2023, 13 pages.
Non-Final Office Action received for U.S. Appl. No. 17/655,521, mailed on Nov. 27, 2024, 17 pages.
Non-Final Office Action received for U.S. Appl. No. 17/807,226, mailed on Jun. 26, 2023, 21 pages.

(56) References Cited

OTHER PUBLICATIONS

Non-Final Office Action received for U.S. Appl. No. 17/812,965, mailed on Jun. 8, 2023, 8 pages.
Non-Final Office Action received for U.S. Appl. No. 17/814,455, mailed on Feb. 16, 2024, 24 pages.
Non-Final Office Action received for U.S. Appl. No. 17/814,462, mailed on Feb. 1, 2024, 30 pages.
Non-Final Office Action received for U.S. Appl. No. 17/905,483, mailed on Mar. 27, 2024, 16 pages.
Non-Final Office Action received for U.S. Appl. No. 17/934,104, mailed on Mar. 25, 2024, 26 pages.
Non-Final Office Action received for U.S. Appl. No. 18/119,219, mailed on Mar. 28, 2024, 15 pages.
Non-Final Office Action received for U.S. Appl. No. 18/304,290, mailed on Mar. 5, 2025, 111 pages.
Non-Final Office Action received for U.S. Appl. No. 18/317,893, mailed on Apr. 25, 2024, 18 pages.
Non-Final Office Action received for U.S. Appl. No. 18/327,844, mailed on May 17, 2024, 20 pages.
Non-Final Office Action received for U.S. Appl. No. 18/429,301, mailed on Jun. 12, 2024, 28 pages.
Notice of Allowability received for U.S. Appl. No. 17/812,965, mailed on Jan. 15, 2025, 3 pages.
Notice of Allowability received for U.S. Appl. No. 17/814,455, mailed on Jan. 13, 2025, 7 pages.
Notice of Allowance received for U.S. Appl. No. 17/407,675, mailed on Aug. 20, 2024, 7 pages.
Notice of Allowance received for U.S. Appl. No. 17/407,675, mailed on Dec. 11, 2024, 8 pages.
Notice of Allowance received for U.S. Appl. No. 17/469,788, mailed on Feb. 5, 2025, 5 pages.
Notice of Allowance received for U.S. Appl. No. 17/469,788, mailed on Oct. 15, 2024, 7 pages.
Notice of Allowance received for U.S. Appl. No. 17/655,347, mailed on Feb. 20, 2025, 7 pages.
Notice of Allowance received for U.S. Appl. No. 17/655,347, mailed on Oct. 9, 2024, 7 pages.
Notice of Allowance received for U.S. Appl. No. 17/807,226, mailed on Jul. 3, 2024, 9 pages.
Notice of Allowance received for U.S. Appl. No. 17/807,236, mailed on Feb. 5, 2024, 13 pages.
Notice of Allowance received for U.S. Appl. No. 17/807,236, mailed on Jul. 10, 2024, 9 pages.
Notice of Allowance received for U.S. Appl. No. 17/812,965, mailed on Jul. 26, 2024, 6 pages.
Notice of Allowance received for U.S. Appl. No. 17/812,965, mailed on Nov. 15, 2024, 6 pages.
Notice of Allowance received for U.S. Appl. No. 17/814,455, mailed on Oct. 7, 2024, 10 pages.
Notice of Allowance received for U.S. Appl. No. 17/814,462, mailed on Feb. 26, 2025, 8 pages.
Notice of Allowance received for U.S. Appl. No. 18/119,219, mailed on Jul. 22, 2024, 7 pages.
Notice of Allowance received for U.S. Appl. No. 18/146,234, mailed on Jan. 24, 2025, 12 pages.
Notice of Allowance received for U.S. Appl. No. 18/152,656, mailed on Dec. 17, 2024, 12 pages.
Notice of Allowance received for U.S. Appl. No. 18/317,893, mailed on Jan. 13, 2025, 11 pages.
Notice of Allowance received for U.S. Appl. No. 18/317,893, mailed on Mar. 6, 2024, 8 pages.
Notice of Allowance received for U.S. Appl. No. 18/317,893, mailed on Nov. 22, 2023, 9 pages.
Notice of Allowance received for U.S. Appl. No. 18/429,294, mailed on Jun. 21, 2024, 10 pages.
Notice of Allowance received for U.S. Appl. No. 18/429,294, mailed on Oct. 31, 2024, 10 pages.
Notice of Allowance received for U.S. Appl. No. 18/429,301, mailed on Nov. 22, 2024, 8 pages.
Notice of Allowance received for U.S. Appl. No. 18/473,180, mailed on Aug. 22, 2024, 13 pages.
Notice of Allowance received for U.S. Appl. No. 18/473,180, mailed on Jan. 2, 2025, 12 pages.
Open Source Voxel Editor for Windows, Mac, Linux, iOS, and Android, Goxel [online]. Goxel by Guillaume Chereau, Available Online at: <URL: https://goxel.xyz/>, [retrieved on Apr. 25, 2024], 2024, 3 pages.
POP 2 3D Scanner (Infrared Light I Precision 0.05mm), Revpoint [online]. Revopoint 3D, <URL: https://global.revopoint3d.com/products/face-3d-scanner-pop2?_ga=2.182721893.277596832.1650264227-586470518.1640327512&ref=dh0L07OOzRuqo&utm_campaign=pop2_banner&utm_medium=referral&utm_source=Official_Website>, [retrieved on Apr. 25, 2024], 2014, 16 pages.
Restriction Requirement received for U.S. Appl. No. 17/905,483, mailed on Dec. 7, 2023, 7 pages.
Search Report received for United Kingdom Patent Application No. GB2210885.6, mailed on Jan. 27, 2023, 1 page.
ShareVOX, Phoria [online]. Phoria PTY LTD, Available Online at: <URL: https://www.phoria.com.au/projects/sharevox/>, [retrieved on Apr. 25, 2024], 2024, 2 pages.
Sliders, Mixed Reality Toolkit Documentation [online]. Features and Architecture [retrieved on Mar. 21, 2025]. Retrieved from the Internet: <URL: https://microsoft.github.io/MixedRealityToolkit-Unity/Documentation/Readme_Sliders.html>, 3 pages.
Spatial Audio Head Tracking on Apple Tv Automatically Resets when You Get Up from the Couc . . . , AppleInsider [online]. Jun. 10, 2021 [retrieved on Dec. 20, 2024]. Retrieved from the Internet: <https://forums.appleinsider.com/discussion/222259/spatial-audio-head-tracking-on-apple-tv-automatically-resets-when-you-get-up-from-the-couc>, 2024, 6 pages.
Supplemental Notice of Allowability received for U.S. Appl. No. 18/317,893, mailed on Jan. 29, 2025, 3 pages.
VoxEdit Beta Tutorial—Introduction and How to Animate Voxel Creations, YouTube [online]. Google LLC, Available Online at: <URL: https://www.youtube.com/watch?v=fqcArJWtyqM>, [retrieved on Apr. 25, 2024], 2024, 2 pages.
Voxel World Lens, Snapchat [online]. Snapchat Inc., Available Online at: <URL: https://www.snapchat.com/lens/689751dd6a7d446280d903d15d79f104?locale=en-US>, [retrieved on Apr. 25, 2024], 2024, 1 page.
Voxelize, Rossiev [online]. Denis Rossiev 2018-2024, Available Online at: <URL: https://www.rossiev.pro/voxelize/>, [retrieved on Apr. 25, 2024], 2024, 16 pages.
Your PC in VR, Virtual Desktop [online]. Virtual Desktop, Inc., 2023 [retrieved on Apr. 17, 2024]. Retrieved from the Internet: <URL: https://www.vrdesktop.net/>, 4 pages.
Coloring a Point Cloud Using 3DF Zephyr Pro, Wayback Machine, https://web.archive.org/web/20170522233043/http://www.3dflow.net:80/technology/documents/3df-zephyr-tutorials/point-cloud-coloring-using-3df-zephyr/, May 22, 2017, 1 page.
Apple, "Use Continuity to Connect Your Mac, iPhone, iPad, and Apple Watch", Apple Support, Available online at <https://support.apple.com/en-us/HT204681>, [Retrieved from Internet on Dec. 23, 2022], 4 pages.
Apple, "Use Message Effects with iMessage on Your iPhone, iPad, and iPod Touch", Apple Support, Available online at: <https://support.apple.com/en-us/HT206894>, [retrieved on Feb. 22, 2024], 5 pages.
Berard Francois, "A Study on Two-Dimensional Scrolling with Head Motion", CLIPS-IMAG Technical Report. France, Ref: <TR-IMAG-CLIPS-IHM-199901>, Retrieved from: <http://iihm.imag.fr/publs/1999/TR199901_PWindowRate.pdf>, Retrieved on Dec. 26, 2024, Jan. 8, 1999, 7 pages.
Capturing Reality, "Data Sheet RealityCapture Tarasque 1.2", Wayback Machine, https://web.archive.org/web/20220327110303/https://www.capturingreality.com/assets/Documents/datasheet_TARASQUE_1.2.pdf, Mar. 27, 2022, 5 pages.
Capturing Reality, "RealityCapture tutorial: Complete model in PPI", Youtube, https://www.youtube.com/watch?v=tw6wNNEbH_M, Oct. 14, 2021, 2 pages.

(56) References Cited

OTHER PUBLICATIONS

Cas and Chary XR, "Oculus Go & Your Phone as 2nd Controller!!—An Inexpensive Way to Play PC VR Games", posted on Mar. 8, 2019, https://www.youtube.com/watch?v=i_iRVa0kemw, 2019, 4 pages.
Choe et al., "Augmented-Reality-Based 3D Emotional Messenger for Dynamic User Communication with Smart Devices", Electronics, vol. 9, No. 1127, Jul. 10, 2020, 15 pages.
Dhakal et al., "SLAM-Share: Visual Simultaneous Localization and Mapping for Real-time Multi-user Augmented Reality", CoNEXT '22, Dec. 6-9, 2022, Roma, Italy, 14 pages.
Didehkhorshid et al., "Text Input in Virtual Reality Using a Tracked Drawing Tablet", HCII 2020, LNCS 12428, 2020, pp. 314-329.
Edmiston et al., "Touch-Enabled Input Devices for Controlling Virtual Environments", 12th IFAC Symposium on Analysis, Design and Evaluation of Human-Machine Systems, Las Vegas, NV, USA, Aug. 11-15, 2013, pp. 349-356.
Gamedbharat, "I Want to Rotate a Object on Double Tap, Can Any One Help Me With This?", posted on Jul. 26, 2017, https://discussions.unity.com/t/i-want-to-rotate-a-object-on-double-tap-can-any-one-help-me-with-this/192010, 2017, 3 pages.
Headmaster Introduction, "If You Can Move Your Head, You Can Move Your World", Retrieved from: <https://www.microsoft.com/buxtoncollection/a/pdf/HeadMaster%20Introduction.pdf)>, Retrieved on Dec. 26, 2024, 4 pages.
Huang et al., "Proxy-Based Security Audit System for Remote Desktop Access", Computer Communications and Networks, ICCCN 2009. Proceedings of 18th International Conference on, IEEE, Piscataway, NJ, USA, Aug. 3, 2009, 5 pages.
Jones et al., "The Future of Virtual Museums: On-Line, Immersive, 3D Environments", ProQuest (Technology Collection Database, Dissertations and Theses Database): Technical Literature Search, Jul. 26, 2002, 12 pages.
Lachambre et al., "Unity Photogrammetry Workflow", https://unity3d.com/files/solutions/photogrammetry/Unity-Photogrammetry-Workflow_2017-07_v2.pdf, Jun. 23, 2017, pp. 55-64.
Lin et al., "Ubii: Physical World Interaction Through Augmented Reality", Publisher: IEEE, vol. 16, No. 3, DOI:10.1109/TMC.2016.2567378, May 13, 2016, pp. 872-885.
Locher et al., "Mobile Phone and Cloud—a Dream Team for 3D Reconstruction", 2016 IEEE Winter Conference on Applications of Computer Vision (WACV), 2016, pp. 1-8.
Lor Cas, "Reality Capture: Exporting Mesh", Youtube, https://www.youtube.com/watch?v=PdvTRa2B_s0, Dec. 10, 2020, 2 pages.
Metalnwood, "Using a Tablet for Touch Control, with VR Headset on. (Demo Vid)", Virtual Reality, ED Forums, Jun. 12, 2020, Available online at <https://forum.dcs.world/topic/237992-using-a-tablet-for-touch-control-with-vr-headset-on-demo-vid/>, [Retrieved from Internet on Jan. 2, 2024], 9 pages.
Process a 3D Scan With Projection in Reality Capture (RC), Wayback Machine, https://web.archive.org/web/20200116135047/http:/www.pi3dscan.com/index.php/instructions/item/process-a-3d-scan-with-projection-in-reality-capture-rc, Jan. 16, 2020, 1 page.
Qi et al., "PointNet++: Deep Hierarchical Feature Learning on Point Sets in a Metric Space", Stanford University, Jun. 7, 2017, 14 pages.
Ran et al., "Multi-User Augmented Reality with Communication Efficient and Spatially Consistent Virtual Objects", CoNEXT '20, Dec. 1-4, 2020, Barcelona, Spain, 13 pages.
Ro et al., "AR Pointer: Advanced Ray-Casting Interface Using Laser Pointer Metaphor for Object Manipulation in 3D Augmented Reality Environment", Applied Sciences, vol. 9, No. 3078, [retrieved on Jul. 27, 2020], Jul. 30, 2019, 18 pages.
Schubert Martin, "Design Sprints at Leap Motion: A Playground of 3D User Interfaces", Ultraleap for Developers [online]. Nov. 8, 2017 [retrieved on Mar. 21, 2025]. Retrieved from the Internet: <URL: https://blog.leapmotion.com/design-playground-3d-user-interfaces/>, 17 pages.
Schuetz Markus, "Interactive Exploration of Point Clouds", Technische Universitat Wien, reposiTUm, https://doi.org/10.34726/hss.2021.91668, Mar. 8, 2021, 119 pages.
Slambekova Dana, "Gaze and Gesture Based Object Interaction in Virtual World", [retrieved on Dec. 17, 2015]. Retrieved from the Internet: <URL:https://www.cs.rit.edu/~dxs4659/Report.pdf>, May 31, 2012, 54 pages.
Strand Robin, "Surface Skeletons in Grids With Non-cubic Voxels", 2004 IEEE Xplore, Available Online at: <DOI: 10.1109/ICPR.2004.1334195>, Sep. 2004, 5 pages.
Sun et al., "MagicHand: Interact with IoT Devices in Augmented Reality Environment", 2019 IEEE Conference on Virtual Reality and 3D User Interfaces, Osaka, Japan, Mar. 23-27, 2019, [retrieved on Dec. 4, 2020], 6 pages.
Tolle et al., "Design of Head Movement Controller System (HEMOCS) for Control Mobile Application through Head Pose Movement Detection", Retrieved from:<https://www.google.com/url?sa=t&source=web&rct=j&opi=89978449&url=https://online-journals.org/index.php/i-jim/article/download/5552/4029/19224&ved=2ahUKEwj-w86vga-HAxUJJDQIHYMNDNw4HhAWegQILhAB&usg=AOwVaw3HR1t7v8Rx7osc1lp0UfOh>, DOI: <httpdx.doi.org/10.3991/ijim.v10i3.5552>, Retrieved on Dec. 26, 2024, 2016, 5 pages.
Wood Tyriel, "The HoloLens 2 Tour!—Discovering a World of Holograms", YouTube [online]. YouTube, Mar. 23, 2021 [retrieved on Dec. 7, 2023], Retrieved from the Internet: <URL: https://www.youtube.com/watch?v=rMks7sMzPxI>, 2 pages.
Writtenhouse Sandy, "How to Use Live View on Google Maps", Available online at <https://www.lifewire.com/use-live-view-google-maps-5323691>, [Retrieved from Internet on Jun. 27, 2024], Jul. 5, 2022, 6 pages.
Yue et al., "Optimal Region Selection for Stereoscopic Video Subtitle Insertion", IEEE Transactions on Circuits and Systems for Video Technology, vol. 28, No. 11, Nov. 2018, 13 pages.
Corrected Notice of Allowability received for U.S. Appl. No. 17/932,999, mailed on Feb. 20, 2025, 2 pages.
European Search Report received for European Patent Application No. 22703771.0, mailed on Feb. 26, 2025, 4 pages.
Extended European Search Report received for European Patent Application No. 24217335.9, mailed on Feb. 24, 2025, 8 pages.
Final Office Action received for U.S. Appl. No. 17/580,495, mailed on Feb. 12, 2025, 29 pages.
International Search Report received for PCT Patent Application No. PCT/US2023/060592, mailed on Jun. 14, 2023, 7 pages.
Non-Final Office Action received for U.S. Appl. No. 18/153,943, mailed on Dec. 31, 2024, 33 pages.
Non-Final Office Action received for U.S. Appl. No. 18/298,994, mailed on Mar. 7, 2025, 26 pages.
Non-Final Office Action received for U.S. Appl. No. 18/473,196, mailed on Feb. 28, 2025, 20 pages.
Non-Final Office Action received for U.S. Appl. No. 18/645,292, mailed on Feb. 21, 2025, 39 pages.
Non-Final Office Action received for U.S. Appl. No. 18/988,115, mailed on Feb. 24, 2025, 40 pages.
Notice of Allowance received for U.S. Appl. No. 18/671,936, mailed on Mar. 5, 2025, 7 pages.
Macmostvideo, "A Beginner's Guide to Selecting Items on Your Mac (#1566)", Bibliographic Information, Jan. 4, 2018, Retrieved from <URL:https://www.youtube.com/watch?v=a6MDAuh7M0Q&ab_channel=macmostvideo/>, [retrieved on Feb. 19, 2025], Most relevant passage of the video is 00:10 to 00:30, 2 pages.
Extended European Search Report received for European Patent Application No. 25179367.5, mailed on Jul. 1, 2025, 10 pages.
Notice of Allowance received for U.S. Appl. No. 18/427,434, mailed on Sep. 17, 2025, 10 pages.
Extended European Search Report received for European Patent Application No. 25174955.2, mailed on Jun. 25, 2025, 12 pages.
Non-Final Office Action received for U.S. Appl. No. 18/473,198, mailed on Jul. 15, 2025, 13 pages.
Of Allowance received for U.S. Appl. No. 18/894,997, mailed on Aug. 12, 2025, 13 pages.
Of Allowance received for U.S. Appl. No. 18/322,469, mailed on Jul. 7, 2025, 14 pages.
Non-Final Office Action received for U.S. Appl. No. 18/473,195, mailed on Jun. 27, 2025, 16 pages.

(56) References Cited

OTHER PUBLICATIONS

Office Action received for U.S. Appl. No. 18/587,815, mailed on Sep. 25, 2025, 16 pages.
Non-Final Office Action received for U.S. Appl. No. 18/473,242, mailed on Sep. 5, 2025, 17 pages.
Office Action received for U.S. Appl. No. 18/916,583, mailed on Oct. 2, 2025, 18 pages.
Notice of Allowability received for U.S. Appl. No. 18/152,656, mailed on Jul. 22, 2025, 2 pages.
Notice of Allowability received for U.S. Appl. No. 18/157,040, mailed on Oct. 30, 2025, 2 pages.
Notice of Allowability received for U.S. Appl. No. 18/157,040, mailed on Sep. 25, 2025, 2 pages.
Corrected Notice of Allowability received for U.S. Appl. No. 18/988,115, mailed on Jul. 15, 2025, 2 pages.
Corrected Notice of Allowance received for U.S. Appl. No. 18/424,644, mailed on Jun. 24, 2025, 2 pages.
Supplemental Notice of Allowability received for U.S. Appl. No. 18/473,261, mailed on Sep. 30, 2025, 2 pages.
Final Office Action received for U.S. Appl. No. 18/473,196, mailed on Jul. 16, 2025, 20 pages.
Final Office Action received for U.S. Appl. No. 18/518,340, mailed on Oct. 31, 2025, 20 pages.
Non-Final Office Action received for U.S. Appl. No. 17/905,483, mailed on Jul. 15, 2025, 20 pages.
Non-Final Office Action received for U.S. Appl. No. 18/515,191, mailed on Oct. 21, 2025, 20 pages.
Non-Final Office Action received for U.S. Appl. No. 18/518,340, mailed on Jul. 22, 2025, 20 pages.
Office Action received for U.S. Appl. No. 18/317,890, mailed on Sep. 3, 2025, 22 pages.
Office Action received for U.S. Appl. No. 17/933,020, mailed on Oct. 1, 2025, 28 pages.
Office Action received for U.S. Appl. No. 18/298,994, mailed on Sep. 12, 2025, 32 pages.
Office Action received for U.S. Appl. No. 18/587,739, mailed on Sep. 16, 2025, 34 pages.
Office Action received for U.S. Appl. No. 18/473,260, mailed on Jun. 27, 2025, 35 pages.
Final Office Action received for U.S. Appl. No. 18/473,260, mailed on Oct. 22, 2025, 38 pages.
Office Action received for U.S. Appl. No. 18/473,239, mailed on Sep. 10, 2025, 38 pages.
Office Action received for U.S. Appl. No. 18/473,256, mailed on Nov. 4, 2025., 38 pages.
International Search Report received for PCT Patent Application No. PCT/US2025/011189, mailed on Apr. 23, 2025, 4 pages.
Office Action received for U.S. Appl. No. 18/473,184, mailed on Jul. 25, 2025, 40 pages.
Non-Final Office Action received for U.S. Appl. No. 18/473,155, mailed on Jul. 10, 2025, 47 pages.
Search Report received for Chinese Patent Application No. 202210728190.3, mailed on Aug. 29, 2025, 5 pages (2 pages of English Translation and 3 pages of Official Copy Only).
Notice of Allowance received for U.S. Appl. No. 18/988,115, mailed on Oct. 7, 2025, 5 pages.
International Search Report received for PCT Patent Application No. PCT/US2025/032533, mailed on Oct. 30, 2025, 6 pages.
Notice of Allowance received for U.S. Appl. No. 18/152,656, mailed on Jun. 25, 2025, 6 pages.
International Search Report received for PCT Patent Application No. PCT/US2025/032549, mailed on Oct. 23, 2025, 7 pages.
Notice of Allowance received for U.S. Appl. No. 18/304,290, mailed on Aug. 20, 2025, 7 pages.
Notice of Allowance received for U.S. Appl. No. 18/471,729, mailed on Oct. 10, 2025, 7 pages.
Notice of Allowance received for U.S. Appl. No. 18/988,115, mailed on Jun. 30, 2025, 7 pages.
Restriction Requirement received for U.S. Appl. No. 18/473,259, mailed on Oct. 30, 2025, 7 pages.
Notice of Allowance received for U.S Appl. No. 18/473,182, mailed on Oct. 21, 2025, 8 pages.
Notice of Allowance received for U.S. Appl. No. 18/473,179, mailed on Oct. 6, 2025, 8 pages.
Notice of Allowance received for U.S. Appl. No. 18/473,262, mailed on Oct. 7, 2025, 8 pages.
Notice of Allowance received for U.S. Appl. No. 18/645,292, mailed on Nov. 4, 2025, 8 pages.
Notice of Allowance received for U.S. Appl. No. 18/882,622, mailed on Aug. 27, 2025, 8 pages.
Notice of Allowance received for U.S. Appl. No. 18/896,227, mailed on Jul. 11, 2025, 8 pages.
Notice of Allowance received for U.S. Appl. No. 18/919,095, mailed on Jul. 22, 2025, 8 pages.
Notice of Allowance received for U.S. Appl. No. 18/919,095, mailed on Oct. 23, 2025, 8 pages.
Notice of Allowance received for U.S. Appl. No. 18/153,943, mailed on Oct. 7, 2025, 9 pages.
Notice of Allowance received for U.S. Appl. No. 18/157,040, mailed on Jun. 24, 2025, 9 pages.
Notice of Allowance received for U.S. Appl. No. 18/473,261, mailed on Sep. 23, 2025, 9 pages.
Non-Final Office Action received for U.S. Appl. No. 18/057,172, mailed on Mar. 14, 2025, 22 pages.
Notice of Allowance received for U.S. Patent Application No. 18/057, 172, mailed on Jul. 15, 2025, 12 pages.
VR Design Best Practices, LeapMotion, Aug. 29, 2015, 31 pages.
Banta et al., "A Next-Best-View System for Autonomous 3-D Object Reconstruction", IEEE Transactions on Systems, Man, and Cybernetics—Part A: Systems and Humans vol. 30, No. 5, Sep. 30, 2000, pp. 589-598.
Bermejo et al., "Exploring Button Designs for Mid-air Interaction in Virtual Reality: A Hexa-metric Evaluation of Key Representations and Multi-modal Cues", Proceedings of the ACM on Human-Computer Interaction, vol. 5, No. EICS, Article 194, May 27, 2021, 26 pages.
Dudley et al., "Fast and Precise Touch-Based Text Entry for Head-Mounted Augmented Reality with Variable Occlusion", ACM Transactions on Computer-Human Interaction (TOCHI), vol. 25, No. 6, Article 30, Dec. 13, 2018, 40 pages.
Ghosh et al., "NotifiVIR: Exploring Interruptions and Notifications in Virtual Reality", IEEE transactions on visualization and computer graphics, vol. 24, No. 4, Apr. 2018, pp. 1447-1456.
Kim et al., "Pseudo-haptic Button for Improving User Experience of Mid-air Interaction in VR", International Journal of Human-Computer Studies, vol. 168, No. 102907, Aug. 9, 2022, 11 pages.
Kim et al., "Virtual Object Sizes for Efficient and Convenient Mid-air Manipulation", The Visual Computer, vol. 38, No. 9, Jul. 1, 2022, pp. 3463-3474.
Lee et al., "UbiPoint: Towards Non-intrusive Mid-Air Interaction for Hardware Constrained Smart Glasses", In Proceedings of the 11th ACM Multimedia Systems Conference, May 27, 2020, pp. 190-201.
Medeiros et al., "Promoting Reality Awareness in Virtual Reality through Proxemics", IEEE Virtual Reality and 3D User Interfaces (VR), March 27-Apr. 1, 2021, 11 pages.
Mendes et al., "Mid-Air Interactions Above Stereoscopic Interactive Tables", IEEE Symposium on 3D User Interfaces (3DUI), Mar. 29-30, 2014, pp. 3-10.
Nunez Angulo et al., "Manual for the Design of Didactic Units in Augmented Reality Using the Cospaces EDU Application", 2020, 75 pages.
Pfeuffer et al., "Gaze+touch vs. Touch: What's the Trade-off When Using Gaze to Extend Touch to Remote Displays?", Advances In Databases And Information Systems, Aug. 30, 2015, pp. 349-367.
Speicher et al., "Pseudo-haptic Controls for Mid-air Finger-based Menu Interaction", CHI'19 Extended Abstracts, May 4-9, 2019, Conference on Human Factors in Computing Systems, May 2, 2019, pp. 1-6.

(56) References Cited

OTHER PUBLICATIONS

Zhuang et al., "Distributed Architecture for 3D Graphics Rendering in Collaborative System", Computer and Modernization, Issue 4, 2017, 5 pages (1 page of English Abstract and 4 pages of Official Copy).

* cited by examiner

SYSTEM AND METHOD OF THREE-DIMENSIONAL PLACEMENT AND REFINEMENT IN MULTI-USER COMMUNICATION SESSIONS

CROSS-REFERENCE TO RELATED APPLICATIONS

This application claims the benefit of U.S. Provisional Application No. 63/268,692, filed Feb. 28, 2022, the content of which is incorporated herein by reference in its entirety for all purposes.

FIELD OF THE DISCLOSURE

This relates generally to systems and methods of three-dimensional placement and refinement of objects in multi-user communications sessions.

BACKGROUND OF THE DISCLOSURE

Some computer graphical environments provide two-dimensional and/or three-dimensional environments where at least some objects displayed for a user's viewing are virtual and generated by a computer. In some examples, the three-dimensional environments are presented by multiple devices communicating in a multi-user communication session. In some examples, an avatar (e.g., a representation) of each user participating in the multi-user communication session (e.g., via the computing devices) is displayed in the three-dimensional environment of the multi-user communication session. In some examples, content can be shared in the three-dimensional environment for viewing and interaction by multiple users participating in the multi-user communication session. In some examples, shared content and/or avatars corresponding to the users participating in the multi-user communication session can be moved within the three-dimensional environment.

SUMMARY OF THE DISCLOSURE

Some examples of the disclosure are directed to systems and methods for spatial placement of avatars in a multi-user communication session. In some examples, while a first electronic device is presenting a three-dimensional environment, the first electronic device may receive an input corresponding to a request to enter a multi-user communication session with a second electronic device. In some examples, in response to receiving the input, the first electronic device may scan an environment surrounding the first electronic device to generate an occupancy map identifying locations of objects and/or open space in the environment. In some examples, the first electronic device may identify a placement location in the three-dimensional environment at which to display a virtual object representing a user of the second electronic device. In some examples, the placement location may be a location that is at a center of a field of view of a user of the first electronic device and/or that is a predefined distance from a viewpoint of the user of the first electronic device. In some examples, in accordance with a determination that the identified placement location satisfies a first set of criteria, the first electronic device displays the virtual object representing the user of the second electronic device at the placement location in the three-dimensional environment, and thus enters the multi-user communication session with the second electronic device.

In some examples, the first set of criteria includes a first criterion that is satisfied when the identified placement location does not contain any objects. In some examples, in accordance with a determination that the identified placement location does not satisfy the first set of criteria because the identified placement location contains an object, the first electronic device identifies an updated placement location in the three-dimensional environment presented at the first electronic device. In some examples, the updated placement location may be a location that does not contain any objects in the three-dimensional environment. In some examples, when the first electronic device identifies an updated placement location that satisfies the first set of criteria, the first electronic device displays the virtual object representing the user of the second electronic device at the updated placement location in the three-dimensional environment.

Some examples of the disclosure are directed to systems and methods for spatial refinement in a multi-user communication session. In some examples, a first electronic device and a second electronic device may be communicatively linked in a multi-user communication session. In some examples, the first electronic device may present a three-dimensional environment including a first shared object and an avatar corresponding to a user of the second electronic device. In some examples, while the first electronic device is presenting the three-dimensional environment, the first electronic device may receive a first input. In some examples, in accordance with a determination that the first input corresponds to movement of the avatar corresponding to the user of the second electronic device, the first electronic device may move the avatar and the first shared object in the three-dimensional environment in accordance with the first input. In some examples, in accordance with a determination that the first input corresponds to movement of the first shared object, the first electronic device may move the first shared object in the three-dimensional environment in accordance with the first input without moving the avatar corresponding to the user of the second electronic device.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1:
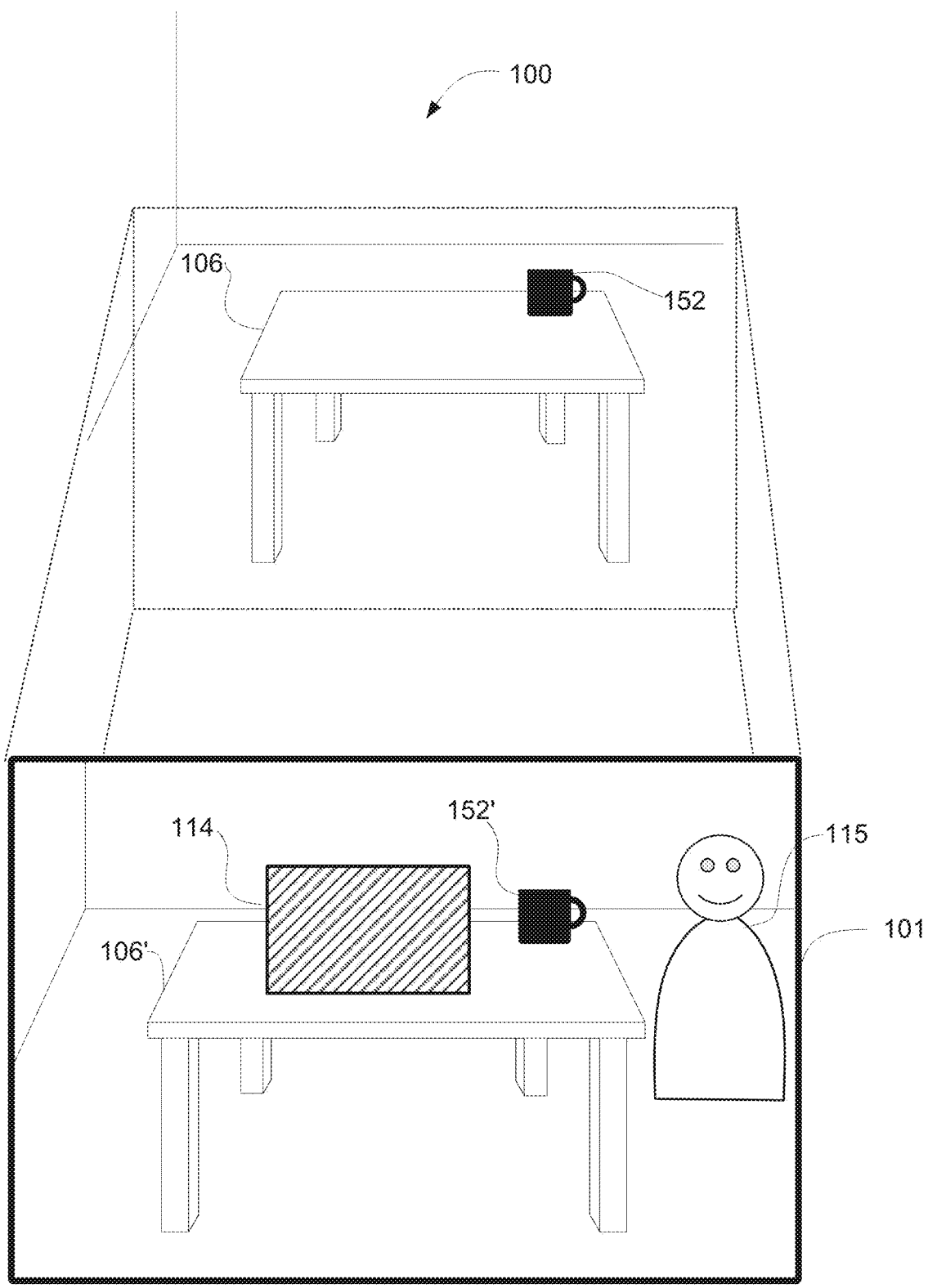
FIG. 1 illustrates an electronic device presenting an extended reality environment according to some examples of the disclosure.

Some examples of the disclosure are directed to systems and methods for spatial placement of avatars in a multi-user communication session. In some examples, while a first electronic device is presenting a three-dimensional environment, the first electronic device may receive an input corresponding to a request to enter a multi-user communication session with a second electronic device. In some examples, in response to receiving the input, the first electronic device may scan an environment surrounding the first electronic device to generate an occupancy map identifying locations of objects and/or open space in the environment. In some examples, the first electronic device may identify a placement location in the three-dimensional environment at which to display a virtual object representing a user of the second electronic device. In some examples, the placement location may be a location that is at a center of a field of view of a user of the first electronic device and/or that is a predefined distance from a viewpoint of the user of the first electronic device. In some examples, in accordance with a determination that the identified placement location satisfies a first set of criteria, the first electronic device displays the virtual object representing the user of the second electronic device at the placement location in the three-dimensional environment, and thus enters the multi-user communication session with the second electronic device.

In some examples, the first set of criteria includes a first criterion that is satisfied when the identified placement location does not contain any objects. In some examples, in accordance with a determination that the identified placement location does not satisfy the first set of criteria because the identified placement location contains an object, the first electronic device identifies an updated placement location in the three-dimensional environment presented at the first electronic device. In some examples, the updated placement location may be a location that does not contain any objects in the three-dimensional environment. In some examples, when the first electronic device identifies an updated placement location that satisfies the first set of criteria, the first electronic device displays the virtual object representing the user of the second electronic device at the updated placement location in the three-dimensional environment.

Some examples of the disclosure are directed to systems and methods for spatial refinement in a multi-user communication session. In some examples, a first electronic device and a second electronic device may be communicatively linked in a multi-user communication session. In some examples, the first electronic device may present a three-dimensional environment including a first shared object and an avatar corresponding to a user of the second electronic device. In some examples, while the first electronic device is presenting the three-dimensional environment, the first electronic device may receive a first input. In some examples, in accordance with a determination that the first input corresponds to movement of the avatar corresponding to the user of the second electronic device, the first electronic device may move the avatar and the first shared object in the three-dimensional environment in accordance with the first input. In some examples, in accordance with a determination that the first input corresponds to movement of the first shared object, the first electronic device may move the first shared object in the three-dimensional environment in accordance with the first input without moving the avatar corresponding to the user of the second electronic device.

In some examples, performing spatial placement for a multi-communication session and/or spatial refinement in the three-dimensional environment while in the multi-user communication session may include interaction with one or more objects in the three-dimensional environment. For example, initiation of spatial placement for the multi-user communication session in the three-dimensional environment can include selection of one or more user interface elements. Similarly, initiation of spatial refinement in the three-dimensional environment can include interaction with one or more virtual objects displayed in the three-dimensional environment. In some examples, a user's gaze may be tracked by the electronic device as an input for targeting a selectable option/affordance within a respective user interface element when initiating scene placement of the multi-user communication session in the three-dimensional environment. For example, gaze can be used to identify one or more options/affordances targeted for selection using another selection input. In some examples, a respective option/affordance may be selected using hand-tracking input detected via an input device in communication with the electronic device. In some examples, gaze can be used to identify one or more virtual objects targeted for selection when initiating spatial refinement while in the multi-user communication session. In some examples, objects displayed in the three-dimensional environment may be moved and/or reoriented in the three-dimensional environment in accordance with movement input detected via the input device.

FIG. 1 illustrates an electronic device 101 presenting an extended reality (XR) environment (e.g., a computer-generated environment) according to some examples of the disclosure. In some examples, electronic device 101 is a hand-held or mobile device, such as a tablet computer, laptop computer, smartphone, or head-mounted display. Examples of device 101 are described below with reference to the architecture block diagram of FIG. 2. As shown in FIG. 1, electronic device 101, table 106, and coffee mug 152 are located in the physical environment 100. In some examples, electronic device 101 may be configured to capture images of physical environment 100 including table 106 and coffee mug 152 (illustrated in the field of view of electronic device 101). In some examples, in response to a trigger, the electronic device 101 may be configured to display a virtual object 114 (e.g., two-dimensional virtual content) in the computer-generated environment (e.g., represented by a rectangle illustrated in FIG. 1) that is not present in the physical environment 100, but is displayed in the computer-generated environment positioned on (e.g., anchored to) the top of a computer-generated representation 106' of real-world table 106. For example, virtual object 114 can be displayed on the surface of the computer-generated representation 106' of the table in the computer-generated environment next to the computer-generated representation 152' of real-world coffee mug 152 displayed via device 101 in response to detecting the planar surface of table 106 in the physical environment 100.

It should be understood that virtual object 110 is a representative virtual object and one or more different virtual objects (e.g., of various dimensionality such as two-dimensional or three-dimensional virtual objects) can be included and rendered in a three-dimensional computer-generated environment. For example, the virtual object can represent an application or a user interface displayed in the computer-generated environment. In some examples, the virtual object can represent content corresponding to the application and/or displayed via the user interface in the computer-generated environment. In some examples, the virtual object 114 is optionally configured to be interactive and responsive to user input, such that a user may virtually touch, tap, move, rotate, or otherwise interact with, the virtual object. In some embodiments, the virtual object 114 may be displayed in a three-dimensional computer-generated environment within a multi-user communication session ("multi-user communication session," "communication session"). In some such embodiments, as described in more detail below, the virtual object 114 may be viewable and/or configured to be interactive and responsive to multiple users and/or user input provided by multiple users, respectively, represented by virtual representations (e.g., avatars, such as avatar 115). Additionally, it should be understood, that the 3D environment (or 3D virtual object) described herein may be a representation of a 3D environment (or three-dimensional virtual object) projected or presented at an electronic device.

In the discussion that follows, an electronic device that is in communication with a display generation component and one or more input devices is described. It should be understood that the electronic device optionally is in communication with one or more other physical user-interface devices, such as touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
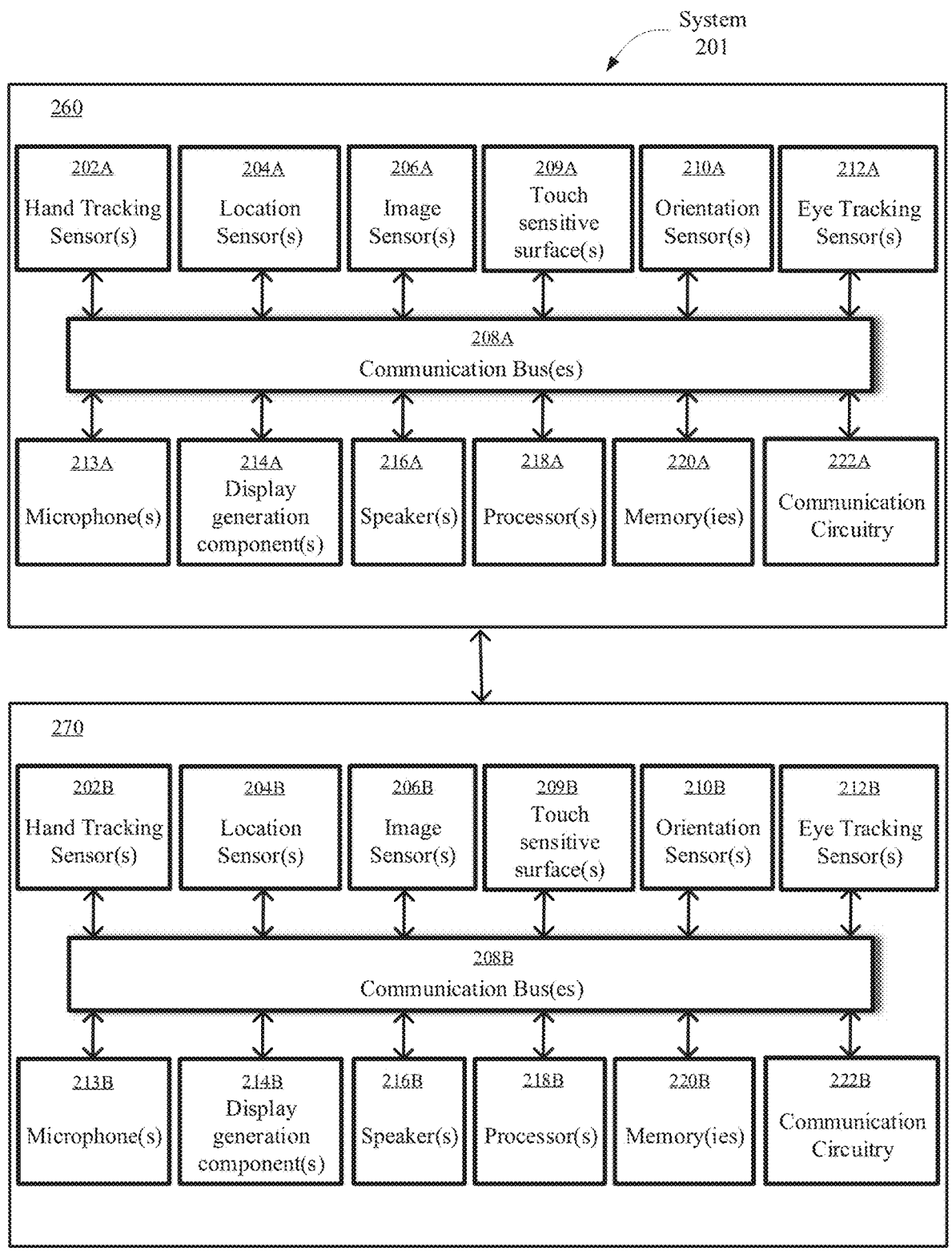
FIG. 2 illustrates a block diagram of an exemplary architecture for a system according to some examples of the disclosure.

FIG. 2 illustrates a block diagram of an exemplary architecture for a system 201 according to some examples of the disclosure. In some examples, system 201 includes multiple devices. For example, the system 201 includes a first electronic device 260 and a second electronic device 270, wherein the first electronic device 260 and the second electronic device 270 are in communication with each other. In some embodiments, the first electronic device 260 and the second electronic device 270 are a portable device, such as a mobile phone, smart phone, a tablet computer, a laptop computer, an auxiliary device in communication with another device, etc., respectively.

As illustrated in FIG. 2, the first device 260 optionally includes various sensors (e.g., one or more hand tracking sensor(s) 202A, one or more location sensor(s) 204A, one or more image sensor(s) 206A, one or more touch-sensitive surface(s) 209A, one or more motion and/or orientation sensor(s) 210A, one or more eye tracking sensor(s) 212A, one or more microphone(s) 213A or other audio sensors, etc.), one or more display generation component(s) 214A, one or more speaker(s) 216A, one or more processor(s) 218A, one or more memories 220A, and/or communication circuitry 222A. In some embodiments, the second device 270 optionally includes various sensors (e.g., one or more hand tracking sensor(s) 202B, one or more location sensor(s) 204B, one or more image sensor(s) 206B, one or more touch-sensitive surface(s) 209B, one or more motion and/or orientation sensor(s) 210B, one or more eye tracking sensor(s) 212B, one or more microphone(s) 213B or other audio sensors, etc.), one or more display generation component(s) 214B, one or more speaker(s) 216, one or more processor(s) 218B, one or more memories 220B, and/or communication circuitry 222B. One or more communication buses 208A and 208B are optionally used for communication between the above-mentioned components of devices 260 and 270, respectively. First device 260 and second device 270 optionally communicate via a wired or wireless connection (e.g., via communication circuitry 222A-222B) between the two devices.

Communication circuitry 222A, 222B optionally includes circuitry for communicating with electronic devices, networks, such as the Internet, intranets, a wired network and/or a wireless network, cellular networks, and wireless local area networks (LANs). Communication circuitry 222A, 222B optionally includes circuitry for communicating using near-field communication (NFC) and/or short-range communication, such as Bluetooth®.

Processor(s) 218A, 218B include one or more general processors, one or more graphics processors, and/or one or more digital signal processors. In some embodiments, memory 220A, 220B is a non-transitory computer-readable storage medium (e.g., flash memory, random access memory, or other volatile or non-volatile memory or storage) that stores computer-readable instructions configured to be executed by processor(s) 218A, 218B to perform the techniques, processes, and/or methods described below. In some embodiments, memory 220A, 220B can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some embodiments, the storage medium is a transitory computer-readable storage medium. In some embodiments, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like.

In some embodiments, display generation component(s) 214A, 214B include a single display (e.g., a liquid-crystal display (LCD), organic light-emitting diode (OLED), or other types of display). In some embodiments, display generation component(s) 214A, 214B includes multiple displays. In some embodiments, display generation component(s) 214A, 214B can include a display with touch capability (e.g., a touch screen), a projector, a holographic projector, a retinal projector, etc. In some embodiments, devices 260 and 270 include touch-sensitive surface(s) 209A and 209B, respectively, for receiving user inputs, such as tap inputs and swipe inputs or other gestures. In some embodiments, display generation component(s) 214A,214B and touch-sensitive surface(s) 209A, 209B form touch-sensitive display(s) (e.g., a touch screen integrated with devices 260 and 270, respectively, or external to devices 260 and 270, respectively, that is in communication with devices 260 and 270).

Devices 260 and 270 optionally includes image sensor(s) 206A and 206B, respectively. Image sensors(s) 206A/206B optionally include one or more visible light image sensors, such as charged coupled device (CCD) sensors, and/or complementary metal-oxide-semiconductor (CMOS) sensors operable to obtain images of physical objects from the real-world environment. Image sensor(s) 206A/206B also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206A/206B also optionally include one or more cameras configured to capture movement of physical objects in the real-world environment. Image sensor(s) 206A/206B also optionally include one or more depth sensors configured to detect the distance of physical objects from device 260/270. In some embodiments, information from one or more depth sensors can allow the device to identify and differentiate objects in the real-world environment from other objects in the real-world environment. In some embodiments, one or more depth sensors can allow the device to determine the texture and/or topography of objects in the real-world environment.

In some embodiments, devices 260 and 270 use CCD sensors, event cameras, and depth sensors in combination to detect the physical environment around devices 260 and 270. In some embodiments, image sensor(s) 206A/206B include a first image sensor and a second image sensor. The first image sensor and the second image sensor work in tandem and are optionally configured to capture different information of physical objects in the real-world environment. In some embodiments, the first image sensor is a visible light image sensor and the second image sensor is a depth sensor. In some embodiments, device 260/270 uses image sensor(s) 206A/206B to detect the position and orientation of device 260/270 and/or display generation component(s) 214A/214B in the real-world environment. For example, device 260/270 uses image sensor(s) 206A/206B to track the position and orientation of display generation component(s) 214A/214B relative to one or more fixed objects in the real-world environment.

In some embodiments, device 260/270 includes microphone(s) 213A/213B or other audio sensors. Device 260/270 uses microphone(s) 213A/213B to detect sound from the user and/or the real-world environment of the user. In some embodiments, microphone(s) 213A/213B includes an array of microphones (a plurality of microphones) that optionally operate in tandem, such as to identify ambient noise or to locate the source of sound in space of the real-world environment.

Device 260/270 includes location sensor(s) 204A/204B for detecting a location of device 260/270 and/or display generation component(s) 214A/214B. For example, location sensor(s) 204A/204B can include a GPS receiver that receives data from one or more satellites and allows device 260/270 to determine the device's absolute position in the physical world.

Device 260/270 includes orientation sensor(s) 210A/210B for detecting orientation and/or movement of device 260/270 and/or display generation component(s) 214A/214B. For example, device 260/270 uses orientation sensor(s) 210A/210B to track changes in the position and/or orientation of device 260/270 and/or display generation component(s) 214A/214B, such as with respect to physical objects in the real-world environment. Orientation sensor(s) 210A/210B optionally include one or more gyroscopes and/or one or more accelerometers.

Device 260/270 includes hand tracking sensor(s) 202A/202B and/or eye tracking sensor(s) 212A/212B, in some embodiments. Hand tracking sensor(s) 202A/202B are configured to track the position/location of one or more portions of the user's hands, and/or motions of one or more portions of the user's hands with respect to the extended reality environment, relative to the display generation component(s) 214A/214B, and/or relative to another defined coordinate system. Eye tracking sensor(s) 212A/212B are configured to track the position and movement of a user's gaze (eyes, face, or head, more generally) with respect to the real-world or extended reality environment and/or relative to the display generation component(s) 214A/214B. In some embodiments, hand tracking sensor(s) 202A/202B and/or eye tracking sensor(s) 212A/212B are implemented together with the display generation component(s) 214A/214B. In some embodiments, the hand tracking sensor(s) 202A/202B and/or eye tracking sensor(s) 212A/212B are implemented separate from the display generation component(s) 214A/214B.

In some embodiments, the hand tracking sensor(s) 202A/202B can use image sensor(s) 206A/206B (e.g., one or more IR cameras, 3D cameras, depth cameras, etc.) that capture three-dimensional information from the real-world including one or more hands (e.g., of a human user). In some embodiments, the hands can be resolved with sufficient resolution to distinguish fingers and their respective positions. In some embodiments, one or more image sensor(s) 206A/206B are positioned relative to the user to define a field of view of the image sensor(s) 206A/206B and an interaction space in which finger/hand position, orientation and/or movement captured by the image sensors are used as inputs (e.g., to distinguish from a user's resting hand or other hands of other persons in the real-world environment). Tracking the fingers/hands for input (e.g., gestures, touch, tap, etc.) can be advantageous in that it does not require the user to touch, hold or wear any sort of beacon, sensor, or other marker.

In some embodiments, eye tracking sensor(s) 212A/212B includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some embodiments, both eyes are tracked separately by respective eye tracking cameras and illumination sources, and a focus/gaze can be determined from tracking both eyes. In some embodiments, one eye (e.g., a dominant eye) is tracked by a respective eye tracking camera/illumination source(s).

Device 260/270 and system 201 are not limited to the components and configuration of FIG. 2, but can include fewer, other, or additional components in multiple configurations. In some embodiments, system 201 can be implemented in a single device. A person or persons using system 201, is optionally referred to herein as a user or users of the device(s).

Attention is now directed towards exemplary concurrent displays of a three-dimensional environment on a first electronic device (e.g., corresponding to device 260) and a second electronic device (e.g., corresponding to device 270). As discussed below, the first electronic device may be in communication with the second electronic device in a multi-user communication session. In some examples, an avatar (e.g., a representation of) a user of the first electronic device may be displayed in the three-dimensional environment at the second electronic device, and an avatar of a user of the second electronic device may be displayed in the three-dimensional environment at the first electronic device. In some examples, content may be shared within the three-dimensional environment while the first electronic device and the second electronic device are in the multi-user communication session.

Figure 3:
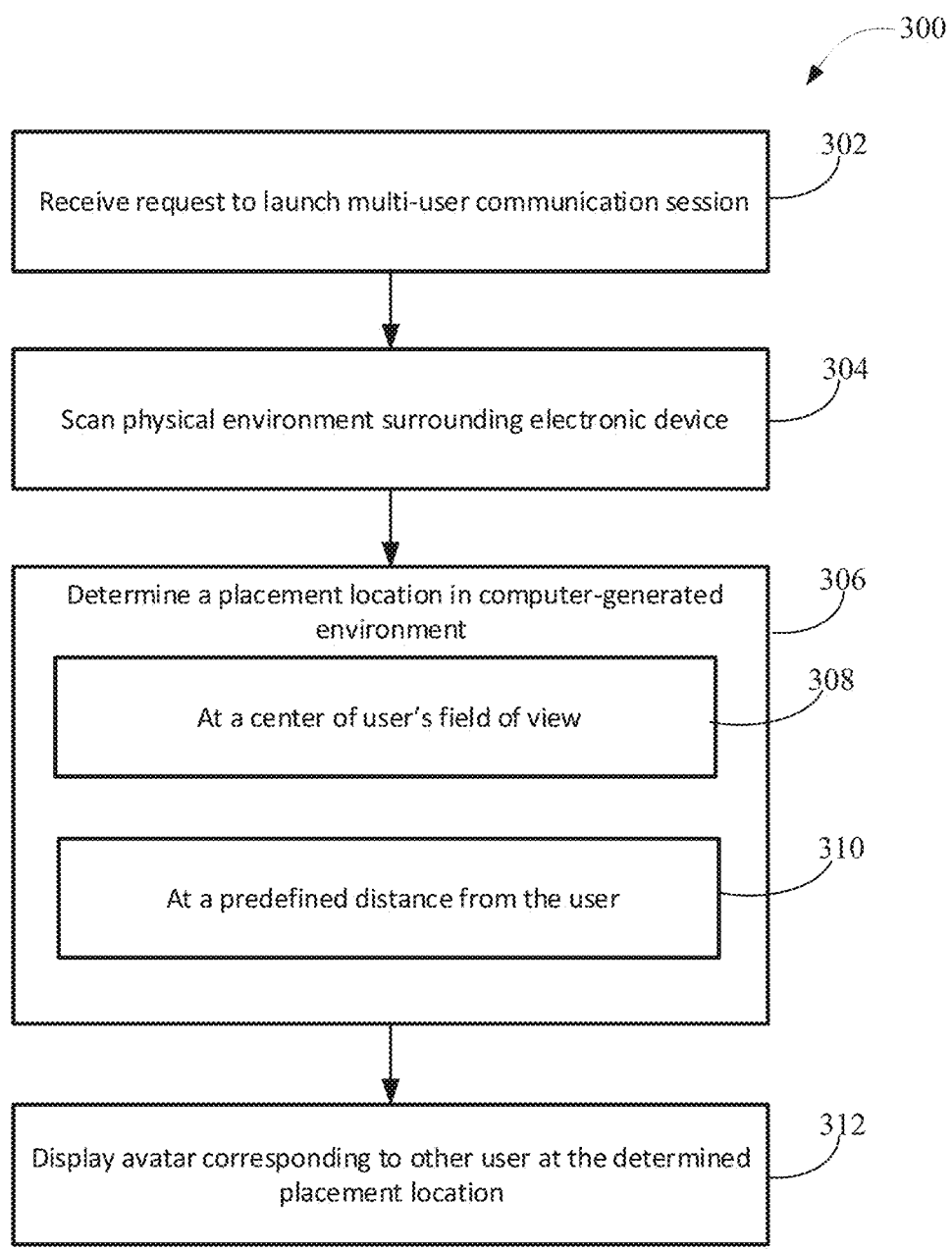
FIG. 3 illustrates a flow diagram illustrating an example process of facilitating spatial placement for an avatar in a multi-user communication session in a computer-generated environment according to some examples of the disclosure.

FIG. 3 illustrates a flow diagram illustrating an example process 300 of facilitating spatial placement for an avatar in a multi-user communication session in a computer-generated environment according to some examples of the disclosure. As described herein, while in a multi-communication session, a plurality of electronic devices may present a shared three-dimensional environment which may include one or more shared virtual objects, one or more unshared virtual objects (e.g., representations thereof), and/or three-dimensional representations (e.g., renderings) of users of the plurality of electronic devices. As described below, at a first electronic device, a user may initiate a multi-user communication session with one or more remote electronic devices, which optionally includes placement of one or more three-dimensional representations of users of the one or more remote electronic devices within the three-dimensional environment presented at the first electronic device. The example processes shown in FIG. 3 and described below will be exemplified and described in more detail when referring to FIGS. 4A-4I below.

In some examples, the first electronic device may receive a request to launch a multi-user communication session with one or more remote electronic devices, at 302. For example, the user of the first electronic device may provide user input at the first electronic device corresponding to a request to enter the multi-user communication session with a second electronic device. As shown in FIG. 3, in response to receiving the request, the first electronic device may scan a physical environment surrounding the first electronic device, at 304. For example, the first electronic device may be located within a physical room containing one or more physical objects (e.g., chairs, tables, sofas, lamps, etc.). In some examples, the first electronic device may generate an occupancy map of the portions of the physical environment that are within a field of view of the user of the first electronic device (e.g., portions of the physical environment that are visible to the user due to the presence of the display blocking the user's view of the physical environment around the user). In some examples, as described in more detail below, the occupancy map optionally identifies unique locations of the physical objects that are within the user's field of view.

In some embodiments, the first electronic device may scan the three-dimensional environment within the field of view of the user of the first electronic device. For example, the three-dimensional environment within the field of view of the user of the first electronic device may include one or more virtual objects (e.g., three-dimensional application windows, three-dimensional and/or two-dimensional content, virtual models, three-dimensional representations of physical objects, etc.). In some examples, as described in more detail below with reference to FIGS. 4A-4I, the occupancy map generated by the first electronic device optionally identifies unique locations of the virtual objects that are within the user's field of view.

In some examples, while the first electronic device is scanning the physical environment and/or the three-dimensional environment surrounding the first electronic device (e.g., within the field of view of the user of the first electronic device), the one or more remote electronic devices that are joining the multi-user communication session with the first electronic device optionally also scan the physical and/or three-dimensional environments surrounding the one or more remote electronic devices. For example, as described in more detail below, when the first electronic device initiates entering the multi-communication session with the second electronic device, the first electronic device and the second electronic device each individually scan the physical environments respectively surrounding the first electronic device and the second electronic device, at 304, to generate occupancy maps based on locations of objects in the field of view of the users of the first electronic device and the second electronic device, respectively. Each using their respective generated occupancy map, the first electronic device and the second electronic device may each determine a placement location in the three-dimensional environment at which to spatially place an avatar corresponding to the user of the other electronic device in the multi-user communication session, at 306.

In some examples, the first electronic device determines a placement location at which to place an avatar corresponding to the user of the second electronic device, and the second electronic device determines a placement location at which to place an avatar corresponding to the user of the first electronic device. In some examples, determining the placement location includes determining a location in the three-dimensional environment that is at a center of the user's field of view, at 308. For example, the first electronic device identifies a location in the three-dimensional environment presented at the first electronic device that is at or near (e.g., within a threshold distance of, such as 0.1, 0.5, 1, 1.5, 2, 3, 5, etc. meters (m), or some other unit of distance) the center of the field of view of the user of the first electronic device. Similarly, the second electronic device identifies a location in the three-dimensional environment presented at the second electronic device that is at or near the center of the field of view of the user of the second electronic device. In some examples, determining the placement location includes determining a location in the three-dimensional environment that is at a predefined distance from a viewpoint of the user (e.g., a perspective from which the user experiences the three-dimensional environment), at 310. For example, the first electronic device identifies a location in the three-dimensional environment presented at the first electronic device that is a predefined distance (e.g., 1, 1.2, 1.4, 1.5, 2, 2.5, etc. m) from the viewpoint of the user of the first electronic device. Similarly, the second electronic device identifies a location in the three-dimensional environment presented at the second electronic device that is the predefined distance from the viewpoint of the user of the second electronic device. In some examples, the placement location is determined based on the center of the user's field of view and the predefined distance from the viewpoint of the user.

In some examples, as discussed in more detail with reference to FIGS. 4A-4I, the determination of the placement location is in accordance with the satisfaction of a first set of criteria. As described above, the first electronic device and the second electronic device may each generate an occupancy map that identifies locations of physical and/or virtual objects that are within the field of view of the users of the first electronic device and the second electronic device, respectively. In some examples, the first set of criteria includes a first criterion that is satisfied when the placement location does not contain an object (e.g., a physical object or a virtual object). In some such examples, the first electronic device and the second electronic device may each utilize their respective occupancy map generated by scanning the respective environments within the field of views of the first electronic device and the second electronic device to determine whether the first criterion is satisfied. As described in more detail below, if the location within the three-dimensional environment that is at the center of the field of view of the user and/or the predefined distance from the viewpoint of the user contains an object (e.g., determined using the occupancy map) at the electronic device, the placement location may be updated (e.g., modified) to instead be a location in the three-dimensional environment, different from the center of the field of view of the user and/or the predefined distance from the viewpoint of the user, that does not contain an object. In some examples, the determined placement location is optionally provided as a suggestion (e.g., displayed as a visual element, such as a virtual pin) to the user and the user can confirm or change the placement location (e.g., by selecting and moving the visual element). In some examples, a distance between the selected placement location and the viewpoint of the initiating user is used as the distance between the viewpoint of the other user and the placement location at the other user's electronic device, or vice versa, as described in more detail herein later. In some examples, the other user has the option to move the placement location radially around their respective viewpoint at the defined distance to maintain spatial truth between the viewpoints of the users (e.g., because spatial truth requires the same offset distance, but radial changes to the placement location relative to the user can be accommodated by causing the other user's avatar to turn/orient in the corresponding direction, as discussed herein).

In some examples, after the placement location is determined, the first electronic device may enter the multi-user communication session with the one or more remote electronic devices, which includes displaying an avatar corresponding to the user(s) of the other electronic device(s) at the determined placement location(s) in the three-dimensional environment, at 312. For example, the first electronic device may display the avatar corresponding to the user of the second electronic device at the determined placement location in the three-dimensional environment presented at the first electronic device. Similarly, the second electronic device may display the avatar corresponding to the user of the first electronic device at the determined placement location in the three-dimensional environment presented at the second electronic device. In some examples, in the multi-user communication session, the avatars corresponding to the users of the first electronic device and the second electronic device are located the predefined distance (e.g., 1.5 m) away from each other in the three-dimensional environment shared between the first electronic device and the second electronic device. As described in more detail below, the placement of the avatars corresponding to the users of the first electronic device and the second electronic device optionally maintains spatial truth in the shared three-dimensional environment (e.g., maintains consistent spatial relationships between viewpoints of users and shared virtual content at each electronic device), such that the avatar corresponding to the user of the second electronic device is the predefined distance from the viewpoint of the user of the first electronic device, and the avatar corresponding to the user of the first electronic device is the predefined distance from the viewpoint of the user of the second electronic device. Attention is now directed to examples of the process 300 illustrated in FIG. 3 for initiating launching of a multi-user communication session and placing avatars corresponding to users of electronic devices in the multi-user communication session.

FIGS. 4A-4I illustrate example processes of spatial placement for avatars in a multi-user communication session according to some examples of the disclosure. In some examples, a first electronic device 460 may present a three-dimensional environment 450A, and a second electronic device 470 may present a three-dimensional environment 450B. The first electronic device 460 and the second electronic device 470 may be similar to device 101 or 260/270, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, displays formed as lenses designed to be placed on a person's eyes (e.g., similar to contact lenses), respectively. In the example of FIGS. 4A-4I, a first user is optionally wearing the electronic device 460 and a second user is optionally wearing the electronic device 470, such that the three-dimensional environments 450A/450B can be defined by X, Y and Z axes as viewed from a perspective of the electronic devices (e.g., a viewpoint associated with the users of the electronic devices 460/470).

Figure 4A:
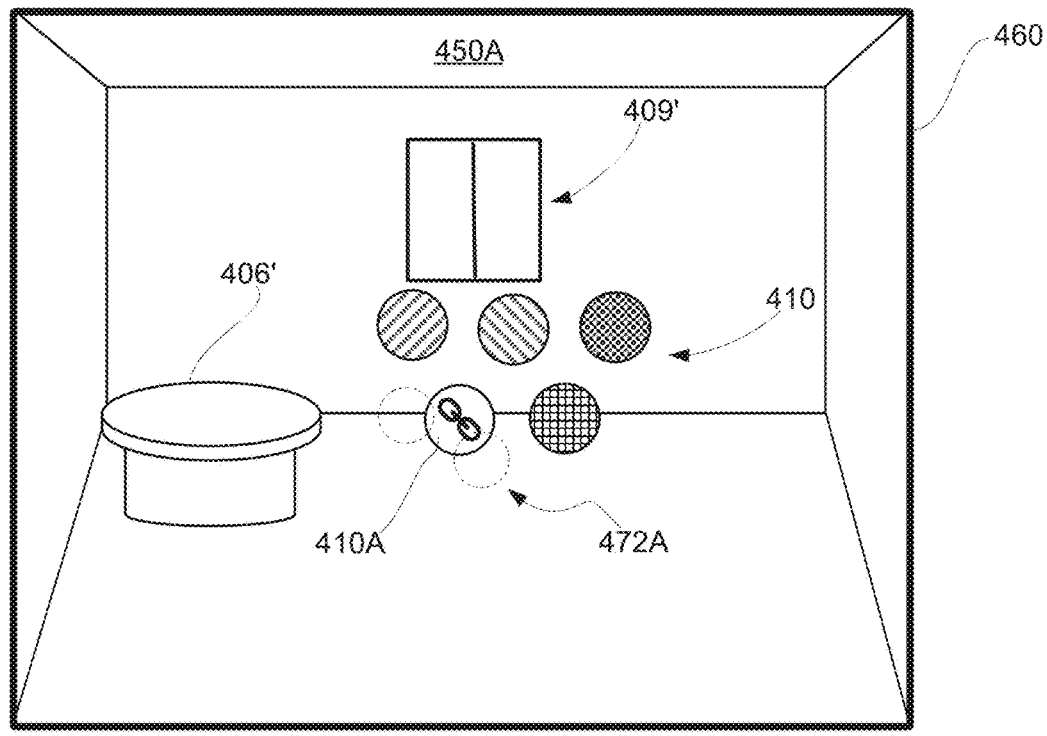
FIGS. 4A-4I illustrate example processes of spatial placement for avatars in a multi-user communication session according to some examples of the disclosure.
Figure 4A:
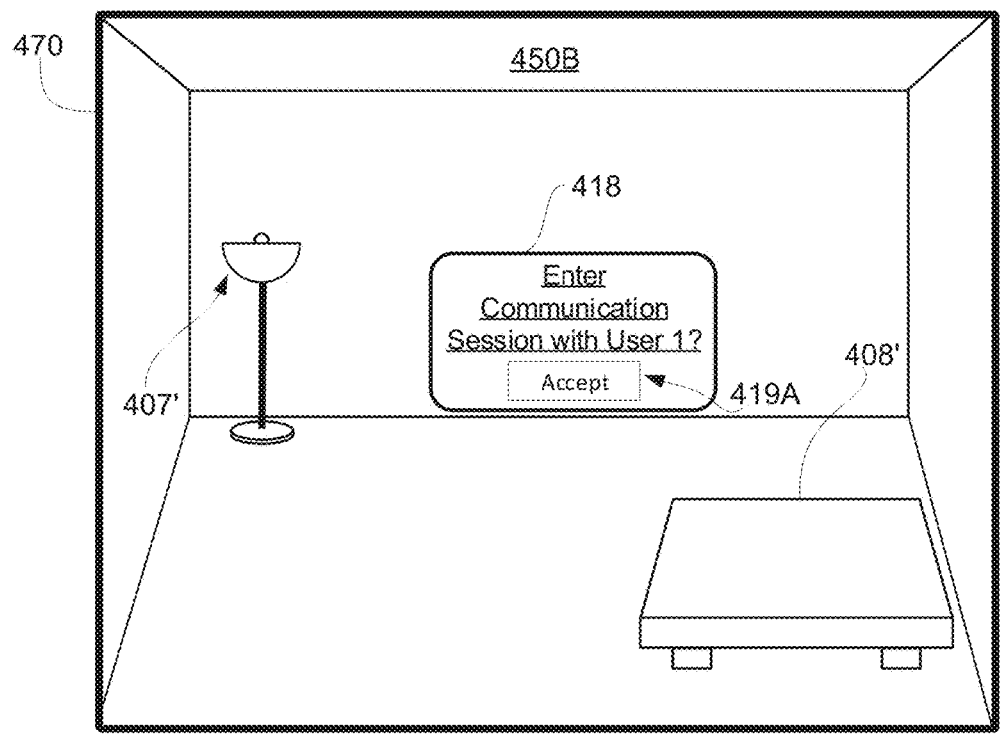

As shown in FIG. 4A, the electronic device 460 may be in a first physical environment that includes a table 406 and a window 409. Thus, the three-dimensional environment 450A presented using the electronic device 460 optionally includes captured portions of the physical environment surrounding the electronic device 460, such as a representation of the table 406' and a representation of the window 409'. Similarly, the electronic device 470 may be in a second physical environment, different from the first physical environment (e.g., separate from the first physical environment), that includes a floor lamp 407 and a coffee table 408. Thus, the three-dimensional environment 450B presented using the electronic device 470 optionally includes captured portions of the physical environment surrounding the electronic device 470, such as a representation of the floor lamp 407' and a representation of the coffee table 408'. Additionally, the three-dimensional environments 450A and 450B may include representations of the floor, ceiling, and walls of the room in which the first electronic device 460 and the second electronic device 470 are located, respectively.

As mentioned above, in some examples, the first electronic device 460 may enter a multi-user communication session with the second electronic device 470. For example, in the multi-user communication session, the first electronic device 460 and the second electronic device 470 (e.g., via communication circuitry 222A/222B) are configured to present a shared three-dimensional environment that includes one or more shared virtual objects (e.g., content such as images, video, audio and the like, representations of user interfaces of applications, etc.). As used herein, the term "shared three-dimensional environment" refers to a three-dimensional environment that is independently presented, displayed, and/or visible at two or more electronic devices via which content, applications, data, and the like may be shared and/or presented to users of the two or more electronic devices.

In some examples, the user of the first electronic device 460 may provide input at the first electronic device 460 corresponding to a request to launch a multi-user communication session with one or more remote electronic devices (e.g., such as the second electronic device 470). For example, as shown in FIG. 4A, the three-dimensional environment 450A optionally includes a plurality of virtual objects 410, which optionally correspond to (e.g., two-dimensional or three-dimensional) representations of icons associated with respective applications that may be launched at electronic device 460. In some examples, the plurality of virtual objects 410 includes a first virtual object 410A, which optionally corresponds to a representation of an icon associated with a communications application that may be launched at the first electronic device 460. For example, the virtual object 410A may be activated in three-dimensional environment 450A to cause the electronic device 460 to launch a multi-user communication session with one or more remote electronic devices (e.g., such as the second electronic device 470). In some examples, selection of the virtual object 410A enables the user of the first electronic device 460 to identify/designate (e.g., select via a user interface associated with the communications application) the one or more remote electronic devices as invitees to join the multi-user communication session with the first electronic device 460. In the example of the FIG. 4A, the user of the first electronic device 460 has optionally chosen the user of the second electronic device 470 as the invitee for joining the multi-user communication session with the user of the first electronic device 460.

As shown in FIG. 4A, the user of the first electronic device 460 is optionally providing a selection input 472A directed to the first virtual object 410A. For example, the user may provide a pinch input (e.g., in which the index finger and the thumb of the hand of the user make contact) while the gaze of the user is directed toward the first virtual object 410A (or other suitable input such as a tap input, gaze for more than a threshold period of time, etc.). In some examples, in response to receiving the selection input 472A directed to the first virtual object 410A, the second electronic device 470 optionally receives an indication of a request from the first electronic device 460 to enter the multi-user communication session with the first electronic device 460. For example, as shown in FIG. 4A, in response to receiving the indication from the first electronic device 460, the second electronic device 470 optionally displays a first user interface element 418 (e.g., a notification) corresponding to the request to enter the multi-communication session with the first electronic device 460. In some examples, the first user interface element 418 includes an option 419A that is selectable to accept the invitation, and thus initiate a process to launch a multi-user communication session between the first electronic device 460 and the second electronic device 470.

In some examples, while two or more electronic devices are communicatively linked in a multi-user communication session, avatars corresponding to the users of the two or more electronic devices are optionally displayed within the shared three-dimensional environments presented at the two or more electronic devices. Accordingly, as described previously with reference to FIG. 3, launching the multi-user communication session between the first electronic device 460 and the second electronic device 470 includes identifying a suitable placement location within the three-dimensional environments 450A/450B at which to place the avatars corresponding to the users of the first electronic device 460 and the second electronic device 470. For example, the first electronic device optionally identifies a suitable placement location within the three-dimensional environment 450A at which to place an avatar corresponding to the user of the second electronic device 470, and the second electronic device optionally identifies a placement location within the three-dimensional environment 450B at which to place an avatar corresponding to the user of the first electronic device 460.

In some examples, it may be advantageous to automatically control the placement of the avatars corresponding to the users of electronic devices that are communicatively linked in a multi-user communication session. As discussed above, the three-dimensional environment optionally includes avatars corresponding to the users of the electronic devices that are in the communication session, wherein the avatars provide spatial reference points of relative distances and orientations between virtual locations of users within the shared environment of the multi-user communication session. In some instances, the physical environment surrounding a respective electronic device may contain physical objects that are within the field of view of a user of the respective electronic device. Placement of avatars at locations within the three-dimensional environment that are occupied by physical (and/or virtual) objects may cause portions of the avatars to be obscured, cut-off, or otherwise appear unrealistic from the viewpoints of the users of the electronic devices in the multi-user communication session. In some such examples, allowing users to manually select placement locations for avatars in the shared three-dimensional environment in the multi-user communication session may avoid placement of avatars in locations that intersect physical objects, but coordinating such placement locations among multiple users may increase the cognitive burden for the users. Thus, as discussed in more detail below, when placing avatars in the three-dimensional environment in a multi-user communication session, the electronic devices may automatically select placement locations at which to display the avatars that avoid physical and/or virtual objects within the field of view of the users and that maintain spatial consistency between the users of the electronic devices.

In some examples, when the user of the second electronic device 470 provides input at the second electronic device 470 to accept the invitation to join the multi-user communication session with the first electronic device 460 (e.g., via the accept option 419A in FIG. 4A), the first electronic device 460 and the second electronic device 470 may scan the physical environments surrounding the first electronic device 460 and the second electronic device 470. For example, as described previously with reference to FIG. 3, the first electronic device 460 and the second electronic device 470 may each scan the physical environments within the field of view of the electronic device (e.g., via image sensors 206A/206B in FIG. 2) to generate an occupancy map at each electronic device. As described above, the occupancy map may identify locations within the field of view of an electronic device that contain objects and that do not contain objects. In some examples, the first electronic device 460 and the second electronic device 470 may utilize the occupancy map to determine a placement location for each of the avatars corresponding to the users of the first electronic device 460 and the second electronic device 470.

Figure 4B:
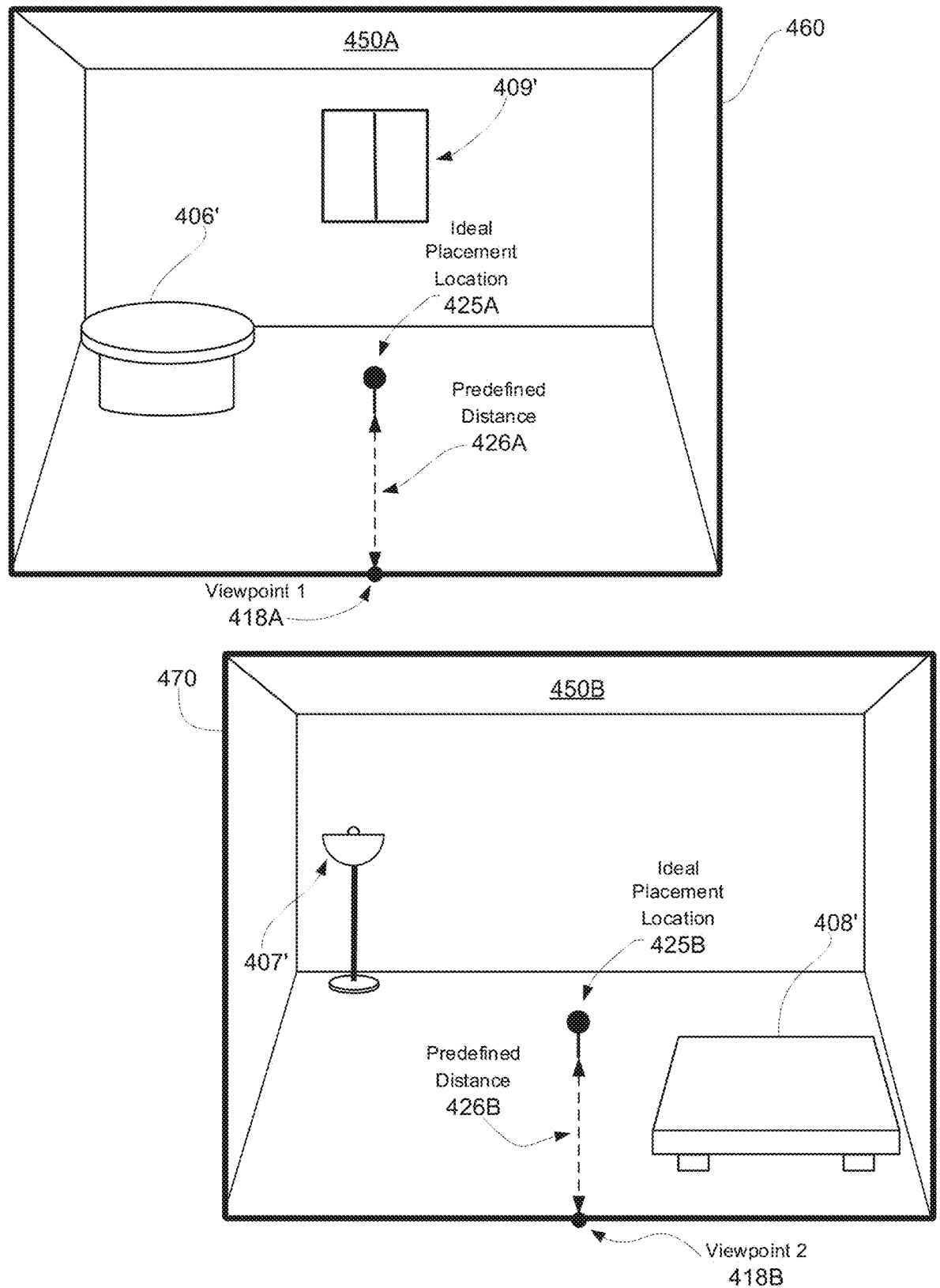

As shown in FIG. 4B, the first electronic device 460 optionally determines a first preferred placement location 425A within three-dimensional environment 450A, and the second electronic device 470 optionally determines a second preferred placement location 425B within three-dimensional environment 450B. As discussed above when referring to FIG. 3, determining the placement location for the avatars includes identifying a location that is at or near a center of the field of view of the user and/or that is a predetermined distance from a viewpoint of the user. In some examples, a preferred placement location is a location that is at the center of the field of view of the user of an electronic device and that is at the predetermined distance from the viewpoint of the user. For example, as shown in FIG. 4B, the determined first placement location 425A within three-dimensional environment 450A is at a center of the field of view of the user of the first electronic device 460, and is a predefined distance (e.g., 1, 1.2, 1.4, 1.5, 2, 2.5, etc. m) 426A away from a viewpoint 418A of the user of the first electronic device 460. Similarly, the determined second placement location 425B within three-dimensional environment 450B is at a center of the field of view of the user of the second electronic device 470, and is the predefined distance 426B away from the viewpoint 418B of the user of the second electronic device 470. In some examples, as discussed in more detail later, the predefined distance 426A at the first electronic device 460 is optionally equal to the predefined distance 426B at the second electronic device 470.

In some examples, after the electronic devices 460/470 determine preferred placement locations for the avatars corresponding to the users of the electronic devices 460/470, the electronic devices 460/470 optionally evaluate whether the identified placement locations satisfy a first set of criteria. As discussed above with reference to FIG. 3, the first set of criteria optionally includes a first criterion that is satisfied when the identified placement location is not occupied by an object (e.g., a virtual or physical object). In some examples, the first electronic device 460 and the second electronic device 470 may utilize each of their generated occupancy maps to determine whether the identified placement locations satisfy the first set of criteria. For example, with reference to FIG. 4B, because the identified placement location 425A within three-dimensional environment 450A at the first electronic device 460 does not contain an object, the identified placement location 425A satisfies the first set of criteria. Similarly, because the identified placement location 425B within three-dimensional environment 450B at the second electronic device 470 does not contain an object, the identified placement location 425B satisfies the first set of criteria. As such, the first electronic device 460 and the second electronic device 470 may proceed to displaying the avatars corresponding to the users of the first electronic device 460 and the second electronic device 470 at the identified placement locations in the three-dimensional environments 450A/450B.

Figure 4C:
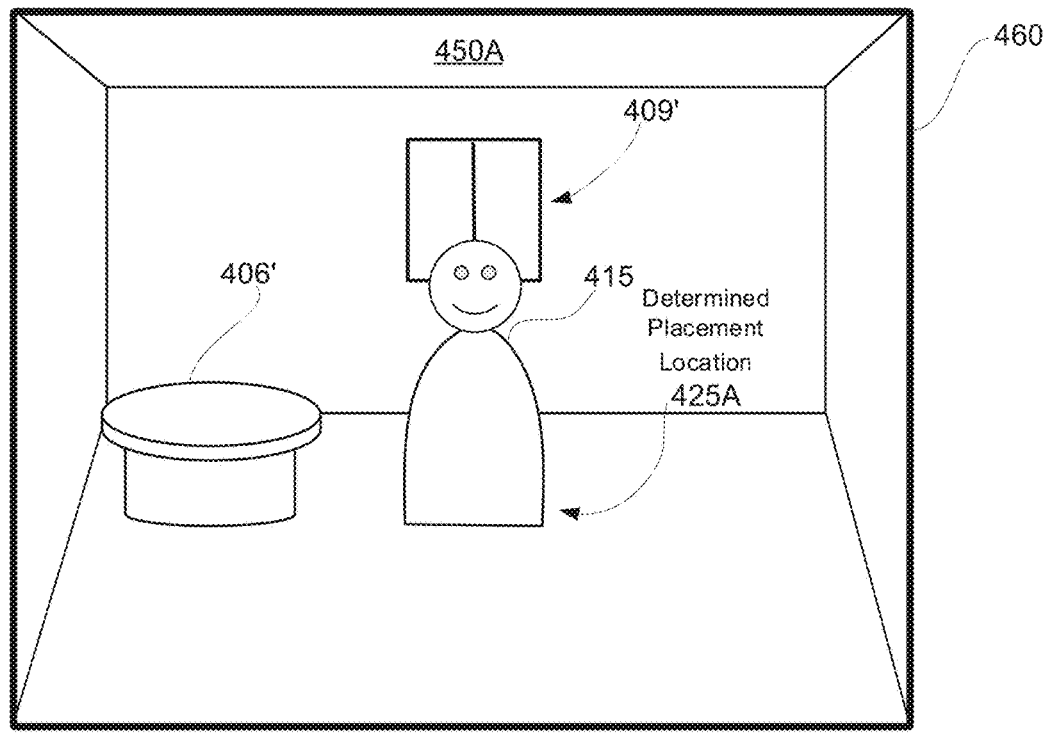
Figure 4C:
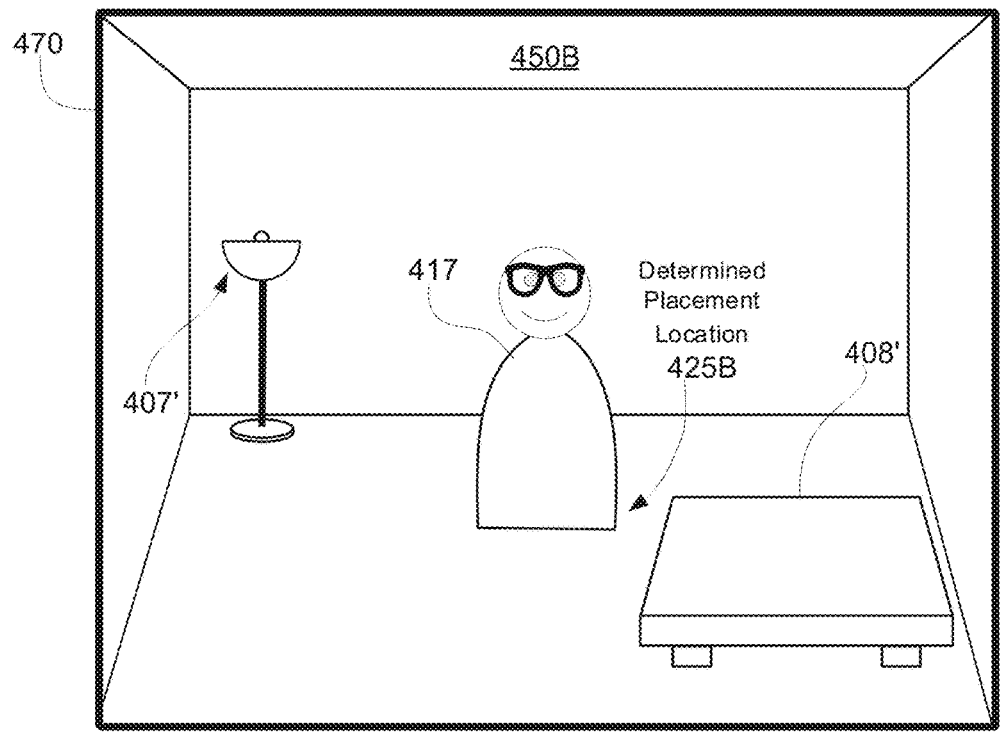

As shown in FIG. 4C, the first electronic device 460 optionally displays an avatar 415 corresponding to the user of the second electronic device 470 at the first placement location 425A within the three-dimensional environment 450A. Similarly, the second electronic device 470 optionally displays an avatar 417 corresponding to the user of the first electronic device 460 at the second placement location 425B within the three-dimensional environment 450B. In some examples, the avatar 415 corresponding to the user of the second electronic device 470 may be displayed the predefined distance 426A from the viewpoint 418A of the user of the first electronic device 460, and the avatar 417 corresponding to the user of the first electronic device 460 may be displayed the predefined distance 426B from the viewpoint 418B of the user of the second electronic device 470. As mentioned above, in some examples, the predefined distance 426A at the first electronic device 460 and the predefined distance 426B at the second electronic device 470 may be equal. For example, if the predefined distances 425A/425B are both values between 1 m-1.5 m, the avatar 415 is optionally a value between 1 m-1.5 m from the viewpoint of the user of the first electronic device 460 and the avatar 417 is also optionally the same value between 1 m-1.5 m from the viewpoint of the user of the second electronic device 470. In this way, the avatars corresponding to the users of the electronic devices 460/470 maintain spatial truth within their respective three-dimensional environments 450A/450B at the initiation of the multi-user communication session between the first electronic device 460 and the second electronic device 470. Thus, with the display of the avatars 415 and 417 within the three-dimensional environments 450A and 450B, as shown in FIG. 4C, the first electronic device 460 and the second electronic device 470 are communicatively linked in the multi-user communication session.

In some examples, the presentation of avatars 415/417 as part of the shared three-dimensional environment is optionally accompanied by an audio effect corresponding to a voice of the users of the electronic devices 470/460. For example, the avatar 415 displayed in the three-dimensional environment 450A using the first electronic device 460 is optionally accompanied by an audio effect corresponding to the voice of the user of the second electronic device 470. In some such examples, when the user of the second electronic device 470 speaks, the voice of the user may be detected by the second electronic device 470 (e.g., via the microphone(s) 213B) and transmitted to the first electronic device 460 (e.g., via the communication circuitry 222B/222A), such that the detected voice of the user of the second electronic device 470 may be presented as audio (e.g., using speaker(s) 216A) to the user of the first electronic device 460 in three-dimensional environment 450A. Similarly, the avatar 417 displayed in the three-dimensional environment 450B using the second electronic device 470 is optionally accompanied by an audio effect corresponding to the voice of the user of the first electronic device 460. In some such examples, when the user of the first electronic device 460 speaks, the voice of the user may be detected by the first electronic device 460 (e.g., via the microphone(s) 213A) and transmitted to the second electronic device 470 (e.g., via the communication circuitry 222A/222B), such that the detected voice of the user of the first electronic device 460 may be presented as audio (e.g., using speaker(s) 216B) to the user of the second electronic device 470 in three-dimensional environment 450B.

In some examples, while in the multi-user communication session, the avatars 415/417 are displayed in the three-dimensional environments 450A/450B with respective orientations that correspond to and/or are based on orientations of the electronic devices 460/470 in the physical environments surrounding the electronic devices 460/470. For example, as shown in FIG. 4C, in the three-dimensional environment 450A, the avatar 415 is optionally facing toward the viewpoint (e.g., viewpoint 418A) of the user of the first electronic device 460, and in the three-dimensional environment 450B, the avatar 417 is optionally facing toward the viewpoint (e.g., viewpoint 418B) of the user of the second electronic device 470. As a particular user moves the electronic device in the physical environment, the viewpoint of the user changes in accordance with the movement, which may thus also change an orientation of the user's avatar in the three-dimensional environment. For example, with reference to FIG. 4C, if the user of the first electronic device 460 were to look leftward in the three-dimensional environment 450A such that the first electronic device 460 is rotated (e.g., a corresponding amount) to the left (e.g., counterclockwise), the user of the second electronic device 470 would see the avatar 417 corresponding to the user of the first electronic device 460 rotate to the right (e.g., clockwise) in accordance with the movement of the first electronic device 460.

Additionally, in some examples, while in the multi-user communication session, a viewpoint of the three-dimensional environments 450A/450B and/or a location of the viewpoint of the three-dimensional environments 450A/450B optionally changes in accordance with movement of the electronic devices 450A/450B (e.g., by the users of the electronic devices 450A/450B). For example, while in the communication session, if the electronic device 460 is moved closer toward the representation of the table 406' and/or the avatar 415 (e.g., because the user of the electronic device 460 moved forward in the physical environment surrounding the electronic device 460), the viewpoint (e.g., viewpoint 418A) of the user of the first electronic device 460 would change accordingly, such that the representation of the table 406', the representation of the window 409' and the avatar 415 appear larger in the field of view of three-dimensional environment 450A.

In some examples, the avatars 415/417 are a representation (e.g., a full-body rendering) of each of the users of the electronic devices 470/460. In some examples, the avatars 415/417 are each a representation of a portion (e.g., a rendering of a head, face, head and torso, etc.) of the users of the electronic devices 470/460. In some examples, the avatars 415/417 are a user-personalized, user-selected, and/or user-created representation displayed in the three-dimensional environments 450A/450B that is representative of the users of the electronic devices 470/460. It should be understood that, while the avatars 415/417 illustrated in FIG. 4C correspond to simplified representations of a full body of each of the users of the electronic devices 470/460, respectively, alternative avatars may be provided, such as those described above.

It should be understood that, in some examples, more than two electronic devices may be communicatively linked in a multi-user communication session. For example, in a situation in which three electronic devices are communicatively linked in a multi-user communication session, a first electronic device would display two avatars, rather than just one avatar, corresponding to the users of the other two electronic devices. It should therefore be understood that the various processes and exemplary interactions described herein with reference to initializing and facilitating a multi-user communication session between the first electronic device 460 and the second electronic device 470 optionally apply to situations in which more than two electronic devices are communicatively linked in a multi-user communication session. For example, in situations in which more than two electronic devices (e.g., three, four, five, eight, ten, etc.) electronic devices are initializing a multi-communication session, the electronic devices optionally scan the environments surrounding each electronic device, respectively, to generate an occupancy map at each electronic device. The spatial arrangement for placement of the avatars corresponding to the users of the electronic devices may be determined based on the occupancy maps generated by the electronic devices. In some examples, particularly in situations in which more than two electronic devices are joining the multi-communication session, an alternative placement arrangement may be utilized when placing the avatars corresponding to the users of the electronic devices in the three-dimensional environment. For example, to accommodate the increased number of avatars to be displayed in the three-dimensional environment (e.g., due to the increased number of the electronic devices in the multi-user communication session), the electronic devices may adopt a circular/oval-shaped (or some other shape) placement arrangement, such that the avatars corresponding to the users of the electronic device are displayed in a circular/oval-shaped (or some other shape) in the three-dimensional environment. In some such examples, the electronic devices may utilize the generated occupancy maps to identify placement locations (e.g., points) along the circle/oval (or other shape) at which to place the avatars.

In some examples, the identified first placement location 425A and/or the identified second placement location 425B may not satisfy the first set of criteria described above. For example, the identified first placement location 425A and/or the identified second placement location 425B may contain one or more objects (e.g., physical and/or virtual objects), which optionally fails to satisfy the first set of criteria. Accordingly, as discussed in detail below with reference to FIGS. 4D-4I, the first electronic device 460 and/or the second electronic device 470 may alter the placement location within the three-dimensional environment and identify one or more candidate placement locations that satisfy the first set of criteria.

Figure 4D:
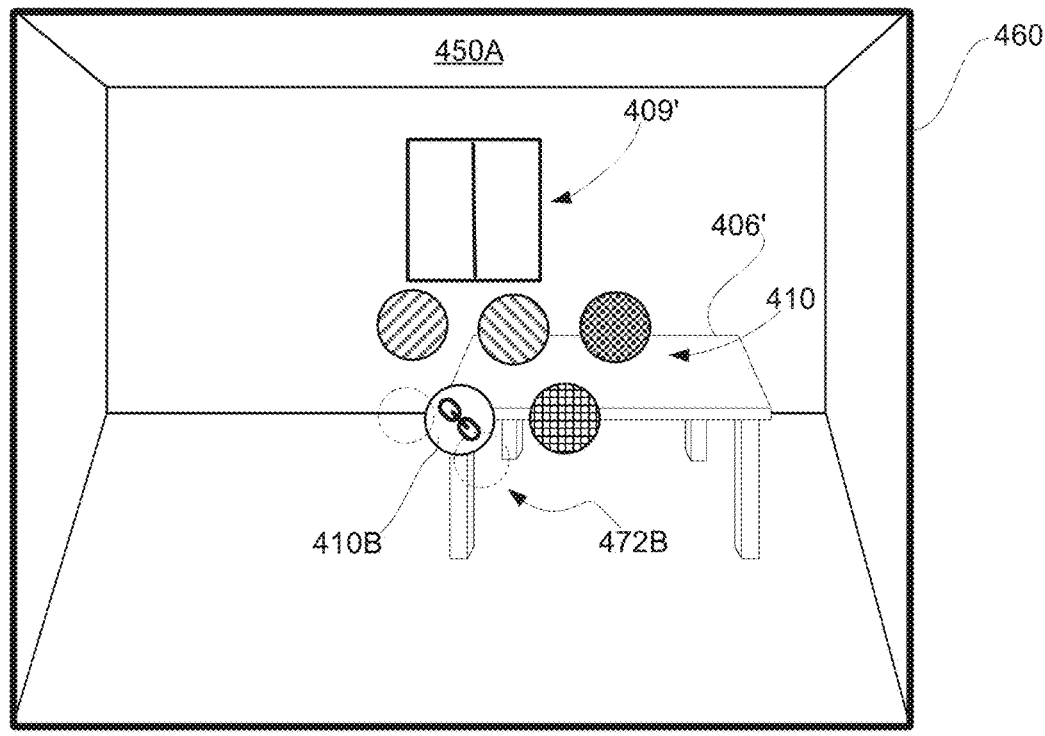
Figure 4D:
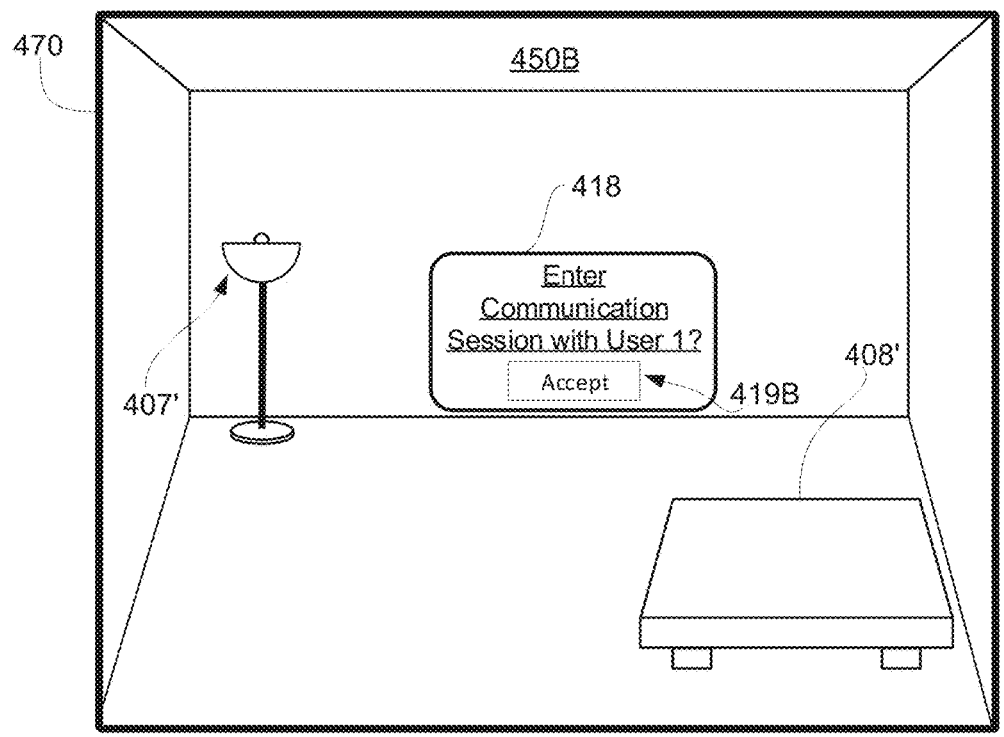

As shown in FIG. 4D, in some examples, the first electronic device 460 may present the three-dimensional environment 450A, which optionally includes the plurality of virtual objects 410, as similarly described above with reference to FIG. 4A. In the example of FIG. 4D, the three-dimensional environment 450B may include representations of the captured portions of the physical environment surrounding the first electronic device 460, such as the representation of the table 406' and the representation of the window 409'. As shown in FIG. 4D, the representation of the table 406' is optionally located behind the plurality of virtual objects 410. Similarly, the second electronic device 470 may present the three-dimensional environment 450B, which optionally includes representations of the captured portions of the physical environment surrounding the second electronic device, such as the representation of the floor lamp 407' and the representation of the coffee table 408'.

As discussed similarly above, the user of the first electronic device 460 may provide input at the first electronic device 460 corresponding to a request to enter a multi-user communication session with the second electronic device 470. For example, as shown in FIG. 4D, the user of the first electronic device 460 may provide the selection input 472B (e.g., via a pinch gesture, a tap or touch input, a verbal command, etc.) directed to the first virtual object 410B for launching the multi-user communication session. As shown, the second electronic device 470 may receive an indication from the first electronic device 460 corresponding to an invitation to join the multi-user communication session with the first electronic device 460. In response to receiving the indication, the second electronic device 470 optionally displays the first user interface element 418 corresponding to the invitation, which includes a selectable option 419B to accept the invitation from the first electronic device 460 and cause the second electronic device 470 join the multi-user communication session with the first electronic device 460.

In some examples, in response to receiving an input accepting the invitation to join the multi-user communication session with the first electronic device 460 (e.g., via selection input received at the accept option 419B), the first electronic device 460 and the second electronic device 470 may initiate launching of the multi-user communication session. As described above, in some examples, the first electronic device 460 and the second electronic device 470 may each scan the physical environment surrounding the electronic device, to identify respective locations of physical objects and/or open space (e.g., locations not containing objects) within the field of view of the user of the electronic device. For example, the first electronic device 460 may scan the physical environment surrounding the first electronic device 460 to generate an occupancy map characterizing the environment within the field of view of the user of the first electronic device 460, such as identifying locations of physical objects (e.g., the table 406) within the field of view of the user of the first electronic device 460. Similarly, the second electronic device 470 may scan the physical environment surrounding the second electronic device 470 to generate an occupancy map characterizing the environment within the field of view of the user of the second electronic device 470, such as identifying locations of physical objects (e.g., the floor lamp 407 and/or the coffee table 408) within the field of view of the user of the second electronic device 470.

Figure 4E:
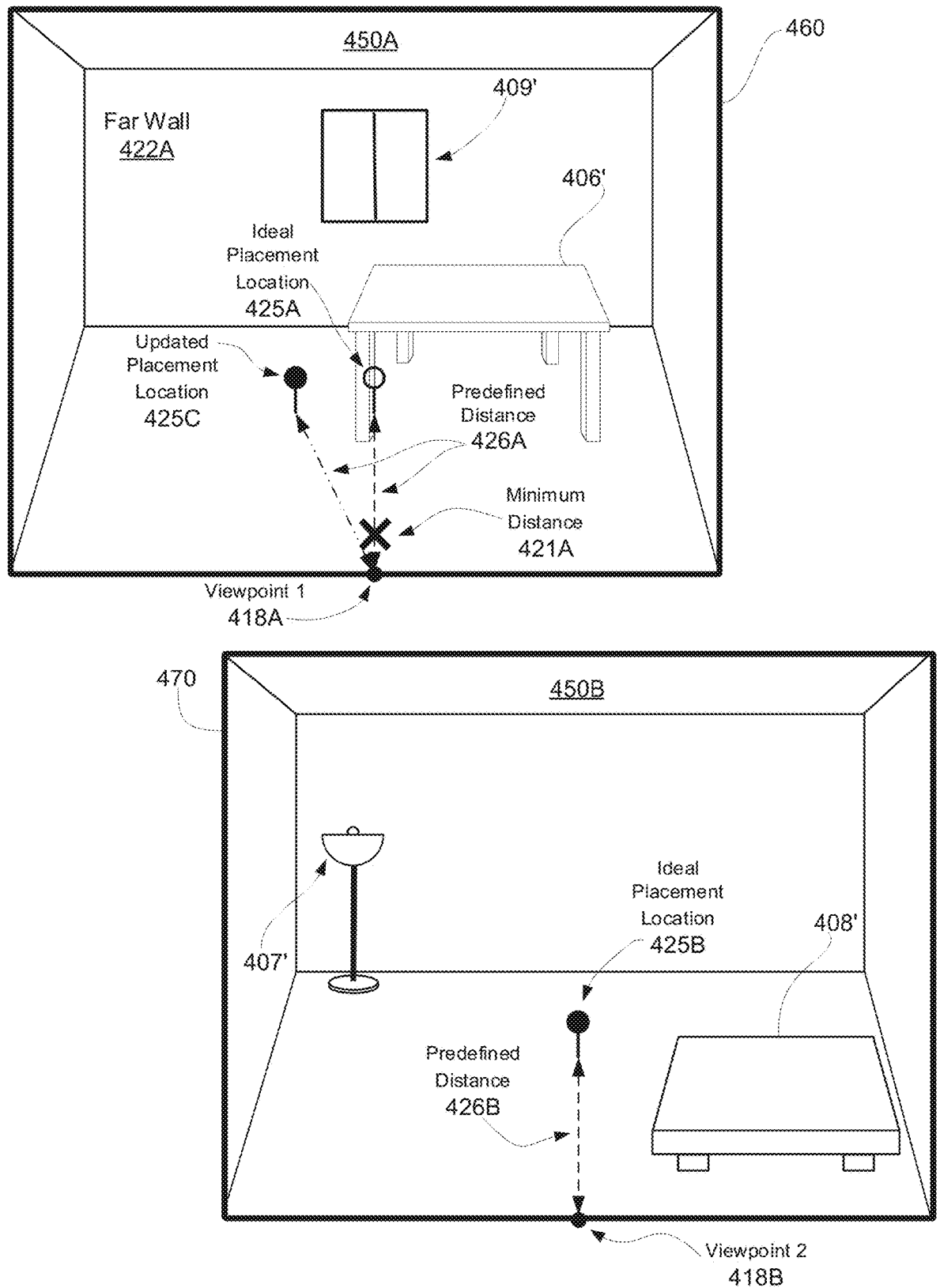

In some examples, using the occupancy map generated at the first electronic device 460 and the second electronic device 470, the first electronic device 460 and the second electronic device 470 may identify a placement location within the three-dimensional environments 450A/450B at which to place an avatar corresponding to a user of the first electronic device 460 and an avatar corresponding to a user of the second electronic device 470. For example, as similarly discussed above and as shown in FIG. 4E, the first electronic device 460 may identify a placement location 425A that is at or near (e.g., within 0.25, 0.5, 0.8, 1, 1.5, 2, 2.5, etc. m of) the center of the field of view of the user of the first electronic device 460 and/or that is a predefined distance (e.g., 1, 1.4, 1.5, 1.8, 2, 2.5, 3, etc. m) 426A from the viewpoint 418A of the user of the first electronic device 460. As shown in FIG. 4E, the identified placement location 425A within the three-dimensional environment 450A at least partially intersects with a portion of an object within the three-dimensional environment 450A, namely a front leg of the table 406 in the physical environment surrounding the first electronic device 460. Because a portion of the representation of the table 406' intersects/overlaps with the preferred placement location 425A, the first set of criteria is not satisfied. Accordingly, in some examples, the first electronic device 460 may proceed to identifying an updated/candidate placement location, different from the preferred placement location 425A, within the three-dimensional environment 450A.

As shown in FIG. 4E, in some examples, the first electronic device 460 may utilize the occupancy map generated at the first electronic device 460 to identify an updated placement location 425C within the three-dimensional environment 450A. As shown, the updated placement location 425C is optionally a location that is offset (e.g., angularly by 3, 5, 10, 15, 20, 25, 30, etc. degrees) to the left of the preferred placement location 425A from the viewpoint 418A of the user of the first electronic device 460, and/or that is the predefined distance 426A from the viewpoint 418A. It should be understood that, while the relative lengths of the arrows representing the predefined distances 426A may appear to be different in FIG. 4E, the distance between the viewpoint 418A and each of the placement locations 425A and 425C are optionally the same.

In some examples, identifying an updated placement location may include altering the distance between the identified placement location (e.g., 425A) and the viewpoint (e.g., 418A) of the user of the electronic device. In some examples, relative bounds determined by the environment surrounding the electronic device may limit the degrees to which the distance is increased or decreased. For example, as shown in FIG. 4E, at the first electronic device 460, a first bound 421A may impose a minimum distance between a candidate placement location and the viewpoint 418A of the user of the first electronic device 460. In some examples, the minimum distance may be a predetermined value (e.g., 0.5, 0.8, 1, 1.2, etc. m) and may restrict how close (e.g., to the viewpoint of the user) the avatar corresponding to the user of the other electronic device is initially placed in the three-dimensional environment. Additionally, for example, at the first electronic device 460, a second bound 422A may impose a maximum distance between the candidate placement location and the viewpoint 418A of the user of the first electronic device 460. In some examples, the maximum distance may be a predetermined value (e.g., 4, 4.5, 5, 7, 8, 10, etc. m), and/or may be determined based on limitations in the physical environment surrounding the electronic device. For example, the second bound 422A in FIG. 4E may be determined based on the far wall in the physical environment in the field of view of the user of the first electronic device 460, and thus may restrict how far (e.g., from the viewpoint 418A) the avatar corresponding to the user of the second electronic device is initially placed in three-dimensional environment 450A. Because an open space exists to the left of the representation of the table 406' at the predefined distance 426A, the first electronic device 460 optionally forgoes adjusting the distance between the identified placement location 425C and the viewpoint 418A. As shown in FIG. 4E, the updated placement location 425C is not occupied by any objects which satisfies the first criterion, and thus, satisfies the first set of criteria at the first electronic device 460.

As shown in FIG. 4E, the second electronic device 470 may also identify a placement location 425B within the three-dimensional environment 450B that is at or near the center of the field of view of the user of the second electronic device 470 and/or that is the predefined distance 426B from the viewpoint 418B of the user of the second electronic device 470. In some examples, because the identified placement location 425B within the three-dimensional environment 450B is not occupied by any objects, the identified placement location 425B optionally satisfies the first criterion, and thus the first set of criteria at the second electronic device 470. In some examples, the predefined distance 426A at the first electronic device 460 may be equal to the predefined distance 426B at the second electronic device 470.

Figure 4F:
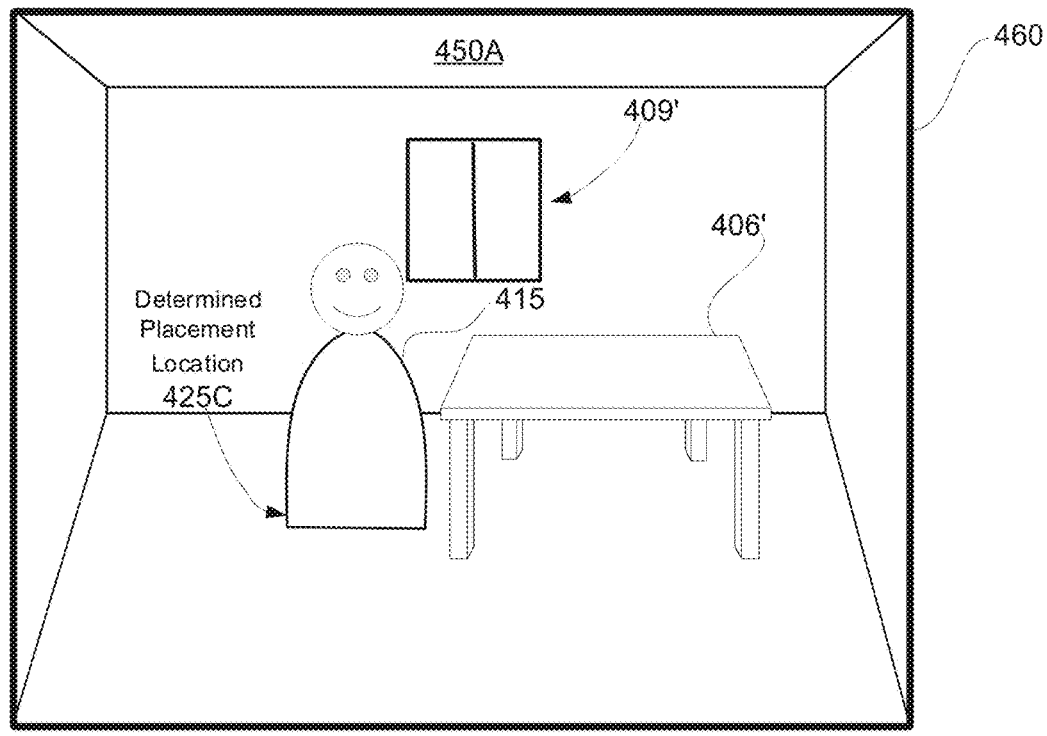
Figure 4F:
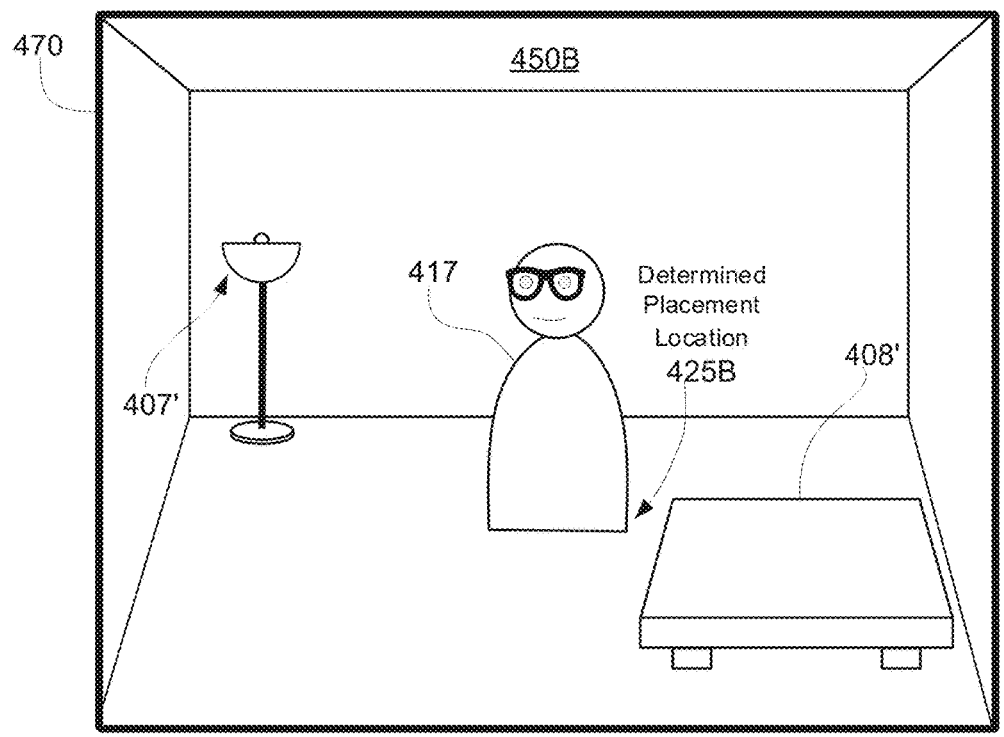

In some examples, in accordance with the determination that the placement locations identified at the first electronic device 460 and the second electronic device 470 satisfy the first set of criteria, the first electronic device 460 and the second electronic device 470 may display avatars corresponding to the users of the first electronic device 460 and the second electronic device 470 at the identified placement locations. For example, as shown in FIG. 4F, the first electronic device 460 may place the avatar 415 corresponding to the user of the second electronic device 470 at the determined placement location 425C in three-dimensional environment 450A. Similarly, as shown, the second electronic device 470 may place the avatar 417 corresponding to the user of the first electronic device 460 at the determined placement location 425B in three-dimensional environment 450B. As discussed above, the avatar 415 corresponding to the user of the second electronic device 470 may be the predefined distance (e.g., 1.5 m) from the viewpoint (e.g., viewpoint 418A) of the user of the first electronic device 460, and the avatar 417 corresponding to the user of the first electronic device 460 may be the predefined distance from the viewpoint (e.g., viewpoint 418B) of the user of the second electronic device 470.

As described above with reference to FIG. 4C, the avatars 415 and 417 may be displayed in three-dimensional environments 450A and 450B with respective orientations corresponding to the orientations of the electronic devices 460 and 470 presenting the three-dimensional environments 450A and 450B. In some examples, when the avatars 415 and 417 are initially placed at the determined placement locations within the three-dimensional environments 450A and 450B, the respective orientations of the avatars 415 and 417 may be indicative of determined placement locations that are off-center (e.g., with respect to the center of the field of view of the user of the electronic device). For example, as shown in FIG. 4F, at the second electronic device 470, because the determined placement location 425B in three-dimensional environment 450B is at the center of the field of view of the user of the second electronic device 470, and an orientation of the user of the second electronic device 470 optionally corresponds to the center of the field of view of the user of the second electronic device 470, the first electronic device 460 may display the avatar 415 corresponding to the user of the second electronic device 470 with an orientation that is facing toward the viewpoint (e.g., viewpoint 418A) of the user of the first electronic device 460 (e.g., illustrated by the orientation of the face of the avatar 415). At the first electronic device 460, for example, because the determined placement location 425C in three-dimensional environment 450A is to the left of the center of the field of view of the user of the first electronic device 460, and an orientation of the user of the first electronic device 460 optionally corresponds to the center of the field of view of the user of the first electronic device 460, the second electronic device 470 may display the avatar 417 of the user of the first electronic device 460 with an orientation that is facing leftward relative to the viewpoint (e.g., viewpoint 418B) of the user of the second electronic device 470 (e.g., illustrated by the orientation of the face of the avatar 417), as shown.

It should be understood that, while the orientations of the faces of the avatars 415/417 are utilized in FIG. 4F to indicate (e.g., changes to) the respective orientations of the avatars 415/417 of the users within the three-dimensional environments 450A/450B, additional or alternative characteristics of the avatars 415/417 may be utilized to convey changes to the respective orientations of the avatars 415/417. For example, for avatars including full-body and/or upper-body renderings of the users of the electronic devices, the torso (e.g., including the shoulders, arms, and/or chest) of each of the avatars may indicate the respective orientations of the avatars within the three-dimensional environments 450A/450B. Similarly, for avatars including full-body renderings of the users of the electronic devices, the lower-body (e.g., including the hips, legs, and/or feet) of each of the avatars may indicate the respective orientations of the avatars within the three-dimensional environments 450A/450B.

As described above, with the placement of the avatars 415 and 417 within the three-dimensional environments 450A and 450B, respectively, the first electronic device 460 and the second electronic device 470 are communicatively linked in the multi-user communication session. Thus, as outlined above, one advantage of the disclosed placement method for avatars in a multi-user communication session is the facilitation of automatic placement of avatars individually at each electronic device based on locations of objects in the environments surrounding the electronic devices, thereby reducing the cognitive burden on users when launching and/or operating in the multi-user communication session. Attention is now directed to an example in which objects are located at the preferred placement locations at both the first electronic device and the second electronic device, requiring spatial compromise between the first electronic device and the second electronic device, as described below.

Figure 4G:
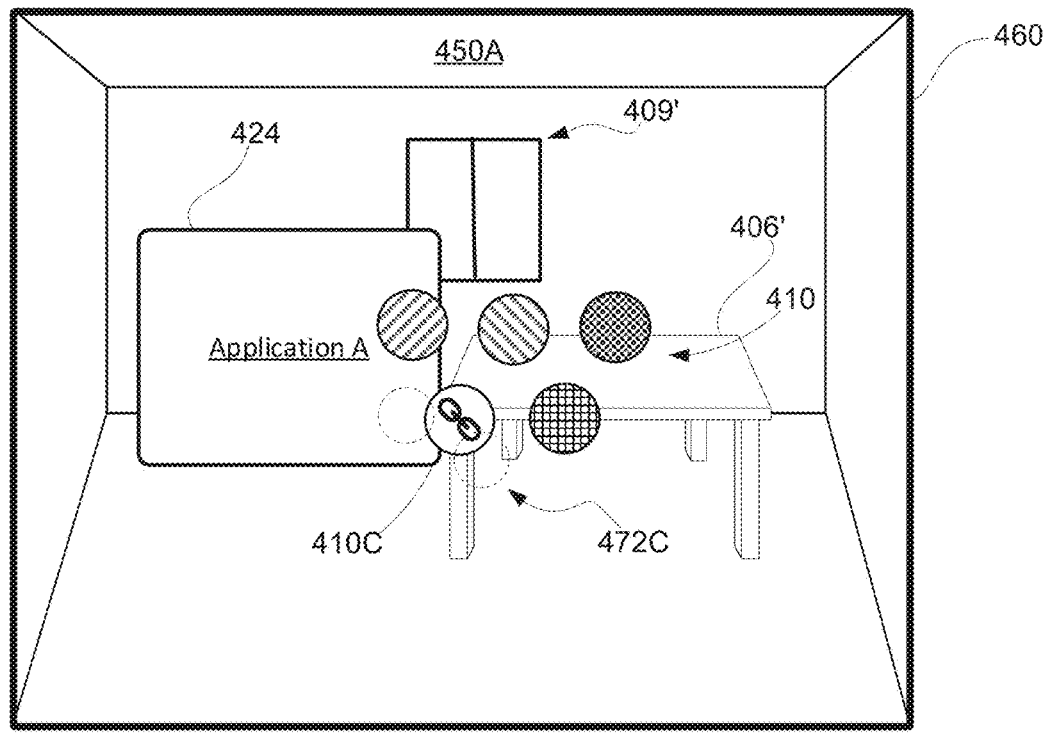
Figure 4G:
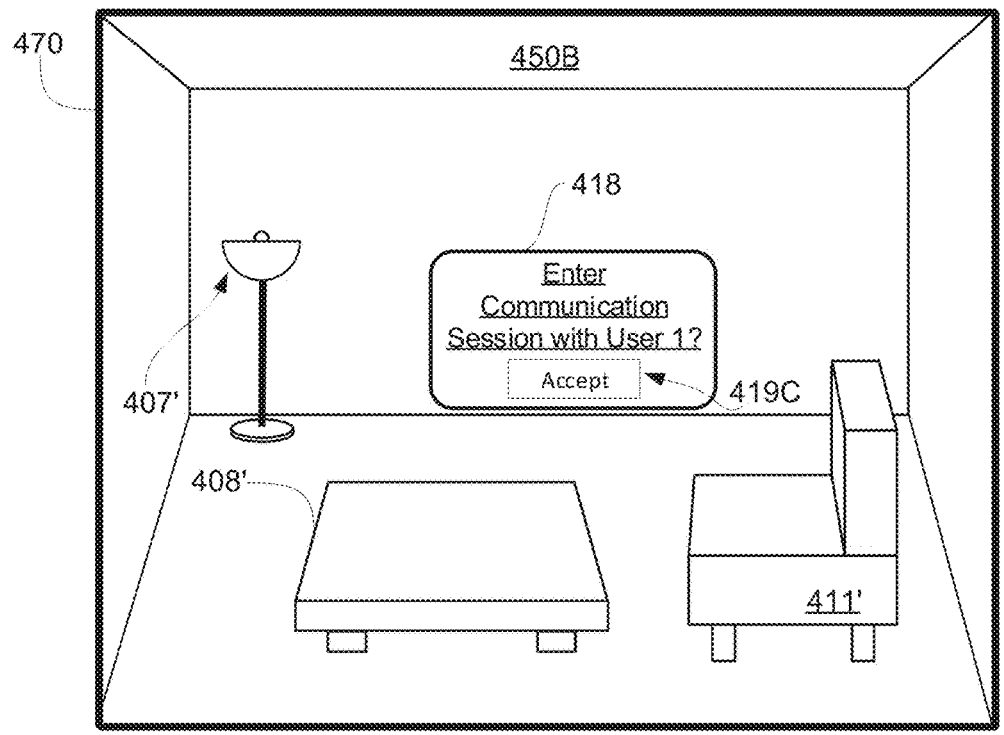

As shown in FIG. 4G, in some examples, the first electronic device 460 may present the three-dimensional environment 450A, which optionally includes the plurality of virtual objects 410, as similarly described above with reference to FIGS. 4A and 4D. Additionally, as shown, the three-dimensional environment 450A may include a respective user interface element 424 corresponding to a respective application (e.g., Application A) running on the first electronic device 460. In the example of FIG. 4G, the three-dimensional environment 450A may include representations of the captured portions of the physical environment surrounding the first electronic device 460, such as the representation of the table 406' and the representation of the window 409'. As shown in FIG. 4G, the representation of the table 406' is optionally located behind the plurality of virtual objects 410. Similarly, the second electronic device 470 may present the three-dimensional environment 450B, which optionally includes representations of the captured portions of the physical environment surrounding the second electronic device, such as the representation of the floor lamp 407', the representation of the coffee table 408', and a representation of a sofa 411'.

As discussed similarly above, the user of the first electronic device 460 may provide input at the first electronic device 460 corresponding to a request to enter a multi-user communication session with the second electronic device 470. For example, as shown in FIG. 4G, the user of the first electronic device 460 may provide the selection input 472C (e.g., via a pinch gesture, a tap or touch input, a verbal command, etc.) directed to the first virtual object 410C for launching the multi-user communication session. As shown, the second electronic device 470 may receive an indication from the first electronic device 460 corresponding to an invitation to join the multi-user communication session with the first electronic device 460. In response to receiving the indication, the second electronic device 470 optionally displays the first user interface element 418 corresponding to the invitation, which includes a selectable option 419C to accept the invitation from the first electronic device 460 and cause the second electronic device 470 join the multi-user communication session with the first electronic device 460.

In some examples, in response to receiving an input accepting the invitation to join the multi-user communication session with the first electronic device 460 (e.g., via selection input received at the accept option 419C), the first electronic device 460 and the second electronic device 470 may initiate launching of the multi-user communication session. As described above, in some examples, the first electronic device 460 and the second electronic device 470 may each scan the physical environment surrounding the electronic device, to identify respective locations of physical objects and/or open space (e.g., locations not containing objects) within the field of view of the user of the electronic device. For example, the first electronic device 460 may scan the physical environment surrounding the first electronic device 460 to generate an occupancy map characterizing the environment within the field of view of the user of the first electronic device 460, such as identifying locations of physical objects (e.g., the table 406) within the field of view of the user of the first electronic device 460. Similarly, the second electronic device 470 may scan the physical environment surrounding the second electronic device 470 to generate an occupancy map characterizing the environment within the field of view of the user of the second electronic device 470, such as identifying locations of physical objects (e.g., the floor lamp 407, the coffee table 408 and/or the sofa 411) within the field of view of the user of the second electronic device 470.

Additionally, as described with reference to FIG. 3, in some examples, generating the occupancy map at the first electronic device 460 and the second electronic device 470 may include identifying locations of virtual objects within the field of view of the user of the first electronic device 460 and that of the second electronic device 470. For example, as mentioned above, the three-dimensional environment 450A presented at the first electronic device 460 may include the respective user interface element 424 in the field of view of the user of the first electronic device 460. When generating the occupancy map at the first electronic device 460, the location of the respective user interface element 424 within the three-dimensional environment 450A may be identified along with the locations of the physical objects in the field of view of the user of the first electronic device 460.

Figure 4H:
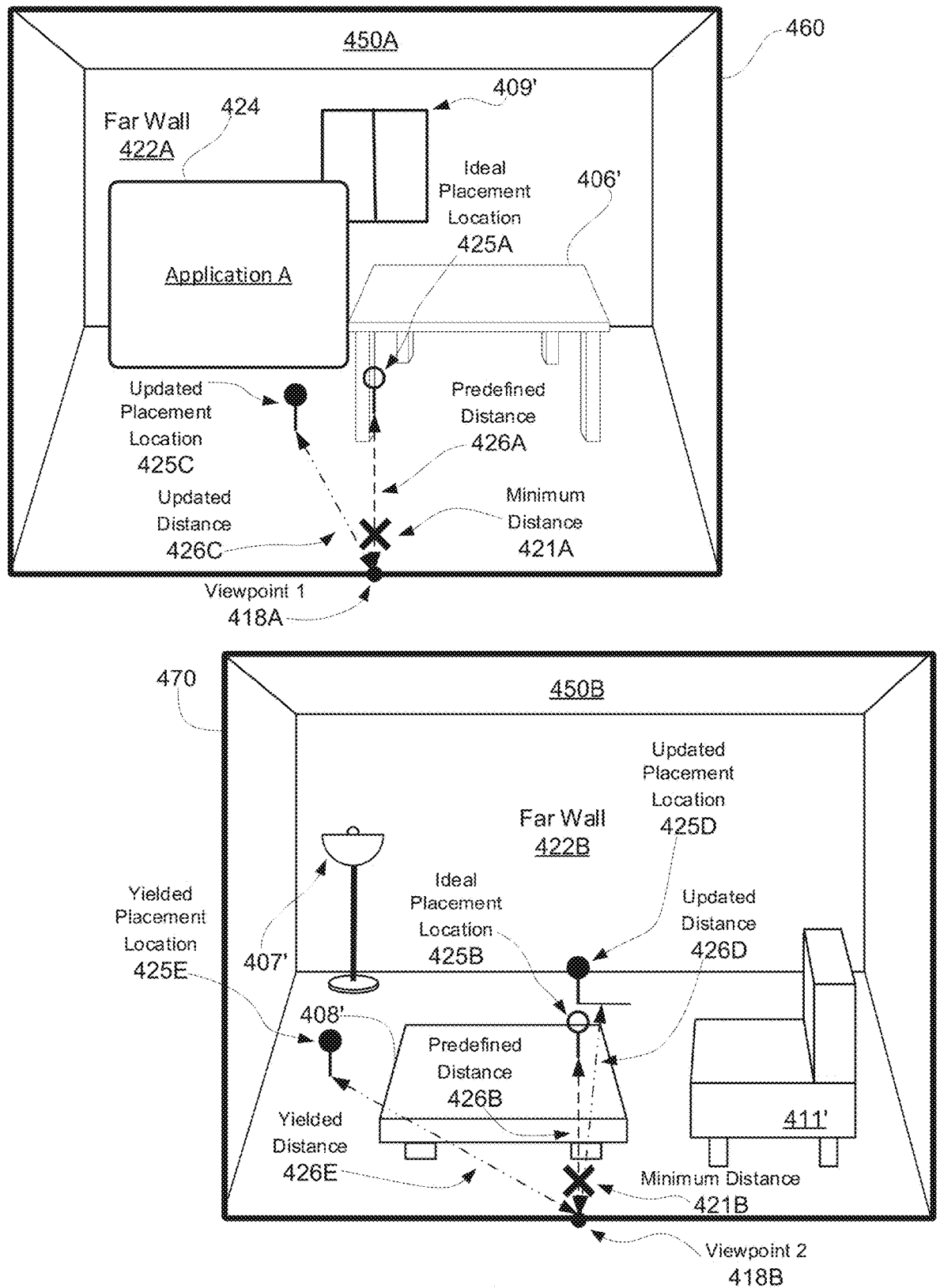

In some examples, using the occupancy map generated at the first electronic device 460 and the second electronic device 470, the first electronic device 460 and the second electronic device 470 may identify a placement location within the three-dimensional environments 450A/450B at which to place the avatar corresponding to the user of the first electronic device 460 and the avatar corresponding to the user of the second electronic device 470. As described previously herein, the avatar 415 corresponding to the user of the second electronic device 470 and the avatar 417 corresponding to the user of the first electronic device 460 may be placed at the identified placement locations if the identified placement locations satisfy a first set of criteria, including a first criterion that is satisfied when the identified placement locations are not occupied by any objects. For example, as similarly discussed above and as shown in FIG. 4H, the first electronic device 460 may identify a preferred placement location 425A that is at or near (e.g., within 0.25, 0.5, 0.8, 1, 1.5, 2, 2.5, etc. m of) the center of the field of view of the user of the first electronic device 460 and/or that is a predefined distance (e.g., 1, 1.4, 1.5, 1.8, 2, 2.5, 3, etc. m) 426A from the viewpoint 418A of the user of the first electronic device 460. As shown in FIG. 4H, the identified placement location 425A within the three-dimensional environment 450A at least partially intersects with a portion of an object within the three-dimensional environment 450A, namely a front leg of the table 406 in the physical environment surrounding the first electronic device 460. Because a portion of the representation of the table 406' intersects/overlaps with the preferred placement location 425A, the preferred placement location 425A fails to satisfy the first criterion, and thus fails to satisfy the first set of criteria. Accordingly, in some examples, the first electronic device 460 may proceed to identifying an updated/candidate placement location, different from the preferred placement location 425A, within the three-dimensional environment 450A.

As shown in FIG. 4H, in some examples, the first electronic device 460 may utilize the occupancy map generated at the first electronic device 460 to identify an updated placement location 425C within the three-dimensional environment 450A. As shown, the updated placement location 425C is optionally a location that is offset (e.g., angularly by 3, 5, 10, 15, 20, 25, or 30 degrees) to the left of the preferred placement location 425A from the viewpoint 418A of the user of the first electronic device 460, and/or that is an updated distance 426C from the viewpoint 418A. As described above with reference to FIG. 4E, in some examples, identifying an updated placement location may include altering the distance between the identified placement location (e.g., 425A) and the viewpoint (e.g., 418A) of the user of the electronic device. As shown in FIG. 4H, the updated distance 426C is different from the predefined distance 426A at the first electronic device 460 and is selected from a range defined by the first bound 421A (e.g., the minimum distance) and the second bound 422A (e.g., the maximum distance determined by the physical limitation of the far wall) at the first electronic device 460. In the example of FIG. 4H, because the respective user interface element 424 at least partially occupies a location that is the predefined distance 426A to the left of the preferred placement location 425A, the updated distance 426C between the updated placement location 425C and the viewpoint 418A is less than the predefined distance 426A (e.g., if the predefined distance 426A is 1.5 m, the updated distance 426C is 1.4 m) and is within the tolerable range defined by the first bound 421A and the second bound 422A. As shown in FIG. 4H, the updated placement location 425C is not occupied by any objects, and thus, satisfies the first criterion of the first set of criteria at the first electronic device 460.

As shown in FIG. 4H, the second electronic device 470 may also identify a preferred placement location 425B within the three-dimensional environment 450B that is at or near the center of the field of view of the user of the second electronic device 470 and/or that is the predefined distance 426B from the viewpoint 418B of the user of the second electronic device 470. As shown in FIG. 4H, the identified placement location 425B within the three-dimensional environment 450B at least partially intersects with a portion of an object within the three-dimensional environment 450B, namely a portion of the coffee table 408 in the physical environment surrounding the second electronic device 470. Because a portion of the representation of the coffee table 408' intersects/overlaps with the preferred placement location 425B, the preferred placement location 425B fails to satisfy the first criterion of the first set of criteria at the second electronic device. Accordingly, in some examples, the second electronic device 470 may proceed to identifying an updated/candidate placement location, different from the preferred placement location 425B, within the three-dimensional environment 450B.

As shown in FIG. 4H, in some examples, the second electronic device 470 may utilize the occupancy map generated at the second electronic device 470 to identify an updated placement location 425D within the three-dimensional environment 450B. As shown, the updated placement location 425C is optionally a location that behind the preferred placement location 425B and/or that is an updated distance 426D from the viewpoint 418B of the user of the second electronic device 470. In some examples, the updated distance 426D is different from the predefined distance 426B at the second electronic device 470 and is selected from a range defined by the first bound 421B (e.g., the minimum distance) and the second bound 422B (e.g., the maximum distance determined by the physical limitation of the far wall) at the second electronic device 470. In the example of FIG. 4H, because a space between the representation of the coffee table 408' and the representation of the sofa 411' may be insufficient (e.g., below a threshold amount, such as 2, 3, or 5 square m), the updated placement location 425D is chosen to be behind the representation of the coffee table 408', such that the updated distance 426D between the updated placement location 425D and the viewpoint 418B is greater than the predefined distance 426B (e.g., if the predefined distance 426B is 1.5 m, the updated distance 426D is 2 m) and is within the tolerable range defined by the first bound 421B and the second bound 422B. Accordingly, as shown in FIG. 4H, the updated placement location 425D is not occupied by any objects, and thus, satisfies the first criterion of the first set of criteria at the second electronic device 470.

In some examples, the first set of criteria includes a second criterion that is satisfied when the distance between the identified placement location and the viewpoint of the user at the first electronic device 460 is the same as the distance between the identified placement location and the viewpoint of the user at the second electronic device 470. As discussed above, the first electronic device 460 may identify an updated placement location 425C that is an updated distance 426C from the viewpoint 418A, and the second electronic device may identify an updated placement location 425D that is an updated distance 426D from the viewpoint 418B. While the updated placement locations 425C and 425D satisfy the first criterion (e.g., because the updated placement locations 425C and 425D do not contain any objects), the updated placement locations 425C and 425D fail to satisfy the second criterion because the updated distances 426C and 426D at the first electronic device 460 and the second electronic device 470, respectively, are not the same. Accordingly, the first electronic device 460 and/or the second electronic device 470 may identify one or more updated placement locations (e.g., iteratively, or by generating a set of identified placement locations and selecting one) that satisfies the second criterion, as discussed below.

In some examples, when determining subsequent updated placement locations within the three-dimensional environments 450A/450B, the first electronic device 460 and the second electronic device 470 may actively communicate to coordinate and determine a same placement location distance. In some examples, the placement location distance may be determined based on the value of the predefined distance at the first electronic device 460 and the second electronic device 470. For example, as described above, the updated distance 426C is optionally less than the predefined distance 426A at the first electronic device 460, and the updated distance 426D is optionally greater than the predefined distance 426B at the second electronic device 470, where the predefined distance 426A is equal to the predefined distance 426B. When determining the subsequent updated placement locations, the first electronic device 460 and the second electronic device 470 may select the updated distance value that is closest to the value of the predefined distance. For example, in FIG. 4H, if the predefined distances 426A and 426B are 1.5 m, and the updated distance 426C at the first electronic device 460 is 1.4 m, and the updated distance 426D at the second electronic device 470 is 2 m, the selected distance value would optionally default to 1.4 m since that value is closer to 1.5 m than 2 m. Accordingly, as shown, the second electronic device 470 may identify a subsequent placement location 425E that yields to (e.g., is based on) the distance defined by the updated distance 426C at the first electronic device 460 while the first electronic device 460 maintains the identified placement location 425C in the three-dimensional environment 450A. It should be understood that, while the updated distance value is selected based on the value of the predefined distance, the first electronic device 460 and the second electronic device 470 may utilize additional and/or alternative methods for selecting the updated distance value. For example, the updated distance value may be selected based on an activity type of the multi-user communication session (e.g., a game-focused and/or content-focused multi-user communication session).

As shown in FIG. 4H, the second electronic device 470, utilizing the generated occupancy map at the second electronic device 470 and the selected placement location distance, identifies a new placement location 425E within three-dimensional environment 450B that is a yielded distance 426E from the viewpoint 418B of the user of the second electronic device 470. As discussed above, in some examples, the yielded distance 426E at the second electronic device 470 is optionally equal to the updated distance 426C at the first electronic device 460. It should be understood that, while the relative lengths of the arrows representing the distances 426C and 426E may appear to be different in FIG. 4H, the distances between the viewpoints 418A and 418B and the placement locations 425C and 425E, respectively, are optionally the same. Additionally, in some examples, the identified placement location 425E optionally accounts for objects in three-dimensional environment 450B that are in the field of view of the user of the second electronic device 470. For example, a candidate placement location that is at the center of the field of view of the user of the second electronic device 470, and that is the yielded distance 426E from the viewpoint 418B, optionally intersects/overlaps with the representation of the coffee table 408'. Accordingly, the yielded placement location 425E within three-dimensional environment 450B is optionally a location that is offset (e.g., angularly by approximately 45 degrees) to the left of the center of the field of view of the user of the second electronic device 470, and that is the yielded distance 426E from the viewpoint 418B of the user of the second electronic device 470. Thus, the identified placement location 425C at the first electronic device 460 and the yielded placement location 425E at the second electronic device 470 are equal distances apart from the viewpoints 418A and 418B, respectively, and satisfy the second criterion of the first set of criteria.

Figure 4I:
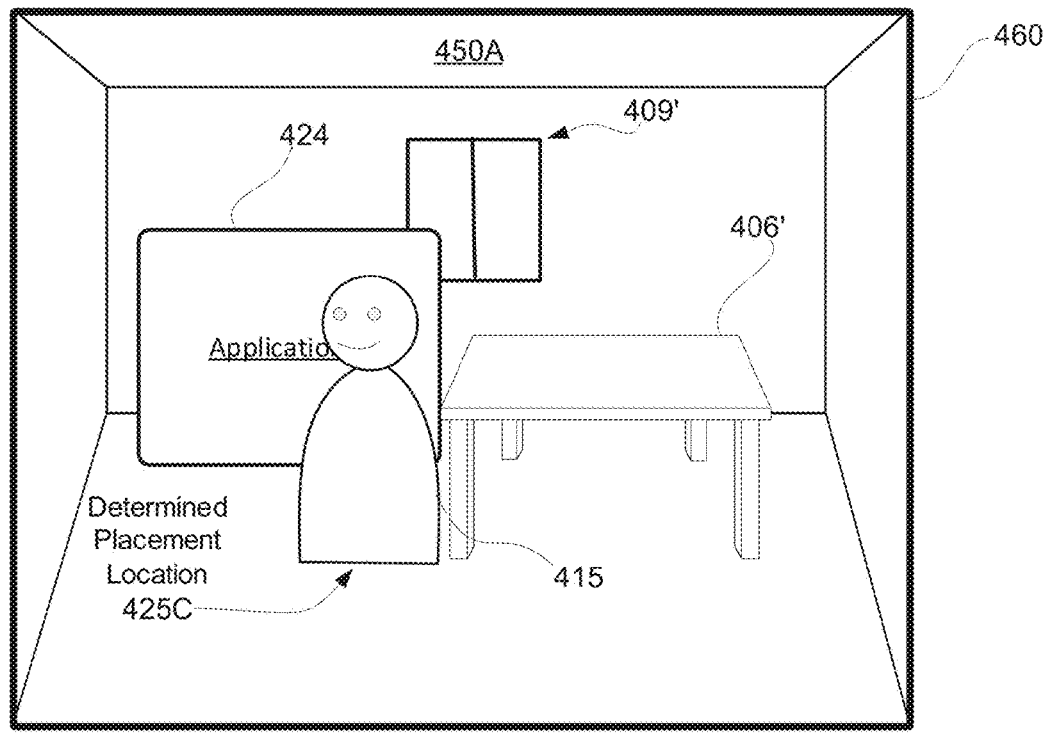
Figure 4I:
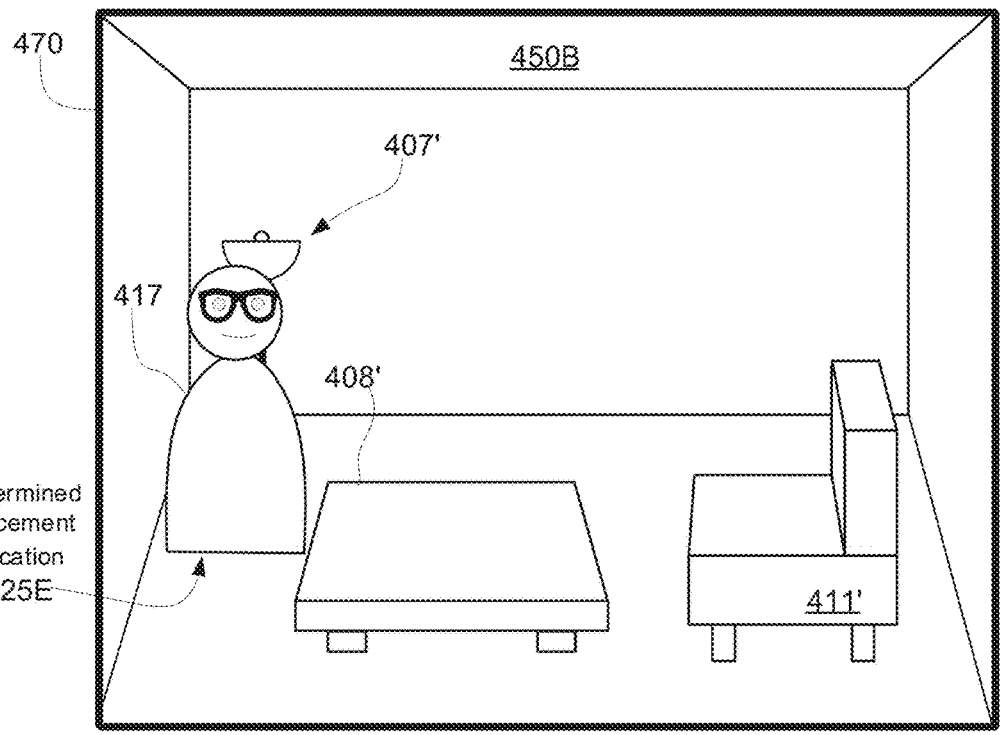

In some examples, in accordance with the determination that the placement locations identified at the first electronic device 460 and the second electronic device 470 satisfies the first set of criteria (e.g., because the first criterion and the second criterion, described above, are satisfied), the first electronic device 460 and the second electronic device 470 may display avatars corresponding to the users of the first electronic device 460 and the second electronic device 470 at the identified placement locations. For example, as shown in FIG. 4I, the first electronic device 460 may place the avatar 415 corresponding to the user of the second electronic device 470 at the determined placement location 425C in three-dimensional environment 450A. Similarly, as shown, the second electronic device 470 may place the avatar 417 corresponding to the user of the first electronic device 460 at the determined placement location 425E in three-dimensional environment 450B. As discussed above, the avatar 415 corresponding to the user of the second electronic device 470 may be the updated distance (e.g., 1.5 m) from the viewpoint (e.g., viewpoint 418A) of the user of the first electronic device 460, and the avatar 417 corresponding to the user of the first electronic device 460 may be the same distance from the viewpoint (e.g., viewpoint 418B) of the user of the second electronic device 470.

As described above with reference to FIGS. 4C and 4F, the avatars 415 and 417 may be displayed in three-dimensional environments 450A and 450B with respective orientations corresponding to the orientations of the electronic devices 460 and 470 presenting the three-dimensional environments 450A and 450B. In some examples, when the avatars 415 and 417 are initially placed at the determined placement locations within the three-dimensional environments 450A and 450B, the respective orientations of the avatars 415 and 417 may be indicative of determined placement locations that are off-center (e.g., with respect to the center of the field of view of the user of the electronic device). For example, as shown in FIG. 4I, at the second electronic device 470, because the determined placement location 425E in three-dimensional environment 450B is to the left of the center of the field of view of the user of the second electronic device 470, and an orientation of the user of the second electronic device 470 optionally corresponds to the center of the field of view of the user of the second electronic device 470, the first electronic device 460 may display the avatar 415 corresponding to the user of the second electronic device 470 with an orientation that is facing leftward relative to the viewpoint (e.g., viewpoint 418A) of the user of the first electronic device 460 (e.g., illustrated by the orientation of the face of the avatar 415). At the first electronic device 460, for example, because the determined placement location 425C in three-dimensional environment 450A is to the left of the center of the field of view of the user of the first electronic device 460, and an orientation of the user of the first electronic device 460 optionally corresponds to the center of the field of view of the user of the first electronic device 460, the second electronic device 470 may display the avatar 417 corresponding to the user of the first electronic device 460 with an orientation that is facing rightward (e.g., to a point in three-dimensional environment 450B that is behind the viewpoint of the user of the second electronic device 470) relative to the viewpoint (e.g., viewpoint 418B) of the user of the second electronic device 470 (e.g., illustrated by the orientation of the face of the avatar 417), as shown.

As described above, with the placement of the avatars 415 and 417 within the three-dimensional environments 450A and 450B, respectively, the first electronic device 460 and the second electronic device 470 are communicatively linked in the multi-user communication session. As discussed herein, in the multi-communication session, the three-dimensional environments 450A/450B optionally become shared three-dimensional environments, such that virtual objects, content, applications, and the like can be shared between the first electronic device 460 and the second electronic device 470. As discussed above, the three-dimensional environment 450A at the first electronic device 460 may include the respective user interface element 424. In some examples, when the first electronic device 460 and the second electronic device 470 enter the multi-communication session, a representation of the user interface element (corresponding to user interface element 424) may be displayed in three-dimensional environment 450B at the second electronic device 470 behind the viewpoint (e.g., viewpoint 418B) of the user of the second electronic device 470. In some such examples, the representation of the user interface element displayed in three-dimensional environment 450B is optionally an occluded (e.g., a faded or blurred) representation of the user interface element 424 displayed in three-dimensional environment 450A. For example, if the user of the second electronic device 470 were to rotate the second electronic device 470 (e.g., by 180 degrees) to view the representation of the user interface element in three-dimensional environment 450B, the user of the second electronic device 470 may be prevented from viewing the contents of the user interface element 424 displayed in three-dimensional environment 450A at the first electronic device 460. Thus, as outlined above, one advantage of the disclosed placement method for avatars in a multi-user communication session is the facilitation of automatic placement of avatars individually at each electronic device based on locations of objects in the environments surrounding the electronic devices and relative distances between viewpoints of the users of the electronic devices, thereby reducing the cognitive burden on users when launching the multi-user communication session.

As mentioned above, while in the multi-user communication session, content can be shared between the first electronic device and the second electronic device, such that the content can be interacted with (e.g., viewed, moved, modified, etc.) by the users of the first electronic device and the second electronic device. In some examples, shared content can be moved within the shared three-dimensional environments presented by the first electronic device and the second electronic device by directly or indirectly interacting with the shared content. In some such examples, however, moving the shared content closer to the viewpoint of one user optionally moves the shared content farther from the viewpoint of the other user in the multi-communication session. Accordingly, it may be advantageous to provide a method for spatial refinement (e.g., movement and/or repositioning) of avatars and/or shared objects) in shared three-dimensional environments while multiple devices are in a multi-communication session, which would allow content to be moved at one electronic device without moving the content at the other electronic device. Attention is now directed to example interactions involving spatial refinement of shared content in a multi-user communication session between a first electronic device and a second electronic device.

FIGS. 5A-5I illustrate example interactions involving spatial refinement in a multi-user communication session according to some examples of the disclosure. In some examples, while the first electronic device 560 is in the multi-user communication session with the second electronic device 570, the three-dimensional environment 550A is presented using electronic device 560 and the three-dimensional environment 550B is presented using electronic device 570. In some examples, the electronic devices 560/570 optionally correspond to electronic devices 460/470 shown in FIGS. 4A-4I. In some examples, the three-dimensional environments 550A/550B include captured portions of the physical environment in which electronic devices 560/570 are located. For example, the three-dimensional environment 550A includes a table (e.g., a representation of table 506') and a window (e.g., representation of window 509'), and the three-dimensional environment 550B includes a coffee table (e.g., representation of coffee table 508') and a floor lamp (e.g., representation of floor lamp 507'). In some examples, the three-dimensional environments 550A/550B optionally correspond to three-dimensional environments 450A/450B shown in FIGS. 4A-4I. As described above, in the multi-user communication session, the three-dimensional environment 550A optionally includes avatar 515 corresponding to a user of the second electronic device 570, and the three-dimensional environment 550B optionally includes avatar 517 corresponding to a user of the first electronic device 560. In some examples, the avatars 515/517 optionally correspond to avatars 415/417 shown in FIGS. 4A-4I.

Figure 5A:
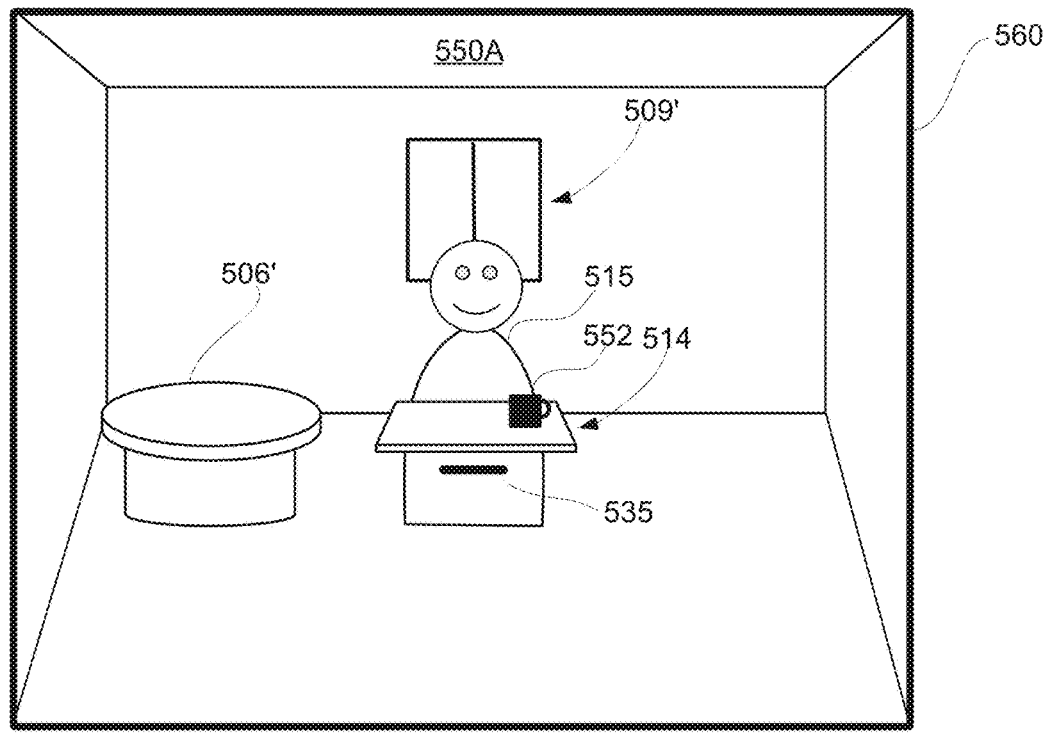
FIGS. 5A-5I illustrate example interactions involving spatial refinement in a multi-user communication session according to some examples of the disclosure.
Figure 5A:
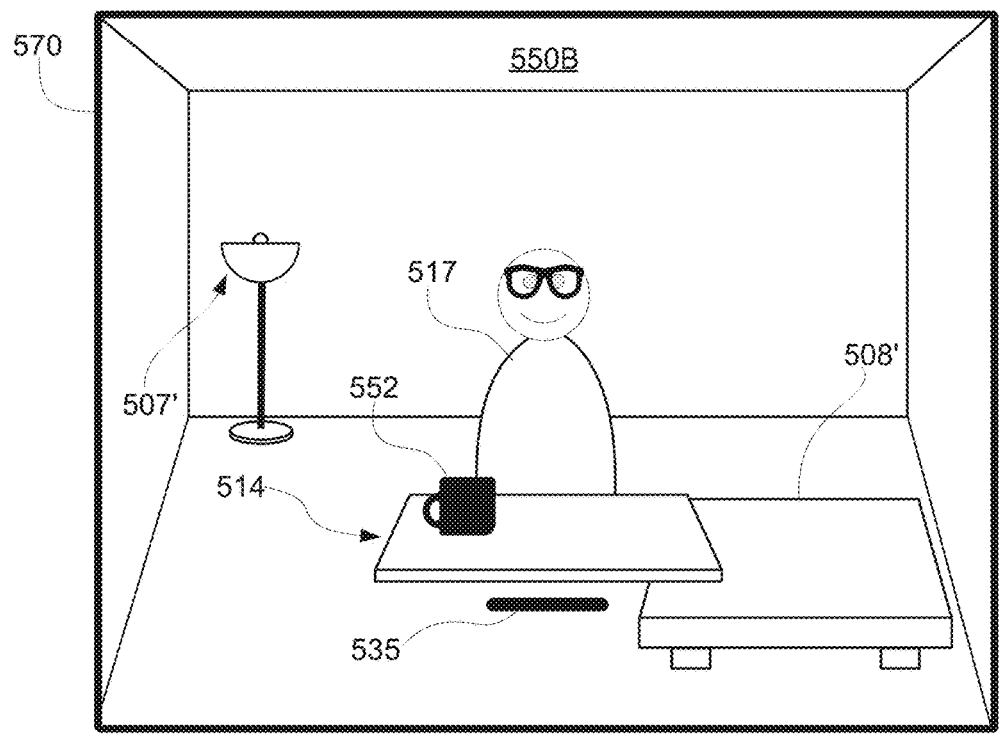

In some examples, the three-dimensional environments shared between the first electronic device 560 and the second electronic device 570 may include one or more shared virtual objects. For example, as shown in FIG. 5A, the first electronic device 560 and the second electronic device 570 may each display a virtual tray 514 containing a virtual mug 552, which may be shared between the electronic devices 560/570. As shown, the shared virtual objects may be displayed with a grabber or handlebar affordance 535 which is optionally selectable to initiate movement of the shared virtual objects (e.g., the virtual tray 514 and the virtual mug 552) within the three-dimensional environments 550A/550B. As shown in FIG. 5A, in some examples, the shared virtual objects may be positioned closer to the viewpoint of one user than another user in the three-dimensional environments 550A/550B (e.g., when the shared virtual objects are initially displayed in the three-dimensional environments 550A/550B). For example, in FIG. 5A, at the second electronic device 570, the shared virtual objects 514 and 552 are displayed in three-dimensional environment 550B at a first location that is optionally a first distance (e.g., "close to", or within a threshold distance, such as 0.2, 0.4, 0.5, 0.7, 1, 1.2, etc. m) from the viewpoint of the user of the second electronic device 570. Because objects in the three-dimensional environments 550A/550B maintain spatial truth while the first electronic device 560 and the second electronic device 570 are in the multi-user communication session, the shared virtual objects 514 and 552 are optionally displayed at the first electronic device 560 at a second location, different from the first location, in three-dimensional environment 550A that is a second distance (e.g., "far from", or at more than a threshold distance," such as greater than 1, 1.4, 1.5, 2, etc. m) from the viewpoint of the user of the first electronic device 560.

Additionally, in some examples, the position of the avatars 515 and 517 within the three-dimensional environments 550A/550B may reflect/be indicative of the relative distances between the shared virtual objects 514 and 552 and the viewpoints of the users of the electronic devices 560/570. For example, as shown in FIG. 5A, because the shared virtual objects 552 and 514 are located the first distance from the viewpoint of the user of the second electronic device 570 in three-dimensional environment 550B, at the first electronic device 560, the shared virtual objects 552 and 514 are displayed the first distance from the avatar 515 corresponding to the user of the second electronic device 570 in three-dimensional environment 550A. Similarly, as shown, because the shared virtual objects 552 and 514 are located the second distance from the viewpoint of the user of the first electronic device 560 in three-dimensional environment 550A, at the second electronic device 570, the shared virtual objects 552 and 514 are displayed the second distance from the avatar 517 corresponding to the user of the first electronic device 560 in three-dimensional environment 550B.

Figure 5B:
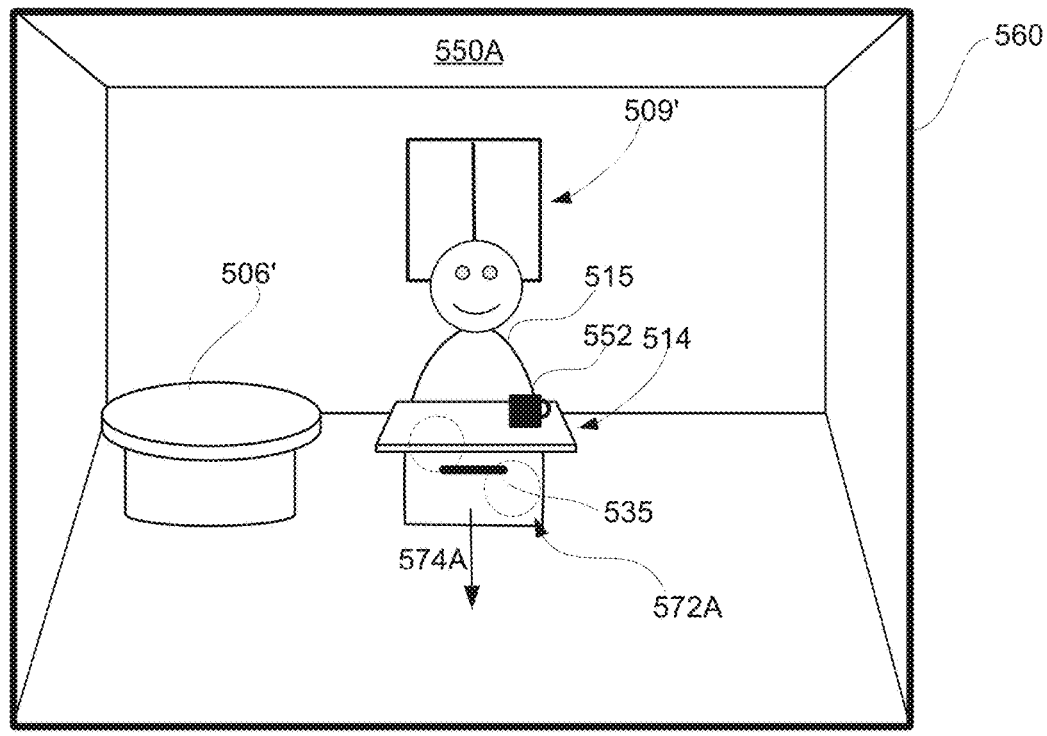
Figure 5B:
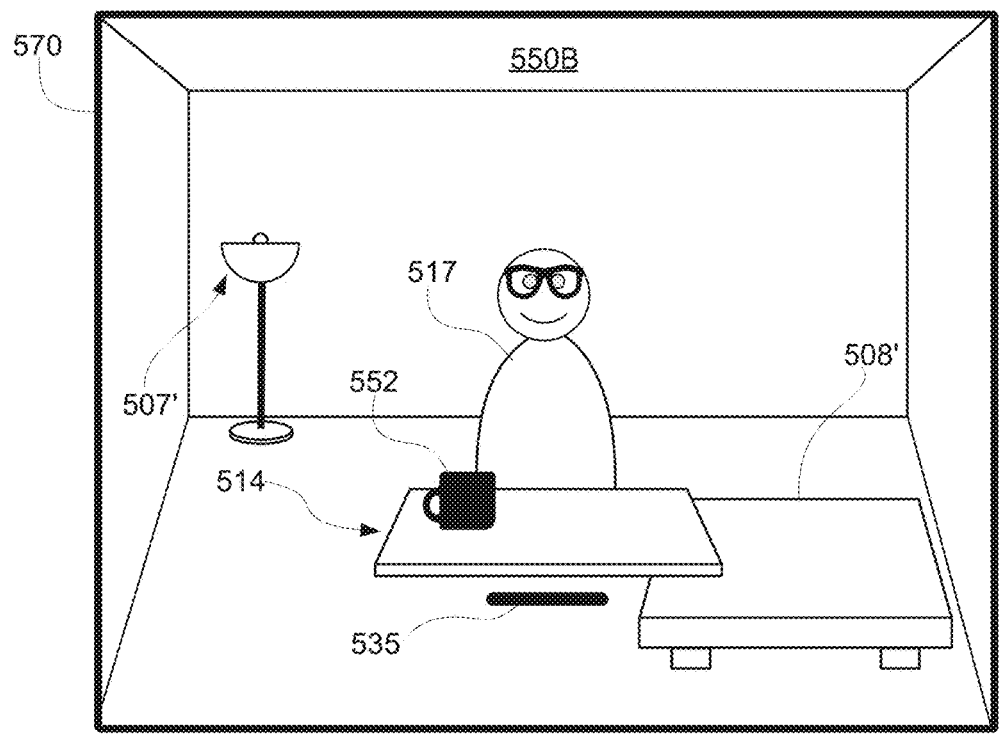

In some examples, because the shared virtual objects 514 and 552 are positioned far from the viewpoint of the user of the first electronic device 560, the user of the first electronic device 560 may desire to move the shared virtual objects 514 and 552 closer to the viewpoint of the user of the first electronic device 560. As shown in FIG. 5B, the user of the first electronic device 560 may provide a selection input 572A directed to the grabber or handlebar affordance 535. For example, the user of the first electronic device 560 provides a pinch gesture, a tap or touch gesture, a verbal command, etc. directly to and/or while the gaze of the user is directed to the grabber or handlebar affordance 535 or a portion of the shared virtual objects 514/552. As shown, the selection input 572A provided by one or more fingers of a hand of the user may be followed by a drag/movement input 574A toward the viewpoint of the user of the first electronic device 560. For example, while the selection input is maintained (e.g., a hand of the user continues the pinch gesture), the user of the first electronic device moves the hand closer to a portion of the body (e.g., the chest) of the user. In some examples, the selection input 572A may alternatively be provided directly to the virtual tray 514 or the virtual mug 552 in three-dimensional environment 550A.

Figure 5C:
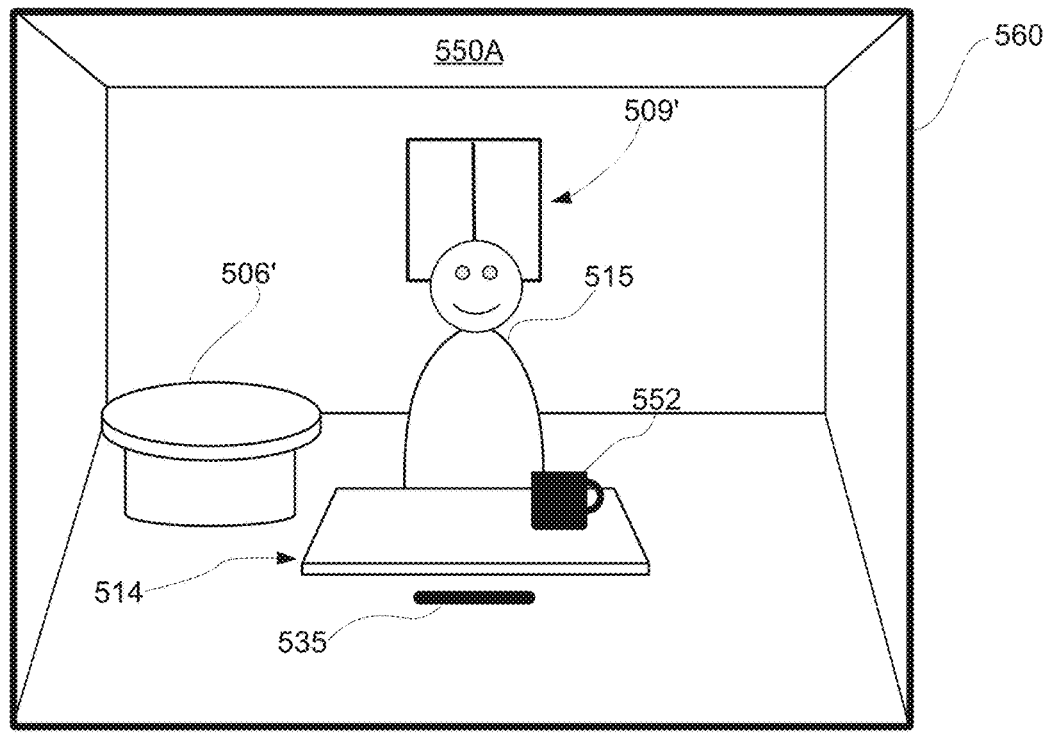
Figure 5C:
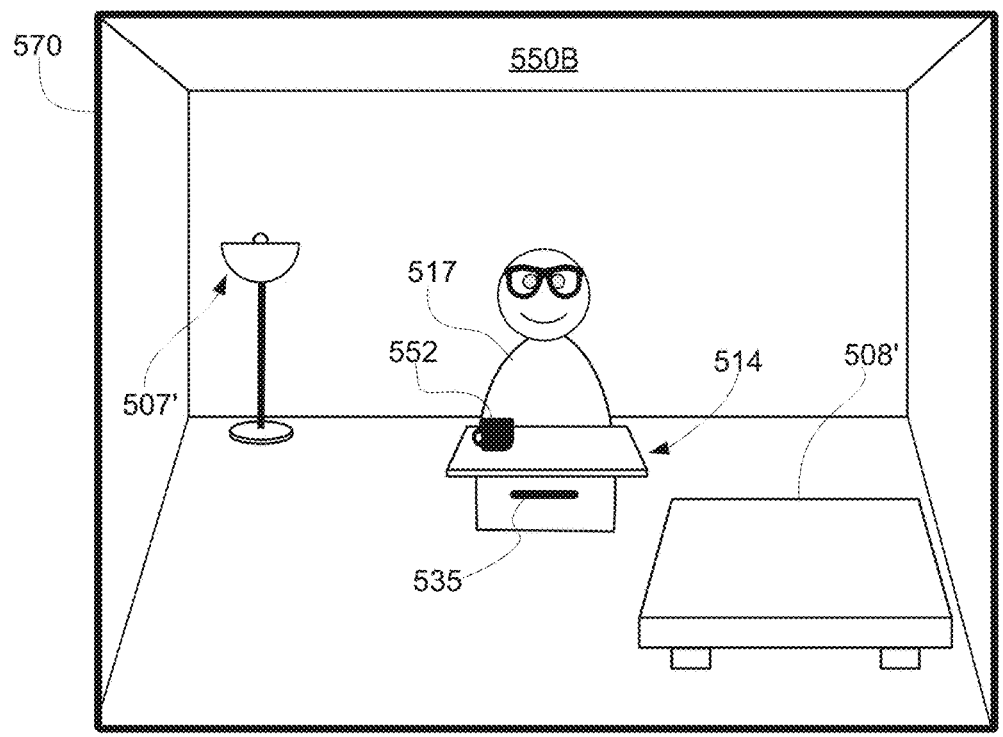

In some examples, in response to receiving the selection input 572A followed by the movement input 574A, the first electronic device 560 moves the shared virtual objects 514 and 552 in accordance with the movement input 574A. For example, as shown in FIG. 5C, the virtual tray 514 and the virtual mug 552 are displayed at a respective location in three-dimensional environment 550A that is closer to the viewpoint of the user of the first electronic device 560 in accordance with a magnitude of the movement input 574A. In some examples, moving the shared virtual objects 514 and 552 in the three-dimensional environment 550A at the first electronic device 560 causes the shared virtual objects 514 and 552 to be moved a corresponding amount in the three-dimensional environment 550B at the second electronic device 570. For example, as shown in FIG. 5C, when the shared virtual objects 514 and 552 are moved in three-dimensional environment 550A at the first electronic device 560, the shared virtual objects 514 and 552 are moved in three-dimensional environment 550B at the second electronic device 570. Further, because the user of the first electronic device 560 has moved the shared virtual objects 514 and 552 to a location in three-dimensional environment 550A that is a respective distance (e.g., 0.2, 0.4, 0.5, 0.7, 1, 1.2, etc. m) from the viewpoint of the user of the first electronic device 560, the shared virtual objects 514 and 552 are moved away from the viewpoint of the user of the second electronic device 570 in three-dimensional environment 550B to a location that is the respective distance away from the avatar 517 corresponding to the user of the first electronic device 560. Additionally, as shown in FIG. 5C, the avatar 515 corresponding to the user of second electronic device 570 does not move in three-dimensional environment 550A when the shared virtual objects 514 and 552 are moved in three-dimensional environment 550A in accordance with the movement input 574A.

As shown in FIG. 5C, while the shared virtual objects 514 and 552 are displayed at a location in three-dimensional environment 550A that is closer to the viewpoint of the user of the first electronic device 560 than that prior to the first electronic device 560 receiving the selection and movement inputs (e.g., as shown in FIG. 5B), the shared virtual objects 514 and 552 are now located at a location in three-dimensional environment 550B that is farther from the viewpoint of the user of the second electronic device 570 than that prior to the first electronic device 560 receiving the selection and movement inputs (e.g., after detecting an end of the selection and/or movement inputs, such as release of the hand of the user from the pinch gesture). Accordingly, in some examples, it may be advantageous to allow the users of the first electronic device and/or the second electronic device to spatially refine the virtual objects shared between the first electronic device and the second electronic device without moving the virtual objects to undesirable locations within the three-dimensional environments, as showcased above. Example interactions involving spatial refinement of the shared virtual objects 514 and 552 in the multi-user communication session are discussed below.

Figure 5D:
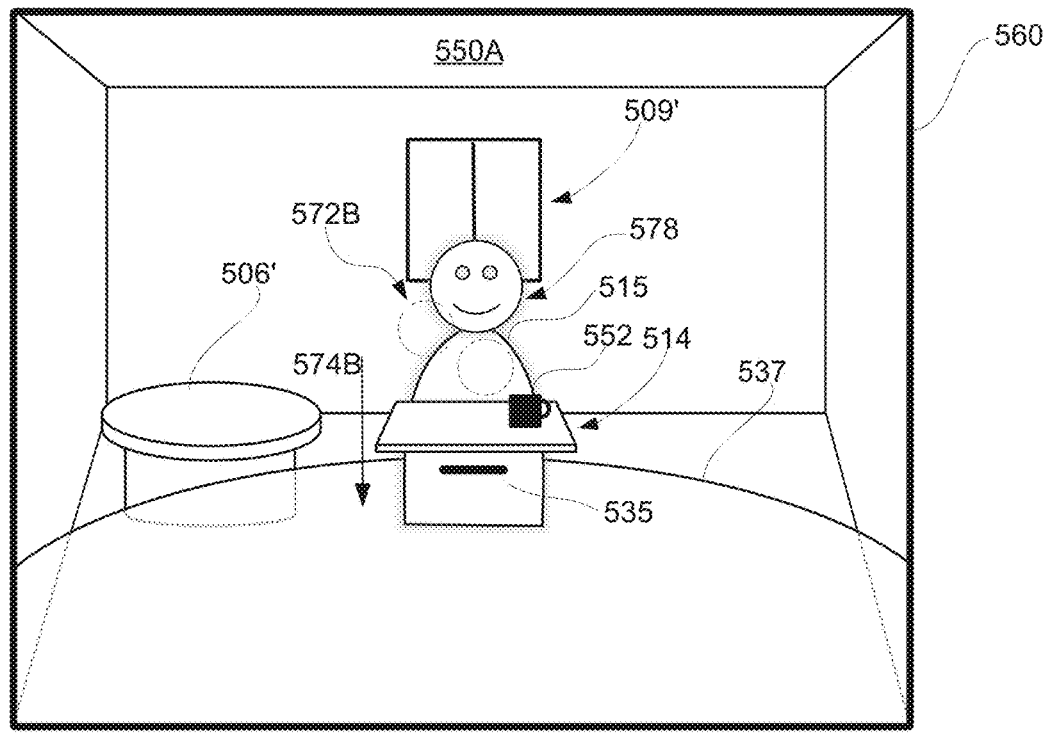
Figure 5D:
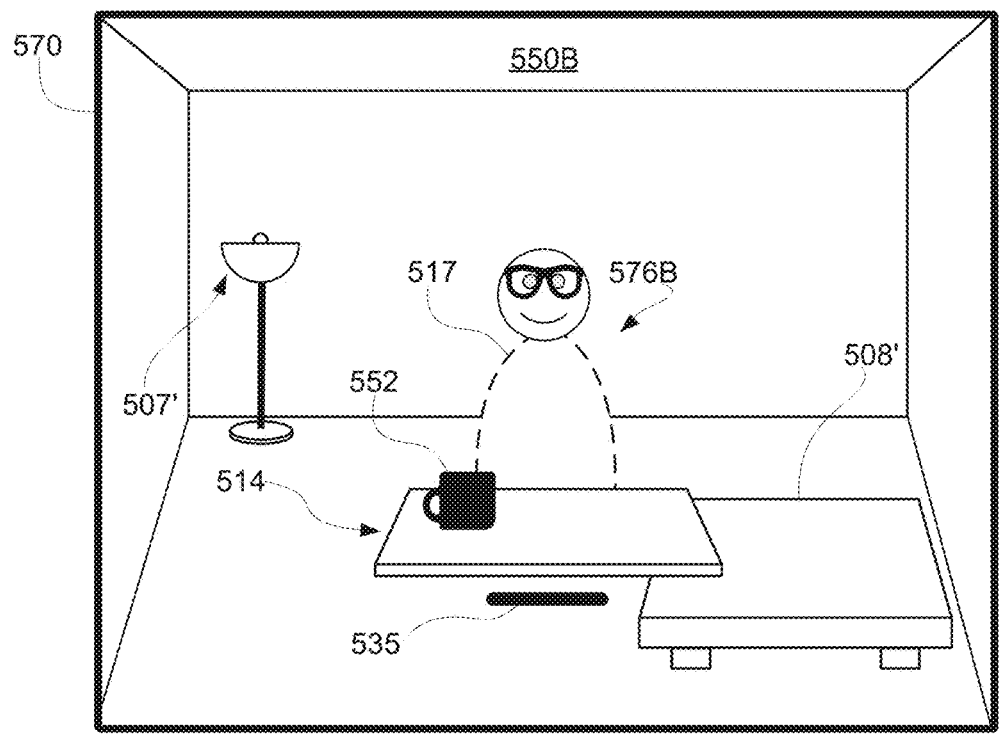

In some examples, rather than moving the shared virtual objects 514/552 individually, which may move the shared virtual objects 514/552 closer to the viewpoint of one user but farther from the viewpoint of the other user, an avatar corresponding to the other user can be moved to spatially refine the shared virtual objects 514/552 at both electronic devices. For example, as shown in FIG. 5D, rather than providing input directed to the shared virtual objects 514/552, the user of the first electronic device 560 may provide a selection input 572B directed to the avatar 515 corresponding to the user of the second electronic device 570. For example, the user of the first electronic device 560 is providing a pinch gesture with one hand, a two-handed double pinch gesture (e.g., one in which the index finger and thumb of the hand come into contact, separate, and come into contact a second time), a two-handed pinch and hold gesture (e.g., one in which the index finger and thumb of the hand come into contact and remain in contact for a threshold amount of time, such as 1, 1.5, 2, 2.5, 3, 4, etc. s), a selection of a spatial refinement affordance (not shown) displayed in a predetermined area of the three-dimensional environment 550A (e.g., such as at or near a top of the field of view of the three-dimensional environment 550A, or a verbal command, among other possibilities, optionally while the gaze of the user is directed to the avatar 515. Subsequently, the user of the first electronic device 560 may provide a drag/movement input 574B toward the viewpoint of the user of the first electronic device 560, as shown. In some examples, the avatar 515 may be translated and/or rotated (e.g., around an axis that is based on the viewpoint of the user) in the three-dimensional environment 550B based on the movement input 574B (e.g., with four degrees of freedom).

In some examples, while the user of the first electronic device 560 is providing the selection input 572B and/or the drag input 574B, the second electronic device 570 may alter display of the avatar 517 corresponding to the user of the first electronic device 560 in the three-dimensional environment 550B. Particularly, it may be advantageous to alter the appearance of the avatar 517 in three-dimensional environment 550B to avoid an appearance of a physical interaction between the users of the first and second electronic devices, which may be interpreted as potentially intrusive, socially-unaccepted and/or otherwise offensive gestures performed by the avatar 517 from the viewpoint of the user of the second electronic device 570 (e.g., such as display of a hand of the avatar 517 within the personal space of and/or directly contacting the user of the second electronic device 570). For example, as shown in FIG. 5D, when the user of the first electronic device 560 provides the selection input 572B and/or the movement input 574B at the first electronic device 460, the second electronic device 570 optionally changes an appearance of the avatar 517 corresponding to the user of the first electronic device 560, as represented by dashed outline 576B. In some examples, for an avatar that includes full-body renderings of the user, changing the appearance of the avatar may include fading, obscuring, or ceasing display of a portion of the avatar, such as the hands, arms, and/or torso of the avatar. Additionally or alternatively, in some examples, changing the appearance of the avatar may include ceasing animation of the avatar, such that the inputs provided by the user (e.g., pinch and drag gestures) are not also performed by the avatar corresponding to the user. In some examples, as described in more detail below, changing the appearance of the avatar may include replacing display of the avatar with a secondary representation, such as an abstracted representation.

In some examples, in response to receiving the selection input 572B and/or the movement input 574B, the first electronic device 560 may alter display of the avatar 515 corresponding to the user of the second electronic device 570 in three-dimensional environment 550A. For example, as shown in FIG. 5D, at the first electronic device 560, in response to receiving the selection input 572B and/or drag input 574B, the first electronic device 560 changes an appearance of the avatar 515 corresponding to the user of the second electronic device 570. For example, the first electronic device 560 may display the avatar 515 with a glowing/highlighting effect 578, as shown in FIG. 5D, to provide feedback regarding successful selection of the avatar 515. In some examples, in response to receiving the selection input 572B and/or the movement input 574B, the first electronic device 560 may fade, occlude, and/or cease display of a portion of the avatar 515 (e.g., such as the portion of the avatar targeted by the gaze of the user of the first electronic device 560).

Additionally, in some examples, in response to receiving the selection input 572B and/or the movement input 574B, the first electronic device 560 optionally displays a planar element (e.g., a disc or disc-shaped element) 537 below the shared objects in the three-dimensional environment 550A (and optionally representations of private content and/or applications of other users). For example, as shown in FIG. 5D, the disc 537 may be displayed below the avatar 515 corresponding to the user of the second electronic device 570 and the shared virtual objects, such as the virtual tray 514 and the virtual mug 552. In some examples, a center of the disc 537 may be positioned at the viewpoint of the user of the first electronic device 560, and an edge of the disc 537 extends into the three-dimensional environment 550A to include all objects selected for spatial refinement. Accordingly, the disc 537 may serve as a reference point for subsequent movement of the objects selected for spatial refinement at the first electronic device 560, namely the avatar 515 and the shared virtual objects 514 and 552. For example, the disc 537 extends within three-dimensional environment 550A to contain (e.g., be displayed below) all objects that are selected for spatial refinement. It should be understood that, while a disc is illustrated in FIG. 5D and described herein, in some examples, an alternative user interface element may be displayed below the avatar 515 and the shared objects in three-dimensional environment 550A, such as a rectangular, square-shaped, triangular, octagonal, etc. stage or platter. As discussed in more detail below, the first electronic device may move the disc 537 in the three-dimensional environment 550A as the objects selected for refinement move in the three-dimensional environment 550A.

Figure 5E:
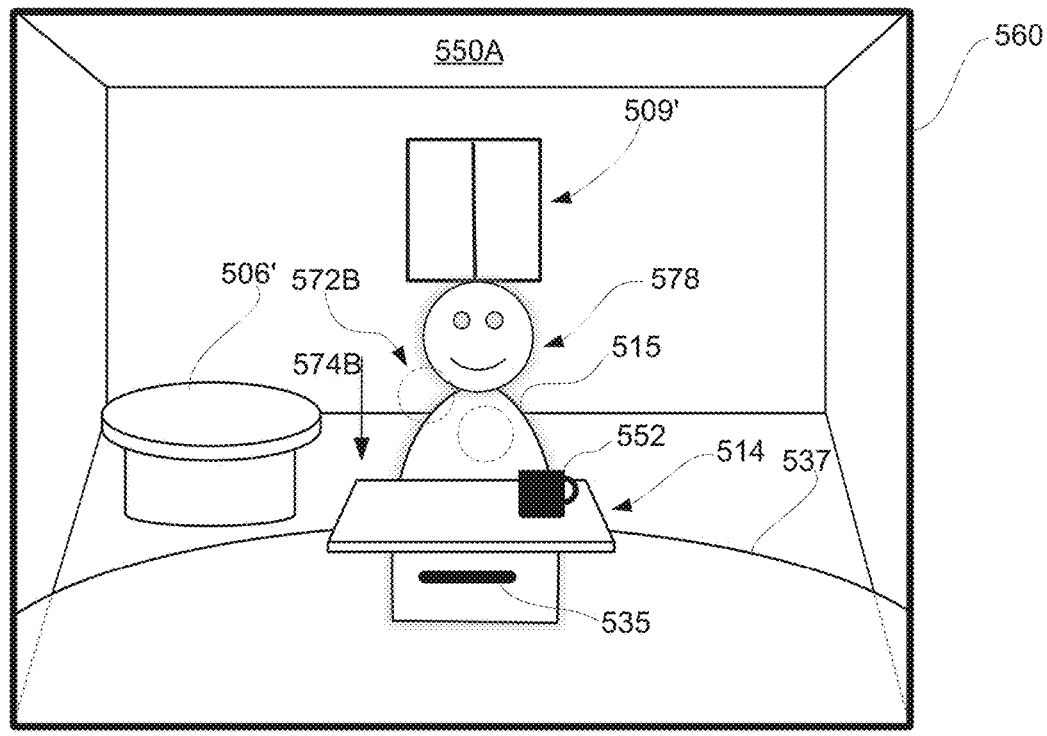
Figure 5E:
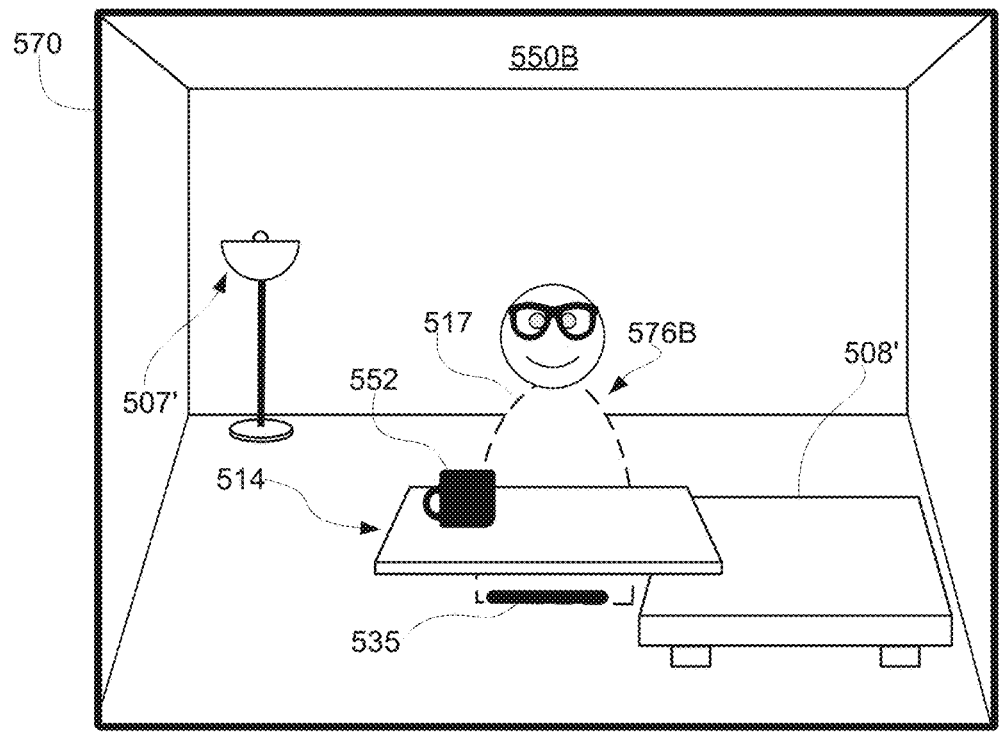

In some examples, movement input directed to the avatar 515 corresponding to the user of the second electronic device 570 causes the avatar 515 and any shared objects to move in the three-dimensional environment 550A in accordance with the movement input. For example, as shown in FIG. 5E, moving the avatar 515 corresponding to the user of the second electronic device 570 in the direction of the movement input 574B may cause the first electronic device 560 to also move the shared virtual objects 514 and 552 to move with the avatar 515 in the three-dimensional environment 550A. As shown, as the user of the first electronic device 560 moves the avatar 515 in the three-dimensional environment 550A, the first electronic device 560 moves the virtual tray 514 and the virtual mug 552 with the avatar 515. Additionally, the first electronic device 560 moves the disc 537 displayed below the avatar 515 and the shared virtual objects 514 and 552 in accordance with the movement of the avatar 515. In some examples, the selection input 572B (e.g., the pinch gesture) is maintained as the objects are moved within three-dimensional environment 550A.

In some examples, movement of the avatar 515 corresponding to the user of the second electronic device 570 optionally does not cause the shared virtual objects 514 and 552 to move in the three-dimensional environment 550B displayed at the second electronic device 570. For example, unlike the scenario described above with reference to FIG. 5C, when the shared virtual objects 514 and 552 move in three-dimensional environment 550A in accordance with the movement of the avatar 515, the second electronic device 570 forgoes displaying movement of the shared virtual objects 514 and 552 displayed in three-dimensional environment 550B. Rather, in some examples, the second electronic device 570 displays movement of the avatar 517 corresponding to the user of the first electronic device 560 in three-dimensional environment 550B. For example, when the user of the first electronic device 560 moves the avatar 515 a first amount in three-dimensional environment 550A (e.g., in accordance with a respective magnitude of the movement input 574B), the second electronic device 570 displays movement of the avatar 517 a second amount, corresponding to the first amount, in three-dimensional environment 550B in the direction of the movement input 574B. In some examples, the second amount is optionally equal to the first amount. In some examples, the second amount is optionally proportional to the first amount. As shown in FIG. 5E, because the direction of the movement input 574B is toward the viewpoint of the user of the first electronic device 560, the second electronic device 570 optionally displays the movement of the avatar 517 corresponding to the user of the first electronic device 560 toward the viewpoint of the user of the second electronic device 570. In some examples, the distance between the user of the first electronic device and the object(s) is the same as the distance between avatar 517 corresponding to the user of the first electronic device and the object(s) as presented to the user of the second electronic device.

As shown in FIG. 5E, the appearance of the avatar 517 corresponding to the user of the first electronic device 560 remains altered, as represented by dashed outline 576B, in three-dimensional environment 550B while the user of the first electronic device 560 continues providing the selection input 572B and/or the movement input 574B. Additionally, in some examples, the appearance of the avatar 515 corresponding to the user of the second electronic device 570 remains altered, as represented by highlight 578, in three-dimensional environment 550A while the user of the first electronic device 560 continues providing the selection input 572B and/or the movement input 574B (or until a deselection input is received).

Figure 5F:
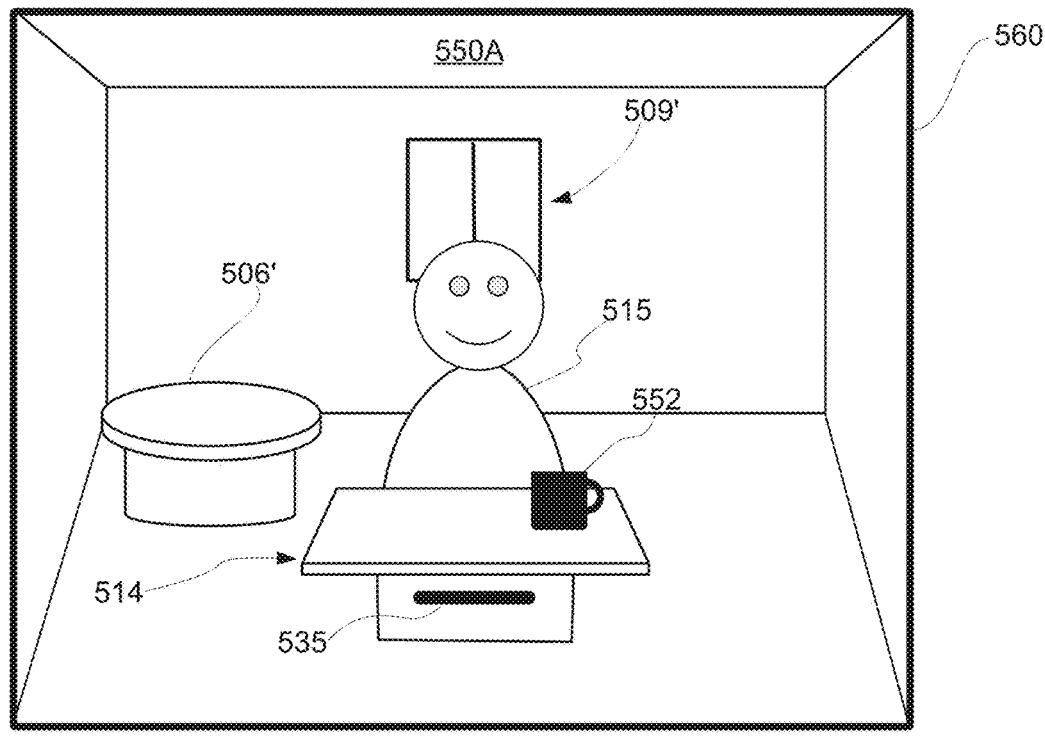
Figure 5F:
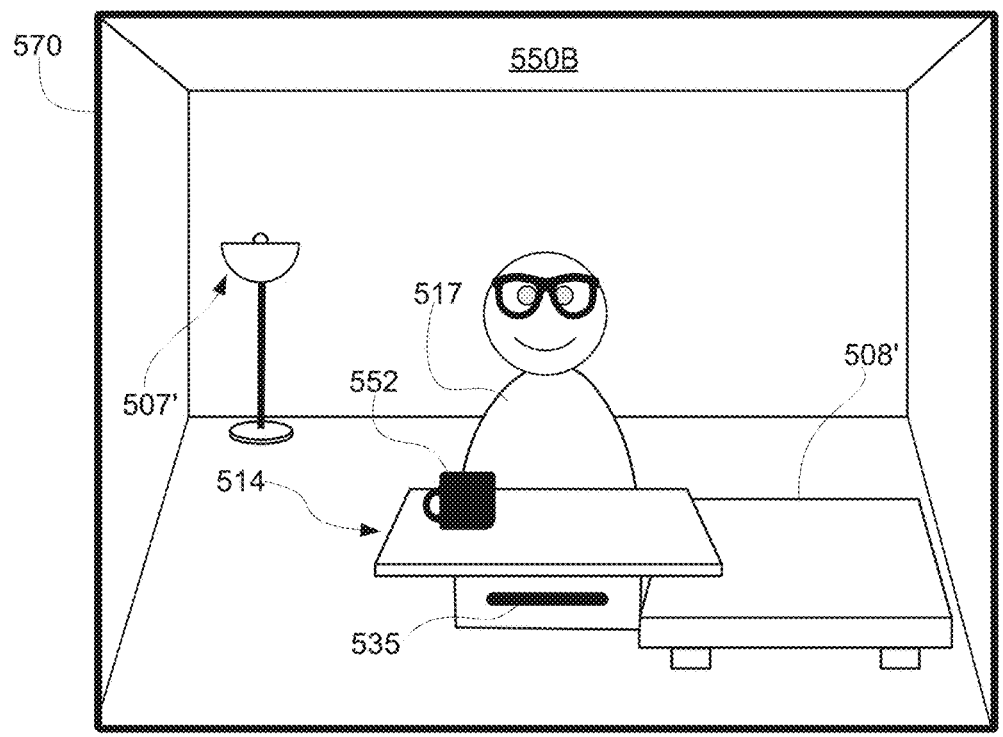

As shown in FIG. 5F, the user of the first electronic device 560 is optionally no longer providing the selection input 572B and the movement input 574B directed to the avatar 515 in three-dimensional environment 550A (or a deselection input is received). In some examples, in response to detecting an end of the movement input directed to the avatar 515, the first electronic device 560 displays the avatar 515 and the shared virtual objects 552 and 514 at a new location in three-dimensional environment 550A that is determined based on the end of the movement input. Similarly, in some examples, the second electronic device 570 displays the avatar 517 at a new location in three-dimensional environment 550B that is determined based on the end of the movement input at the first electronic device 560. As shown in FIG. 5F, the first electronic device 560 may restore the appearance of the avatar 515 in three-dimensional environment 550A (e.g., such that the avatar 515 is no longer displayed with the glowing/highlighting effect 578). Similarly, the second electronic device 570 may restore the appearance of the avatar 517 in three-dimensional environment 550B (e.g., such that the avatar 517 is no longer displayed in a faded or obscured fashion, as represented previously by dashed outline 576B).

As outlined above and as shown in FIG. 5F, by providing movement input directed to the avatar 515 at the first electronic device 560, the avatar 515 and the shared virtual objects 514 and 552 may be spatially refined within three-dimensional environment 550A, which enables the shared virtual objects 514 and 552 to be positioned at favorable locations within the three-dimensional environments 550A and 550B at both electronic devices 560 and 570. Thus, one advantage of the disclosed method for spatial refinement in a multi-user communication session is that shared objects and avatars corresponding to users of electronic devices may be positioned at favorable locations for the users of the electronic devices to easily interact with the shared objects in the multi-user communication session. An additional advantage of the disclosed method is that the spatial refinement of shared objects and avatars is intuitive from the perspective of the user providing the spatial refinement input, and the resultant spatial refinement is intuitive from the perspectives of other users because rather than displaying movement of the shared objects, the electronic devices display movement of the avatar corresponding to the user providing the spatial refinement input while the shared content remains stationary. Attention is now directed to further example interactions involving spatial refinement in a multi-user communication session between multiple electronic devices.

Figure 5G:
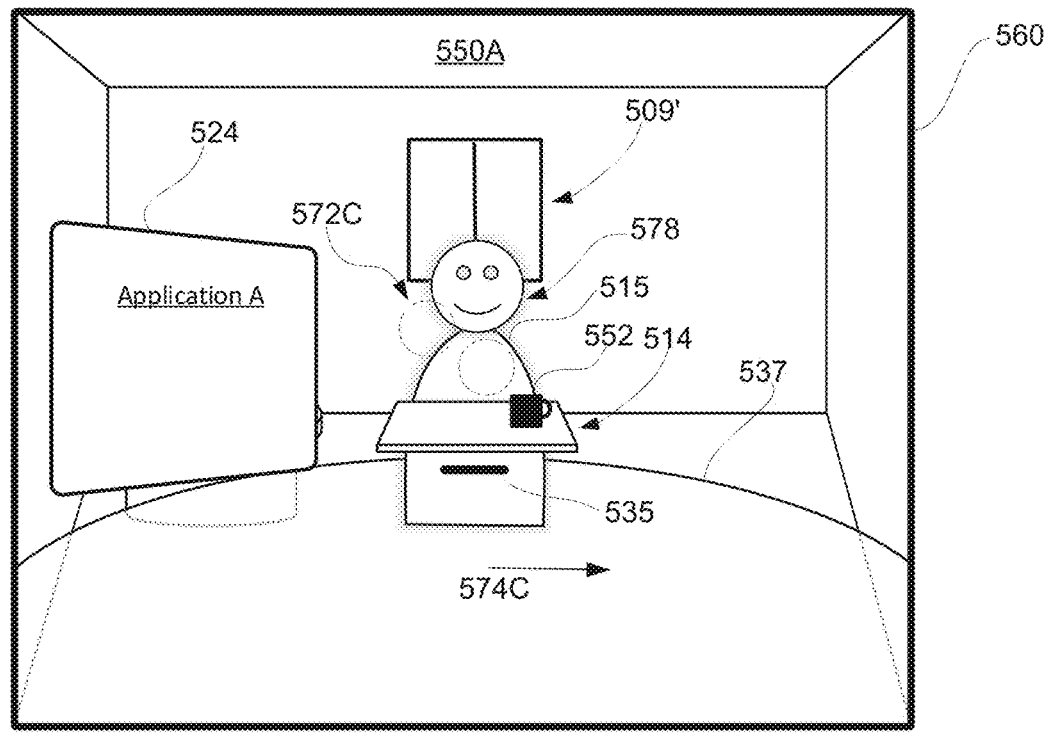
Figure 5G:
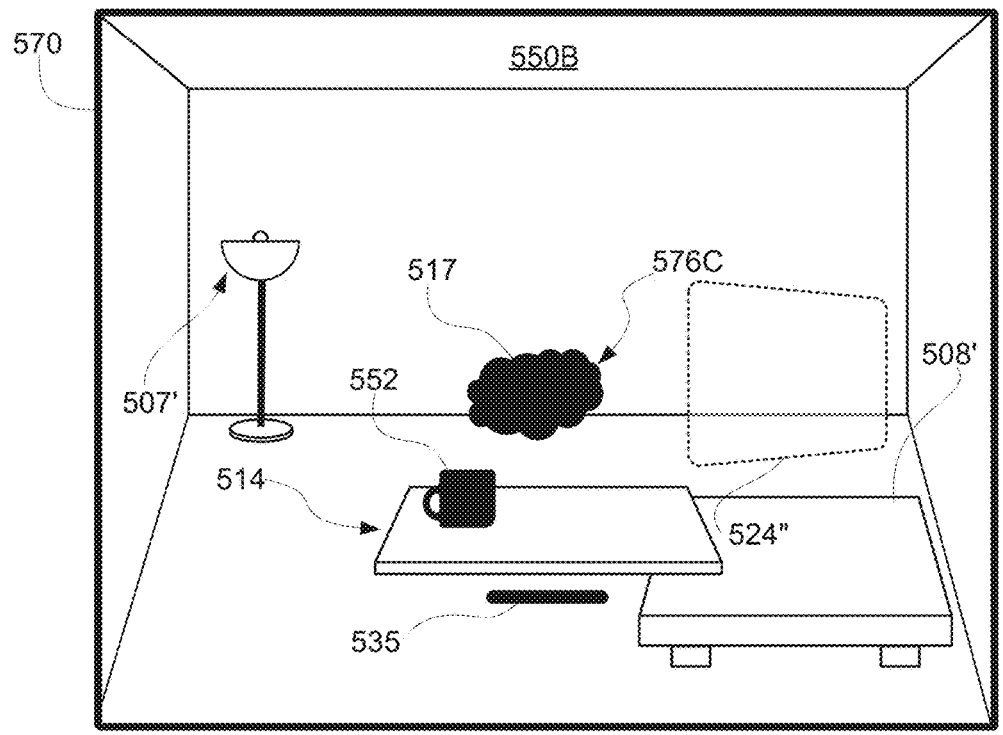

In some examples, the avatar 515 corresponding to the user of the second electronic device 570 may alternatively be translated laterally within three-dimensional environment 550A. Additionally, in some examples, the three-dimensional environment 550A may include one or more virtual objects that are not shared with the second electronic device 570 (e.g., private application windows) in the multi-user communication session. As shown in FIG. 5G, the three-dimensional environment 550A may include a respective user interface element 524, which may be an unshared application window corresponding to a respective application (e.g., Application A) running on the first electronic device 560. Because the respective user interface element 524 is unshared, the second electronic device 570 optionally displays a representation of the respective user interface element 524" in three-dimensional environment 550B. As described previously herein, in some examples, the representation of the respective user interface element 524" may be a faded, occluded, discolored, and/or translucent representation of the respective user interface element 524 that prevents the user of the second electronic device 570 from viewing contents of the respective user interface element 524.

As shown in FIG. 5G, in some examples, the user of the first electronic device 560 may provide a selection input 572C directed to the avatar 515 corresponding to the user of the second electronic device 570, followed by movement input 574C. For example, the user of the first electronic device 560 may provide a pinch gesture (e.g., using a hand of the user) while the gaze of the user is directed toward the avatar 515, followed by movement of the hand of the user while maintaining the pinch gesture. In some examples, the selection input 572C corresponds to the selection input 572B described above with reference to FIG. 5D. As shown in FIG. 5G, the movement input 574C optionally corresponds to movement of the avatar 515 rightward in three-dimensional environment 550A from the viewpoint of the user of the first electronic device 560.

As similarly described above, in some examples, in response to receiving the selection input 572C and/or the movement input 574C, the first electronic device 560 may alter display of the avatar 515 corresponding to the user of the second electronic device 570. For example, as shown in FIG. 5G, the first electronic device 560 optionally displays the avatar 515 with a glow/highlight effect 578 indicating that the avatar 515 can be moved within three-dimensional environment 550A. Additionally, as previously described herein, in some examples, in response to receiving the selection input 572C and/or the movement input 574C, the first electronic device 560 optionally displays the disc 537 below the objects selected for spatial refinement in three-dimensional environment 550A. For example, as shown in FIG. 5G, the disc 537 is displayed below the avatar 515 and the shared objects 514 and 552 in three-dimensional environment 550A. As shown, because the respective user interface element 524 is private to the user of the first electronic device 560, the respective user interface element 524 is optionally not selected for spatial refinement and thus the disc 537 is not displayed below the respective user interface element 524 in three-dimensional environment 550A.

In some examples, in response to receiving the selection input 572C and/or the movement input 574C at the first electronic device 560, the second electronic device 570 optionally alters display of the avatar 517 corresponding to the user of the first electronic device 560 in three-dimensional environment 550B. For example, as previously discussed above with reference to FIG. 5D, in response to receiving the selection input 572C and/or the movement input 574C at the first electronic device 560, the second electronic device 570 changes an appearance of the avatar 517, such as, as shown in FIG. 5G, replacing display of the avatar 517 with an abstracted representation 576C. As discussed above, changing the appearance of the avatar 517 in three-dimensional environment 550B at the second electronic device 570 avoids situations in which the input provided by the user of the first electronic device causes the avatar 517 to perform possibly offensive interactions directed toward the user of the second electronic device 570.

Figure 5H:
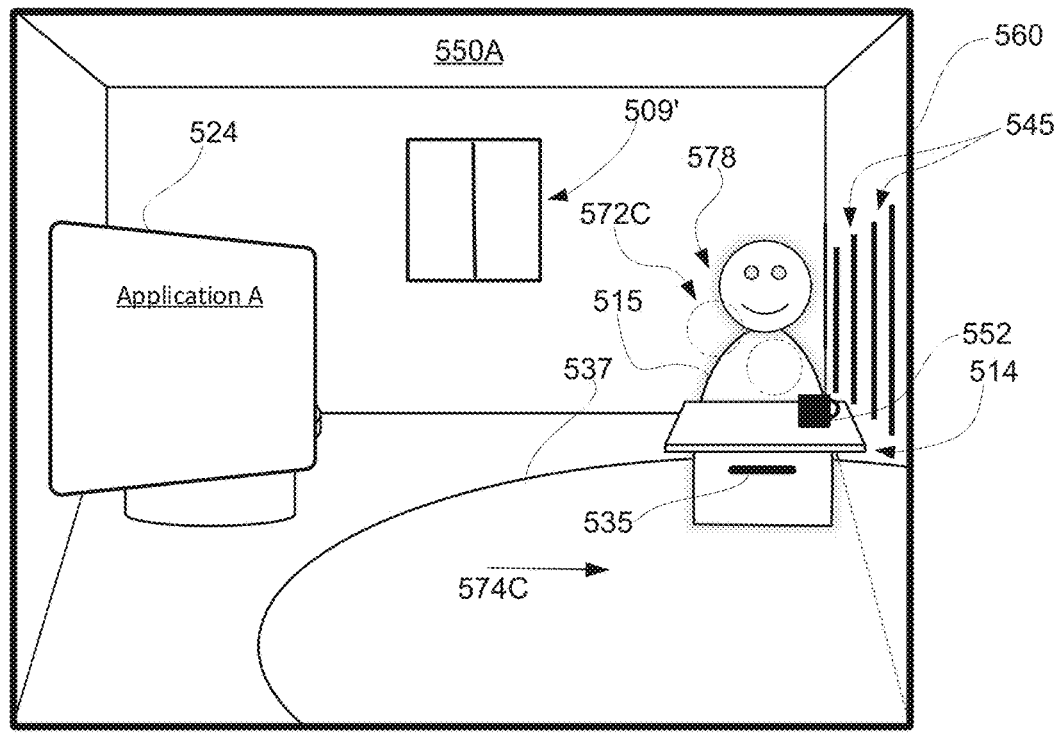
Figure 5H:
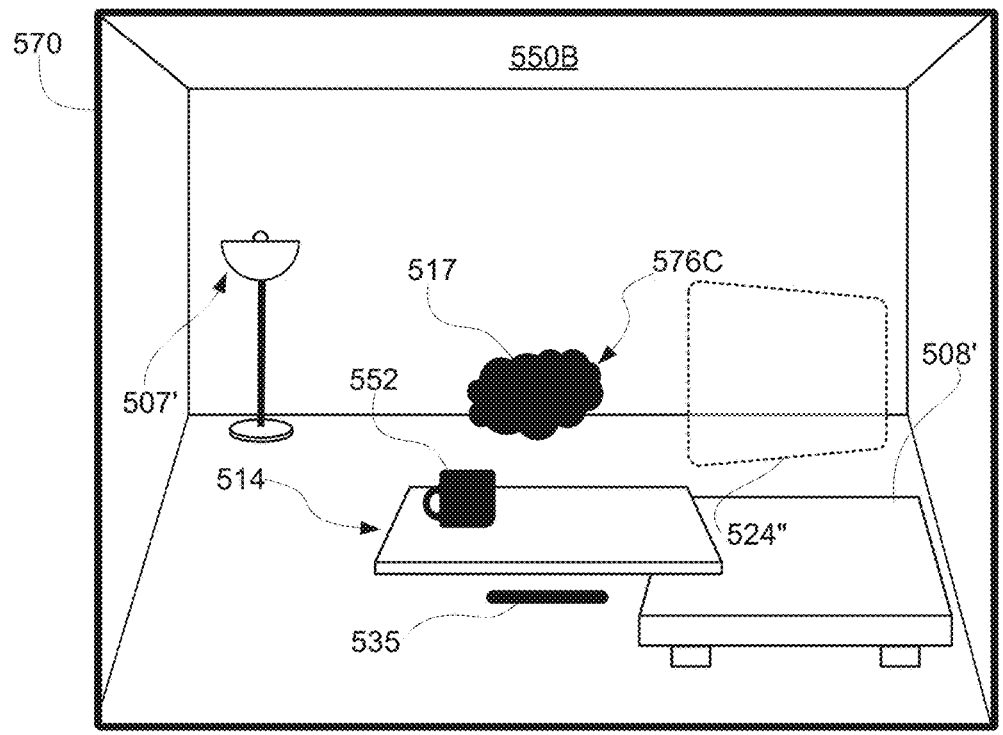

In some examples, as shown in FIG. 5H, in response to receiving the movement input 574C directed to the avatar 515 corresponding to the user of the second electronic device 570, the first electronic device 560 moves the avatar 515 in three-dimensional environment 550A in accordance with the movement input 574C. Additionally, as shown, the shared virtual objects 514 and 552 and the disc 537 move in three-dimensional environment 550A as the avatar 515 moves in accordance with the movement input 574C. As mentioned above, the respective user interface element 524 is not selected for spatial refinement because the respective user interface element 524 is an unshared object in three-dimensional environment 550A. Accordingly, when the avatar 515 and the shared virtual objects 514 and 552 are moved in the three-dimensional environment 550A in accordance with the movement input 574C, the first electronic device 560 optionally forgoes moving the respective user interface element 524, as shown in FIG. 5H.

In some examples, the first electronic device 560 may limit a magnitude of the movement of the avatar 515 and the shared objects 514 and 552 in three-dimensional environment 550A. For example, as shown in FIG. 5H, a magnitude of the movement input 574C optionally corresponds to movement of the avatar 515 rightward in the three-dimensional environment toward the representation of the right side wall from the viewpoint of the user of the first electronic device 560. In some examples, the right side wall in the physical environment surrounding the first electronic device 560 is a physical boundary to movement of the first electronic device 560 within the physical environment. Similarly, in some examples, physical boundaries and/or physical objects (e.g., representations thereof) may function as boundaries to movement of objects within the three-dimensional environment 550A in the multi-user communication session. Accordingly, movement of the avatar 515 and thus the shared objects 514 and 552 into and/or beyond the representation of the right side wall in three-dimensional environment 550A is optionally restricted because display of the avatar 515 and/or the shared objects 514 and 552 could be cut-off at the right side wall. In some examples, the first electronic device 560 may display one or more indicators, such as guard rail elements 545, in three-dimensional environment 550A that indicate that movement of the avatar 515 and the shared virtual objects 514 and 552 beyond the right side wall is prohibited. In some examples, the first electronic device 560 forgoes displaying any indicators and optionally ceases movement of the avatar 515 and the shared virtual objects 514 and 552 at or a predetermined distance (e.g., 0.2, 0.4, 0.5, 0.8, 1, etc. m) from the right side wall in three-dimensional environment 550A. It should be understood that, in some examples, movement of the avatar 515 and the shared virtual objects 514 and 552 is optionally restricted at other locations in the three-dimensional environment (e.g., the far wall and/or the left side wall), including movement of the avatar 515 and the shared virtual objects 514 and 552 within a minimum distance (e.g., 0.1, 0.2, 0.4, 0.5, 0.8, etc. m) from the viewpoint of the user of the first electronic device 560. For example, movement of the avatar 515 and the shared virtual objects 514 and 552 through and/or behind the viewpoint of the user of the first electronic device 560 is optionally prohibited (e.g., to prevent unintentional placement of the avatar 515 and/or the shared virtual objects 514 and 552 out of the field of view of the user of the first electronic device 560).

As described above with reference to FIG. 5E, in some examples, when the first electronic device 560 moves the avatar 515 and the shared virtual objects 514 and 552 in three-dimensional environment 550A in accordance with the movement input 574C, the second electronic device 570 may move the avatar 517 in three-dimensional environment 550B accordingly. In some examples, the second electronic device may forgo moving the avatar 517 in three-dimensional environment 550B based on a magnitude of movement of the avatar 515 in three-dimensional environment 550A at the first electronic device 560 until the second electronic device 570 detects an end of the movement input 574C at the first electronic device 560. For example, as shown in FIG. 5H, at the second electronic device 570, the avatar 517 corresponding to the user of the first electronic device 560 has not moved in three-dimensional environment 550B (e.g., with respect to FIG. 5G) even though the avatar 515 has moved in three-dimensional environment 550A at the first electronic device 560. As discussed below, once the movement input 574C ends and the first electronic device 560 detects a release of the selection input 572C, the second electronic device 570 may move the avatar 517 to a new location in the three-dimensional environment 550B that is based on the location of the avatar 515 in three-dimensional environment 550A.

Figure 5I:
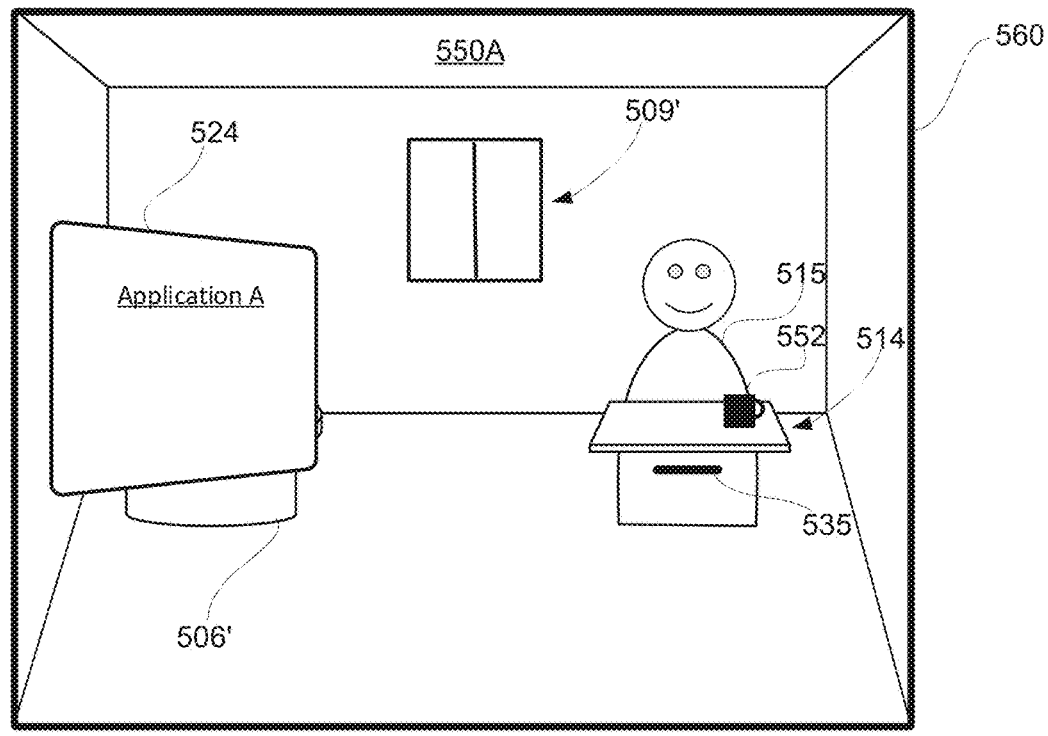
Figure 5I:
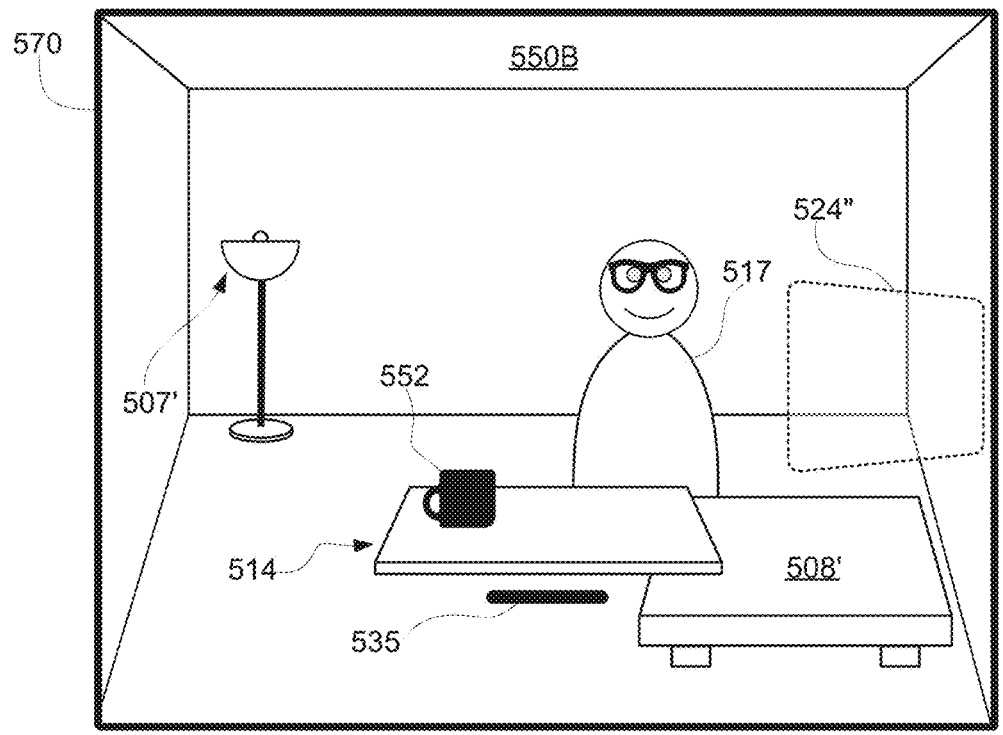

In some examples, in response to detecting an end of the movement input 574C and/or the selection input 572C (e.g., a deselection input, such as release of the pinch gesture of the hand of the user), the first electronic device 560 optionally ceases moving the avatar 515 and the shared virtual objects 514 and 552 in three-dimensional environment 550A. As shown in FIG. 5I, the appearance of the avatar 515 corresponding to the user of the second electronic device is optionally restored, such that the avatar 515 is no longer displayed with the glow/highlight effect 578. In some examples, in response to detecting the end of the movement input 574C and/or the selection input 572C at the first electronic device 560, the second electronic device 570 moves the avatar 517 corresponding to the user of the first electronic device 560 and the representation of the respective user interface element 524" in three-dimensional environment 550B. For example, as shown in FIG. 5I, the second electronic device 570 moves the avatar 517 and the representation of the respective user interface element 524" rightward in three-dimensional environment 550B from the viewpoint of the user of the second electronic device 570 to a location that is based on the location of the avatar 515 in three-dimensional environment 550A. For example, because the user of the first electronic device 560 moved the avatar 515 rightward in the three-dimensional environment 550A (e.g., by a first amount), the avatar 517 corresponding to the user of the first electronic device 560 (e.g., and the respective user interface element 524", which is private to the user of the first electronic device 560) is optionally moved to the right in three-dimensional environment 550B (e.g., by a second amount, based on (e.g., proportional or equal to) the first amount) in accordance with the movement of the avatar 515.

It should be understood that, while forward and lateral movement of the avatars 515/517 and the shared virtual objects 514 and 552 are illustrated and described herein, additional or alternative movements may be provided based on the movement of the hand of the user. For example, the electronic device may move an avatar and shared virtual objects forward and laterally in the three-dimensional environment in accordance with forward and lateral movement of the hand of the user. Additionally, it should be understood that, in some examples, additional or alternative options may be provided for initiating spatial refinement at an electronic device. For example, the user of the electronic device may select a spatial refinement affordance displayed in the three-dimensional environment that allows the user to individually select the objects and/or avatars the user desires to move in the three-dimensional environment. Additionally, in some examples, the electronic device may display a list of options, including an option to initiate spatial refinement, upon selection of an object (e.g., an avatar or a shared object).

As described previously herein, in some examples, the avatars 515/517 may be displayed in the three-dimensional environments 550A/550B with respective orientations that are based on an orientation of each of the first electronic device 560 and the second electronic device 570. For example, referring back to FIG. 5A, prior to receiving any selection and/or movement inputs, the avatar 515 is optionally facing toward the viewpoint of the user of the first electronic device 560 in three-dimensional environment 550A, and the avatar 517 is optionally facing toward the viewpoint of the user of the second electronic device 570 in three-dimensional environment 550B, which align with the center of the fields of view of the three-dimensional environments 550A/550B. As shown in FIG. 5I, after the avatar 515 has moved in three-dimensional environment 550A and the avatar 517 has moved in three-dimensional environment 550B, the orientations of the avatars 515 and 517 are optionally displayed in accordance with the movements of the avatars 515/517. For example, in FIG. 5I, the avatar 515 corresponding to the user of the second electronic device 570 may be facing forward relative to the viewpoint of the user of the first electronic device 560, and the avatar 517 corresponding to the user of the first electronic device 560 may be facing forward relative to the viewpoint of the user of the second electronic device 570, such that the directions of the orientations of the avatars 515/517 are optionally parallel. Thus, when performing spatial refinement at the first electronic device 560 and/or the second electronic device 570, the orientations of the avatars are optionally displayed in accordance with movements of the avatars relative to the viewpoints of the users of the first electronic device 560 and the second electronic device 570.

In some examples, it may be advantageous to alter an orientation of one or more avatars corresponding to users of electronic devices when performing scene refinement in a multi-user communication session. For example, when content shared between a first electronic device and a second electronic device in a multi-communication session is video content, it may be advantageous to provide functionality to enable the a first user to reorient an avatar corresponding to a second user to face toward the shared video content (e.g., to simulate a realistic viewing experience), rather than toward the viewpoint of the first user (e.g., as discussed above). Attention is now directed to example interactions involving spatial refinement of orientations of avatars in a multi-user communication session.

It should be understood that, while the spatial refinements illustrated in FIGS. 5A-5I include translational movements, in some examples, the spatial refinements may include a translation, a rotation, and/or both a translation and a rotation. In some such examples, the rotational movement may be performed relative to any desired reference point, such as a reference point at the viewpoint of the user, a reference point at a location of a shared object in the three-dimensional environment, a reference point at a location of an avatar of a user in the three-dimensional environment, and/or a reference point at a location selected by the user (e.g., based on the gaze of the user and/or in response to receiving a two-handed pinch and rotation gesture).

FIGS. 6A-6D illustrate example interactions involving spatial refinement in a multi-user communication session according to some examples of the disclosure. In some examples, while a first electronic device 660 is in a multi-user communication session with a second electronic device 670, a three-dimensional environment 650A may be presented using electronic device 660 and a three-dimensional environment 650B may be presented using electronic device 670. In some examples, the electronic devices 660/670 optionally correspond to electronic devices 560/570 discussed above and/or electronic devices 460/470 in FIGS. 4A-4I. In some examples, the three-dimensional environments 650A/650B include captured portions of the physical environments in which electronic devices 660/670 are located. For example, the three-dimensional environment 650A optionally includes a table (e.g., a representation of table 606') and a window (e.g., representation of window 609'), and the three-dimensional environment 650B optionally includes a coffee table (e.g., representation of coffee table 608') and a floor lamp (e.g., representation of floor lamp 607'). In some examples, the three-dimensional environments 650A/650B optionally correspond to three-dimensional environments 550A/550B described above and/or three-dimensional environments 450A/450B in FIGS. 4A-4I. As described above, the three-dimensional environments also include avatars 615/617 corresponding to users of the electronic devices 670/660. In some examples, the avatars 615/617 optionally correspond to avatars 515/517 described above and/or avatars 415/417 in FIGS. 4A-4I.

Figure 6A:
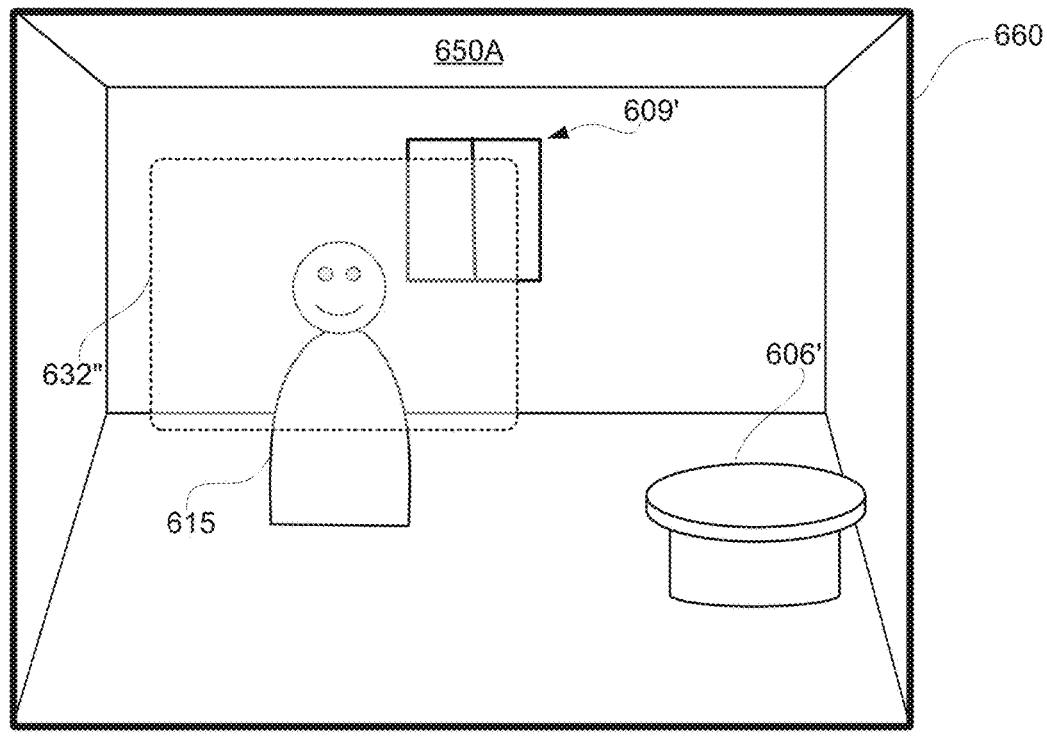
FIGS. 6A-6D illustrate example interactions involving spatial refinement in a multi-user communication session according to some examples of the disclosure.
Figure 6A:
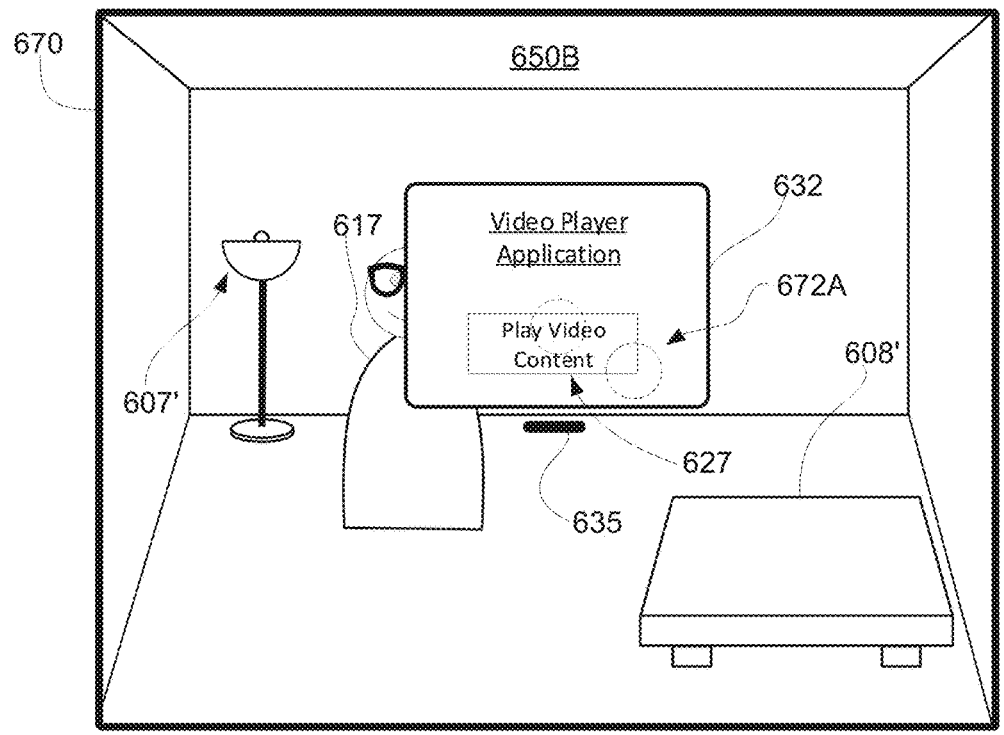

As similarly discussed above, in some examples, the three-dimensional environment 650B may include one or more virtual objects that are not shared with the first electronic device 660 (e.g., private application windows) in the multi-user communication session. As shown in FIG. 6A, the three-dimensional environment 650B may include an unshared application window 632, which is optionally a video player user interface of a video player application running on the second electronic device 670. In some examples, the unshared application window 632 may include a play option 627 in three-dimensional environment 650B that is selectable to cause the video playback application to display video content in three-dimensional environment 650B. As shown in FIG. 6A, in some examples, the unshared application window 632 may be displayed with a grabber or handlebar affordance 635 which is optionally selectable to initiate movement of the unshared application window 632 within the three-dimensional environment 650B. In some examples, because the application window 632 is unshared, the second first device 660 optionally displays a representation of the application window 632" in three-dimensional environment 650A. As described previously herein, in some examples, the representation of the application window 632" may be a faded, occluded, discolored, and/or translucent representation of the application window 632 that prevents the user of the first electronic device 660 from viewing contents of the application window 632.

As shown in FIG. 6A, the user of the second electronic device 670 is optionally providing a selection input 672A directed to the play option 627 in the application window 632 in three-dimensional environment 650B. For example, the user of the second electronic device 670 may provide a pinch gesture, a tap or touch gesture, a verbal command, etc., optionally while the gaze of the user is directed toward the play option 627. In some examples, in response to receiving the selection input 672A, the second electronic device 670 may display video content 625 within three-dimensional environment 650B, as shown in FIG. 6B.

In the multi-user communication session, the user of the second electronic device 670 may share the video content 625 with the user of the first electronic device 660, such that the video content 625 may be displayed in the three-dimensional environment 650A within the application window 632. Before sharing the video content 625, however, it may be advantageous to allow the users of the electronic devices 670/660 to change their orientations within three-dimensional environments 650A/650B in the multi-user communication session to face toward a particular object or content item displayed in the three-dimensional environments 650A/650B. For example, as shown in FIG. 6A, the orientation of the avatar 615 corresponding to the user of the second electronic device 670 in three-dimensional environment 650A is optionally facing forward relative to the viewpoint of the user of the first electronic device 660, and the orientation of the avatar 617 corresponding to the user of the first electronic device 660 in three-dimensional environment 650B is optionally facing forward relative to the viewpoint of the user of the second electronic device 670. It may be desirable for the user of the first electronic device 660 to reorient themself in three-dimensional environment 650A to instead face toward the front side of the representation of the front of application window 632" and be positioned next to the avatar 615 to simulate a more realistic shared viewing experience between the user of the first electronic device 660 and the user of the second electronic device 670 when the video content 625 is shared.

Figure 6B:
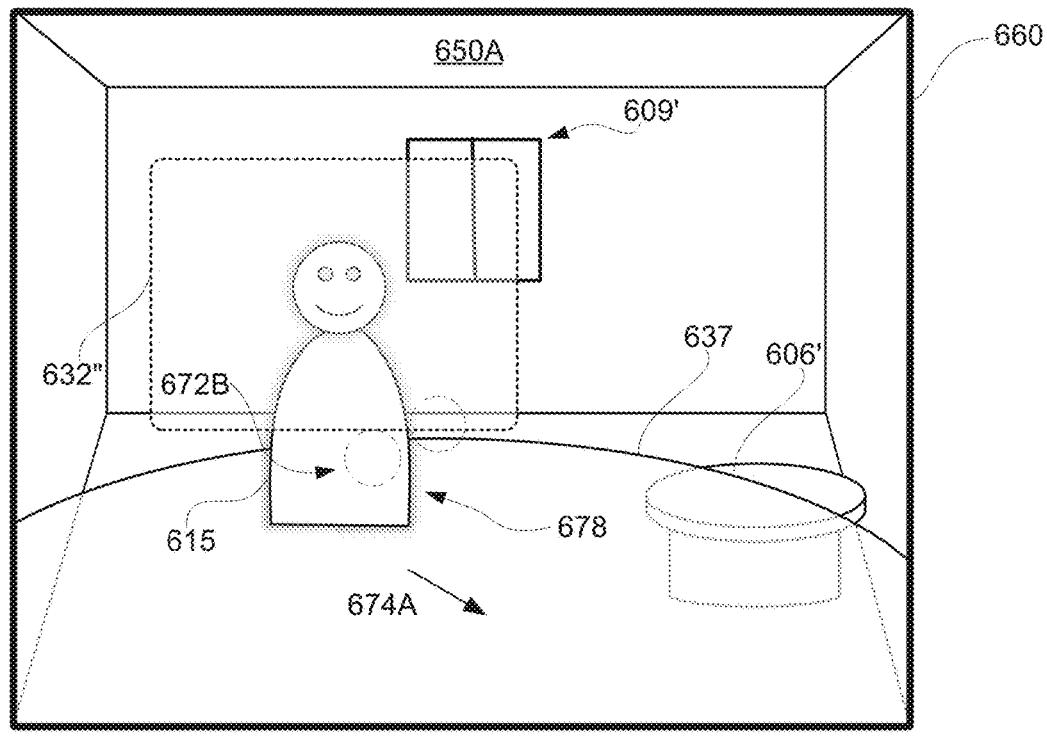
Figure 6B:
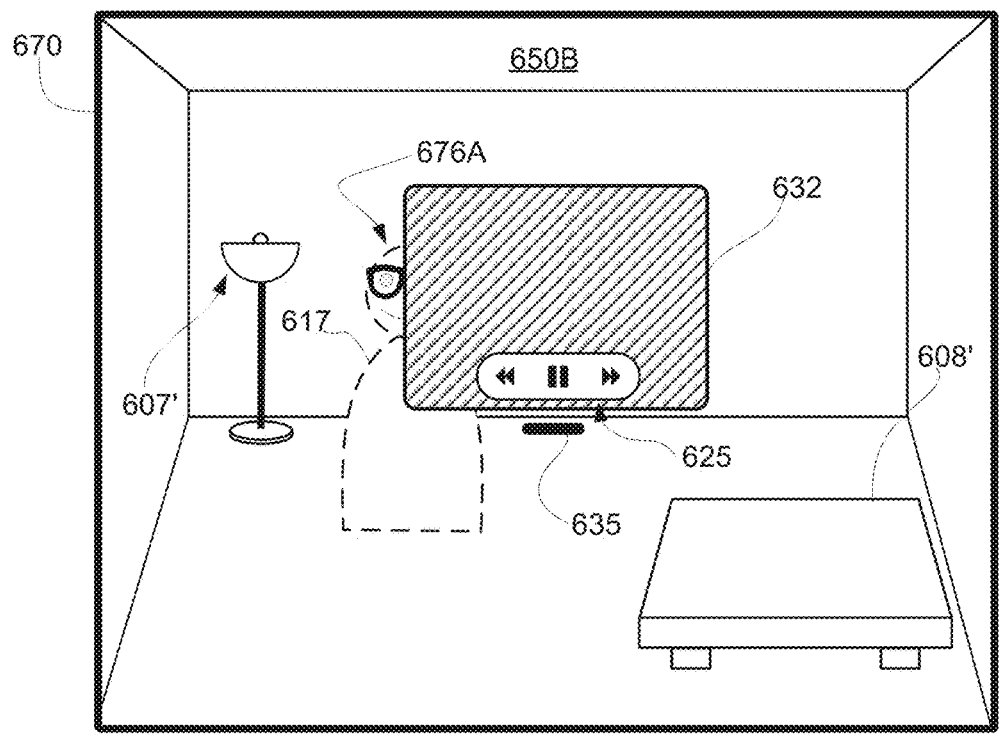

Accordingly, the user of the first electronic device 660 may provide a selection input 672B directed to the avatar 615 in three-dimensional environment 650A, followed by a movement/drag input 674A, as shown in FIG. 6B. For example, the user of the first electronic device 660 may provide a pinch gesture (e.g., using a hand of the user) while the gaze of the user is directed toward the avatar 615, followed by movement of the hand of the user while maintaining the pinch gesture (or other selection input). In some examples, the selection input 672B corresponds to the selection input 572B and/or selection input 572C described above with reference to FIGS. 5D and 5G. As shown in FIG. 6B, the movement input 674A optionally corresponds to movement of the avatar 615 rightward in three-dimensional environment 650A and closer to the viewpoint of the user of the first electronic device 660.

As similarly described above, in some examples, in response to receiving the selection input 672B and/or the movement input 674A, the first electronic device 660 may alter display of the avatar 615 corresponding to the user of the second electronic device 670. For example, as shown in FIG. 6B, the first electronic device 660 optionally displays the avatar 615 with a glow/highlight effect 678 indicating that the avatar 615 can be moved within three-dimensional environment 650A. Additionally, as previously described herein, in some examples, in response to receiving the selection input 672B and/or the movement input 674A, the first electronic device 660 optionally displays the disc 637 below the object(s) selected for spatial refinement in three-dimensional environment 650A. For example, as shown in FIG. 6B, the disc 637 is displayed below the avatar 615 in three-dimensional environment 650A. As shown, because the application window 632 is private to the user of the second electronic device 670 (e.g., and not the first electronic device 660), the representation of the application window 632" is optionally selected for spatial refinement and thus the disc 637 is displayed below the representation of the application window 632" in three-dimensional environment 650A.

In some examples, in response to receiving the selection input 672B and/or the movement input 674A at the first electronic device 660, the second electronic device 670 optionally alters display of the avatar 617 corresponding to the user of the first electronic device 660 in three-dimensional environment 650B. For example, as previously discussed above with reference to FIGS. 5D and 5G, in response to receiving the selection input 672B and/or the movement input 674A at the first electronic device 660, the second electronic device 670 changes an appearance of the avatar 617, such as, as represented by dashed outline 676A in FIG. 6B, fading, occluding, discoloring, or ceasing display of a portion (e.g., hands, arms, shoulders, and/or chest) of the avatar 617. As discussed above, changing the appearance of the avatar 617 in three-dimensional environment 650B at the second electronic device 670 avoids situations in which the input provided by the user of the first electronic device causes the avatar 617 to perform possibly offensive interactions directed toward the user of the second electronic device 670.

Figure 6C:
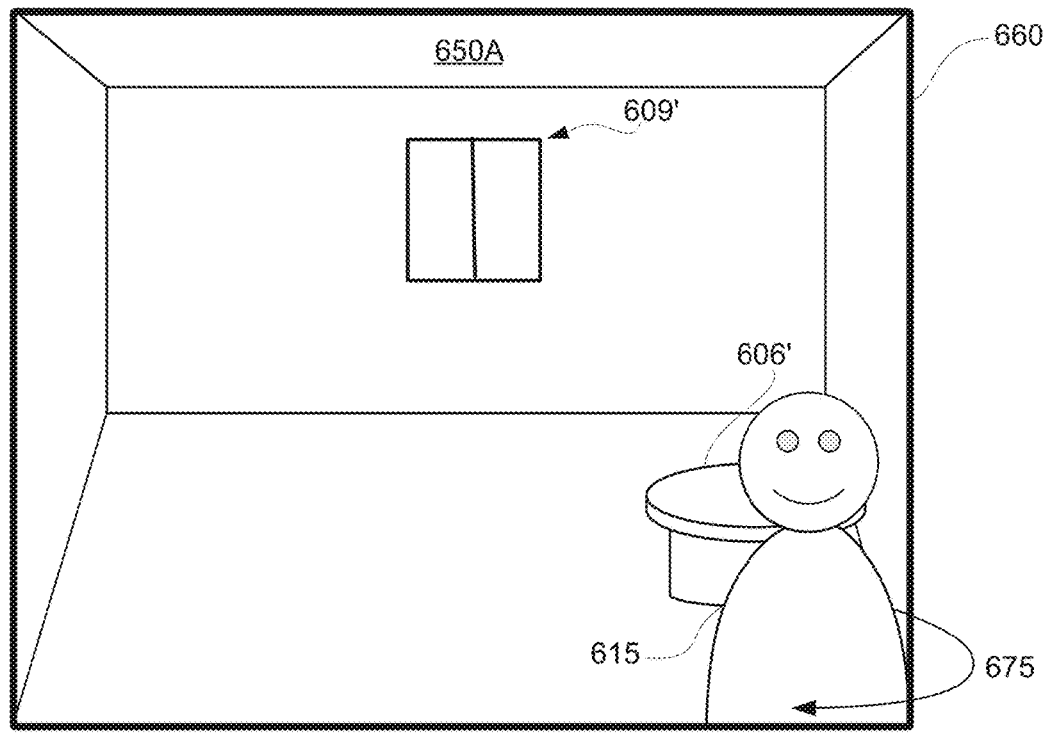
Figure 6C:
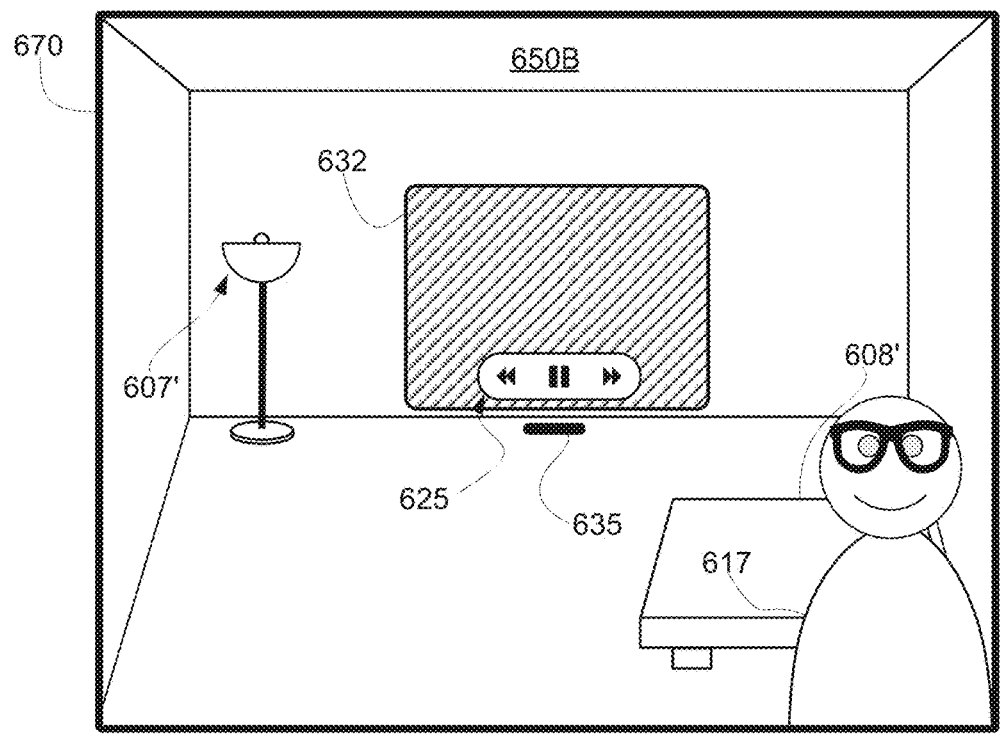

As mentioned above, the movement input 674A is optionally rightward and toward the viewpoint of the user of the first electronic device 660 in three-dimensional environment 650A. For example, as shown in FIG. 6C, in response to the movement of the avatar 615, the first electronic device 660 displays the avatar 615 corresponding to the user of the second electronic device 670 adjacent to the viewpoint of the user of the first electronic device 660 and with an orientation that faces forward past the viewpoint of the user of the first electronic device 660, and displays the representation of the application window 632" out of the field of view of the user of the first electronic device 660. Likewise, because the first electronic device 660 spatially refined the avatar 615 and the representation of the application window 632" in three-dimensional environment 650A, the second electronic device 670 moves the avatar 617 to a new location in three-dimensional environment 650B that is based on the movement of the avatar 615 at the first electronic device 660 (e.g., translates avatar 617 to a location next to the viewpoint of the user of the second electronic device 670). As shown in FIG. 6C, the avatar 617 is also displayed with an orientation that faces forward past the viewpoint of the user of the second electronic device 670.

In some examples, the electronic devices 660/670 may implement an attractive field behavior (e.g., similar in function to a gravity or a magnetic field) for movements of avatars that fall within threshold distances of viewpoints of users and/or to predefined locations within three-dimensional environments in the multi-user communication session. In some examples, the attractive field behavior optionally causes the orientations of the avatars to change, such that the orientations may be directed toward a particular object or direction in the three-dimensional environment. For example, the movement input 674A optionally corresponds to movement of the avatar 615 to within a threshold distance (e.g., 0.2, 0.4, 0.5, 0.8, 1, or 1.2 m) of the viewpoint of the user of the first electronic device 660. Additionally or alternatively, in some examples, the movement input 674A optionally corresponds to movement of the avatar 615 to a predefined location in three-dimensional environment 650A that is adjacent to/beside the viewpoint of the user of first electronic device 660. Thus, as shown in FIG. 6C, in response to detecting movement of the avatar 615 to within the threshold distance of the viewpoint of the user of the first electronic device 660 and/or to the predefined location in three-dimensional environment 650A, the first electronic device 660 implements the attractive field behavior and changes the orientations of the avatar 615 and the representation of the application window 632" (e.g., rotates them by 180 degrees relative to the viewpoint of the user of the second electronic device 670, as represented by arrow 675).

Figure 6D:
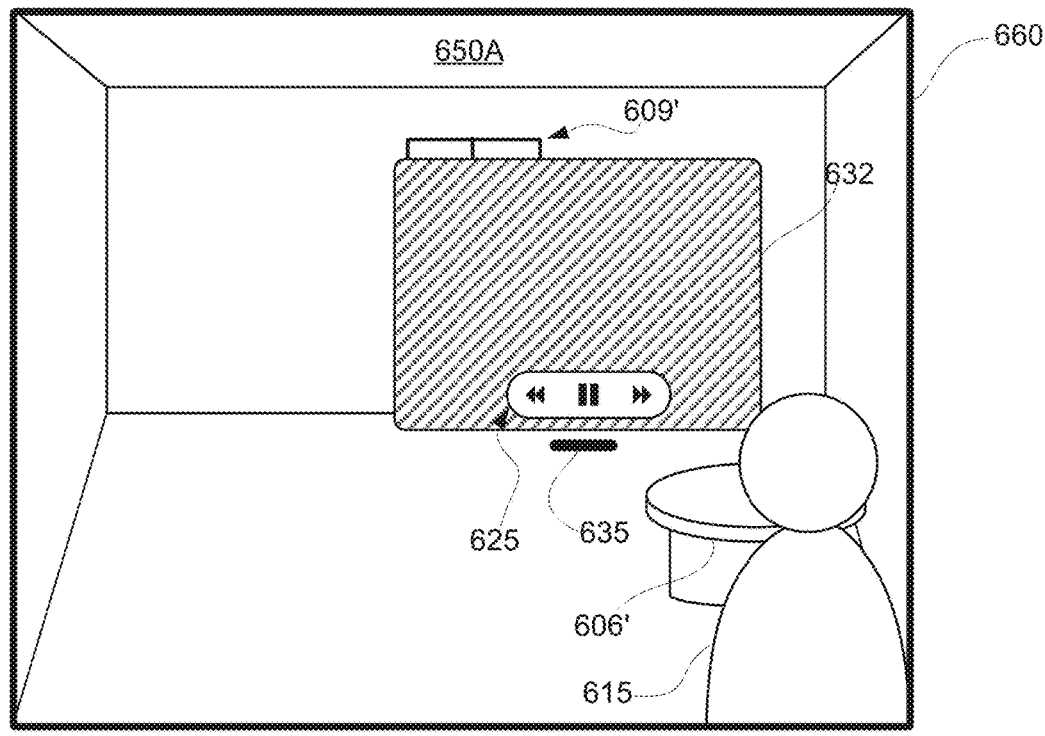
Figure 6D:
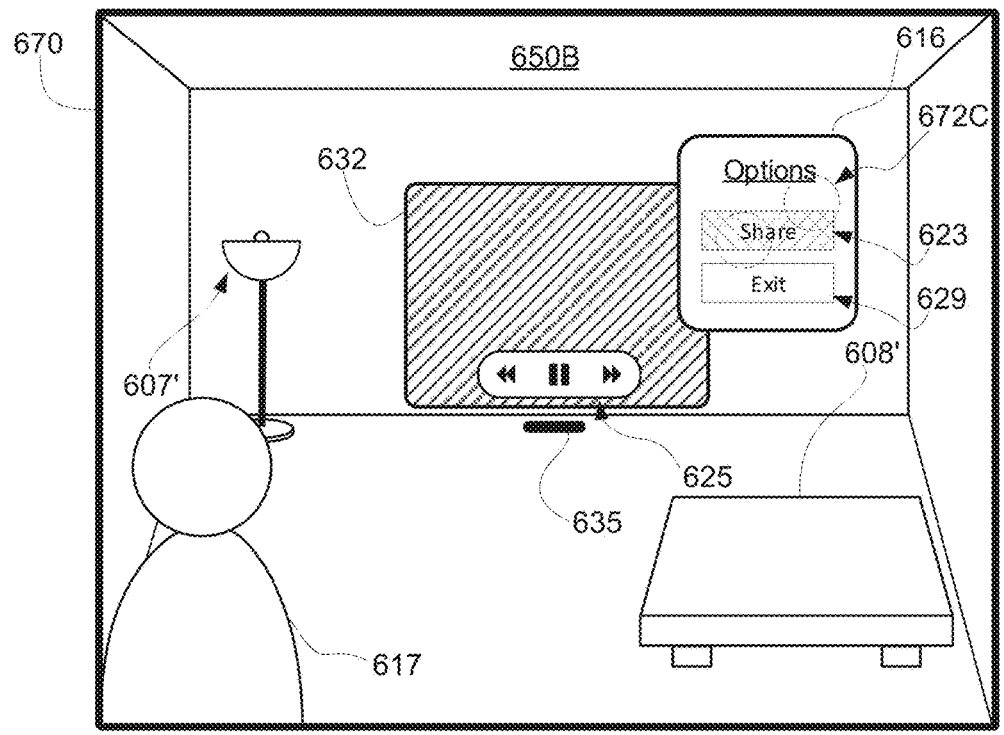

In some examples, as shown in FIG. 6D, after the first electronic device implements the attractive field behavior, the representation of the application window (632") is redisplayed in three-dimensional environment 650A, and the orientations of the avatars 615/617 face forward away from the viewpoints of the users of the first electronic device 660 and the second electronic device 670, respectively. For example, after the avatar 615 is rotated (e.g., by 180 degrees) relative to the viewpoint of the user of the second electronic device 670, the representation of the application window moves with the avatar 615 relative to the viewpoint of the user of the first electronic device 660. Accordingly, in some examples, when the user of the second electronic device 670 optionally shares the video content 625 with the user of the first electronic device 660, such that the video content 625 may be displayed in three-dimensional environment 650A in the multi-user communication session, the orientations of the avatars 615/617 face toward the shared video content 625 in three-dimensional environments 650A/650B. For example, as shown in FIG. 6D, the user of the second electronic device 670 may provide a selection input (e.g., a pinch gesture, tap or touch gesture, a verbal command, etc.) 672C directed to a share option 623 within an options user interface 616 in three-dimensional environment 650B. In some examples, in response to receiving the selection input 672C, the second electronic device 670 may share the video content 625 with the first electronic device 660, such that the video content 625 is displayed in three-dimensional environment 650A at the first electronic device, as shown in FIG. 6D. For example, as shown, the application window 632 displaying the video content 625 optionally replaces display of the representation of the application window 632" in three-dimensional environment 650A at the first electronic device 660.

In some examples, as the avatar 615 is moved closer to the predefined location and/or crosses the threshold distance, the orientation of the avatar may gradually change in accordance with a greater magnitude of movement, until the avatar is reoriented to a user-specified orientation. For example, once the avatar crosses the threshold distance, the orientation of the avatar may gradually change such that the face of the avatar rotates counterclockwise by a respective amount (e.g., 5 or 10 degrees) as the avatar is moved closer toward the viewpoint of the user and/or the predefined location. Thus, as outlined above, by providing an attractive field-like behavior for movement of avatars in a multi-communication session, the avatars can be reoriented to face toward particular objects, rather than toward the viewpoints of the users in the multi-communication session.

It is understood that the examples shown and described herein are merely exemplary and that additional and/or alternative elements may be provided within the three-dimensional environment for interacting with the content and/or the avatars. It should be understood that the appearance, shape, form and size of each of the various user interface elements and objects shown and described herein are exemplary and that alternative appearances, shapes, forms and/or sizes may be provided. For example, the virtual objects representative of application windows (e.g., 524 and 632) may be provided in an alternative shape than a rectangular shape, such as a circular shape, triangular shape, etc. In some examples, the various selectable options (e.g., the options 419A/419B/419C, the option 627, or the option 623) described herein may be selected verbally via user verbal commands (e.g., "select option" verbal command). Additionally or alternatively, in some examples, the various options, user interface elements, control elements, etc. described herein may be selected and/or manipulated via user input received via one or more separate input devices in communication with the electronic device(s). For example, selection input may be received via physical input devices, such as a mouse, trackpad, keyboard, etc. in communication with the electronic device(s).

Additionally, it should be understood that, although the above methods are described with reference to two electronic devices, the above methods optionally apply for two or more electronic devices communicatively linked in a communication session. For example, when launching a multi-user communication session among three, four, five, or more electronic devices, each electronic device may individually scan the environment surrounding the electronic device to generate an occupancy map, identify preferred placement locations within the three-dimensional environment presented at the electronic device based on the occupancy map, identify one or more updated placement locations, if needed (e.g., if the preferred placement location contains an object), and/or display avatars corresponding to the users of the other electronic devices at the determined placement locations in the three-dimensional environment (e.g., as described with reference to FIGS. 4A-4I). In some examples, while three, four, five or more electronic devices are communicatively linked in a multi-user communication session, when a user of one electronic device provides movement input at the electronic device, if the movement input is directed to a shared object in the multi-user communication session, the movement input moves the shared object at the electronic device, and if the movement input is directed to an avatar in the multi-user communication session, the movement input moves the avatars corresponding to the users of the other electronic devices and the shared objects at the electronic device (e.g., as described with reference to FIGS. 5A-5I). In some examples, while three, four, five or more electronic devices are communicatively linked in a multi-user communication session, when a user of one electronic device provides movement input directed to an avatar in the multi-communication session, if the movement input moves the avatar to within a threshold distance of the viewpoint of the user and/or to a predefined location in the three-dimensional environment presented at the electronic device, the orientation of the avatar changes in the three-dimensional environment (e.g., as described with reference to FIGS. 6A-6D).

Figure 7A:
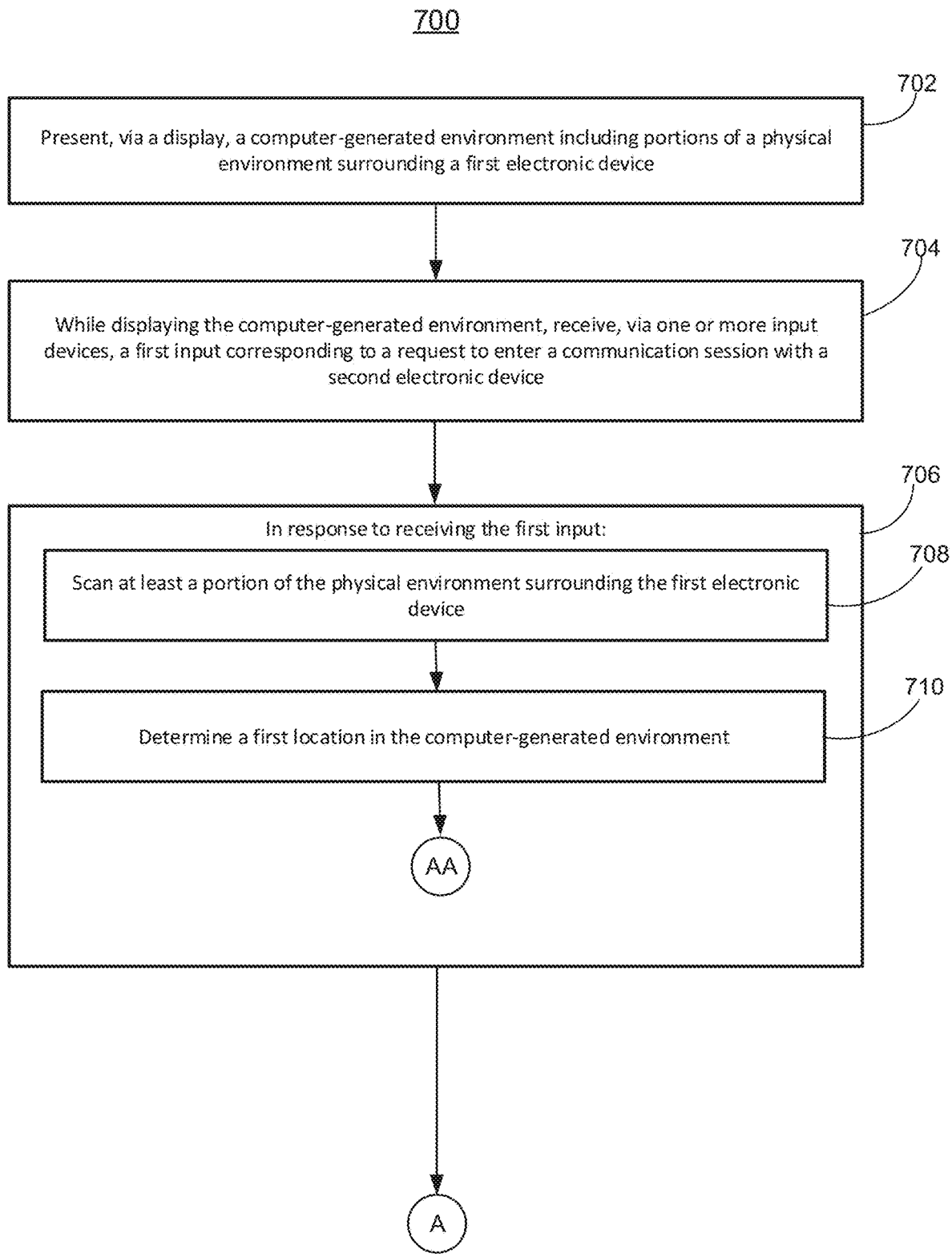
FIGS. 7A-7B illustrate a flow diagram illustrating an example process for spatial placement for an avatar in a multi-user communication session at an electronic device according to some examples of the disclosure.
Figure 7B:
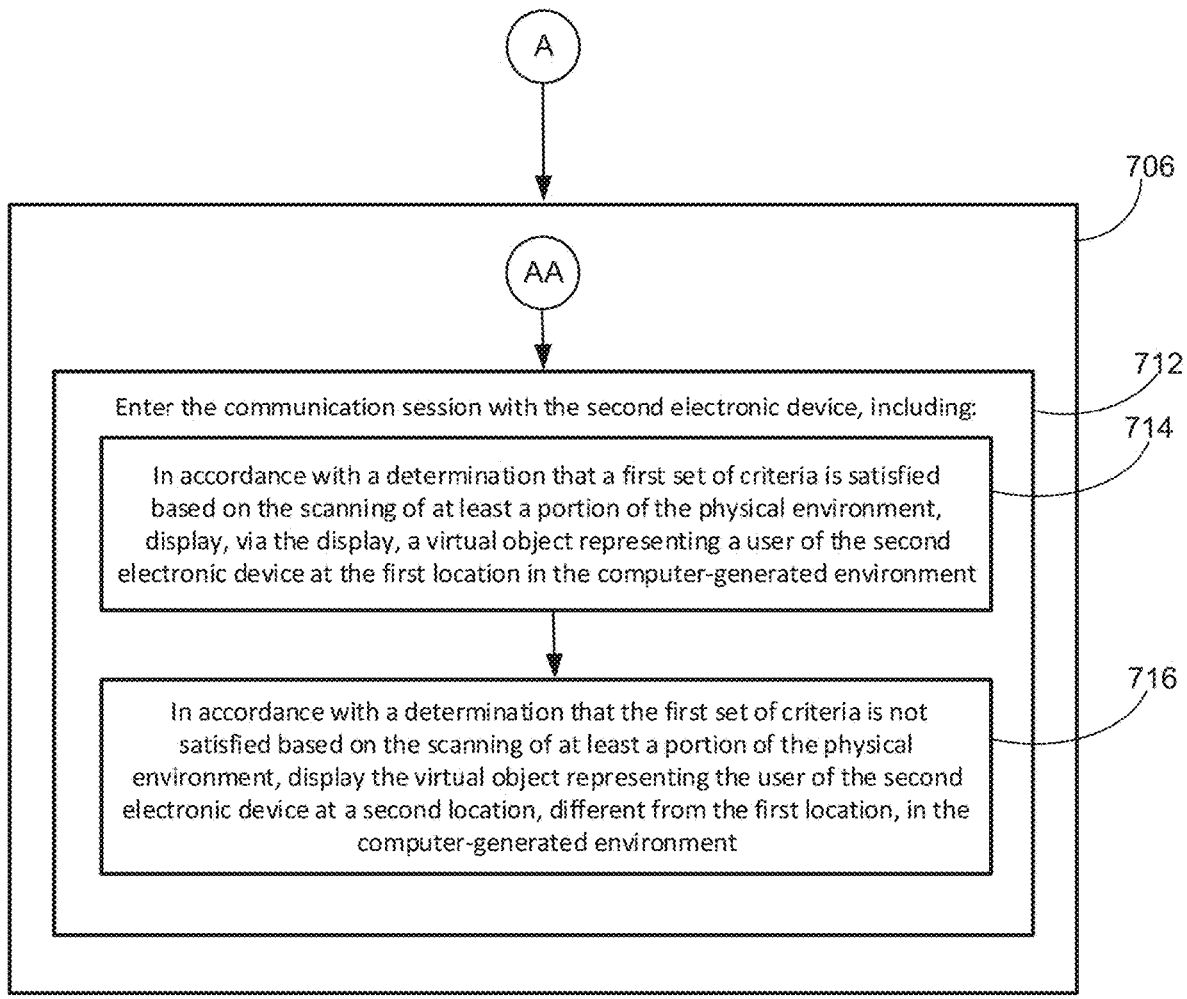

FIGS. 7A-7B illustrate a flow diagram illustrating an example process for spatial placement for an avatar in a multi-user communication session at an electronic device according to some examples of the disclosure. In some examples, process 700 begins at a first electronic device in communication with a display, one or more input devices, and a second electronic device. In some examples, the first electronic device and the second electronic device are optionally a head-mounted display, respectively, similar or corresponding to devices 260/270 of FIG. 2. As shown in FIG. 7A, in some examples, at 702, the first electronic device may present, via the display, a computer-generated environment including captured portions of a physical environment surrounding the first electronic device. For example, as discussed above with reference to FIG. 4A, the first electronic device 460 may display three-dimensional environment 450A including the representation of the table 406' and the representation of the window 409'. In some examples, at 704, while displaying the computer-generated environment, the first electronic device receives, via the one or more input devices, a first input corresponding to a request to enter a communication session with the second electronic device. For example, as discussed previously with reference to FIG. 4A, the first electronic device 460 may receive a selection input 472A corresponding to a request to enter a multi-user communication session with the second electronic device 470.

As shown in FIG. 7A, in some examples, at 706, in response to receiving the first input, at 708, the first electronic device scans the physical environment surrounding the first electronic device. For example, as described above with reference to FIG. 4B, the first electronic device 460 may scan the physical environment in the field of view of a user of the first electronic device 460 to generate an occupancy map that identifies locations of objects and/or open space in the three-dimensional environment 450A presented at the first electronic device 460. In some examples, at 710, the first electronic device determines a first location in the computer-generated environment. For example, as shown in FIG. 4B, the first electronic device 460 may identify (e.g., using the occupancy map) a placement location 425A that is at the center of the field of view of the user of the first electronic device 460 and/or that is a predefined distance 426A from the viewpoint 418A of the user.

As shown in FIG. 7B, in some examples, at 712, the first electronic device may enter the communication session with the second electronic device. In some examples, at 714, in accordance with a determination that a first set of criteria is satisfied, the first electronic device may display, via the display, a virtual object representing a user of the second electronic device at the first location in the computer-generated environment. For example, as shown in FIG. 4C, because the identified placement location 425A does not contain any objects, the first set of criteria is satisfied, and the first electronic device 460 displays the avatar 415 corresponding to the user of the second electronic device 470 at the determined placement location 425A in three-dimensional environment 450A. In some examples, at 716, in accordance with a determination that the first set of criteria is not satisfied, the first electronic device displays the virtual object representing the user of the second electronic device at a second location, different from the first location, in the computer-generated environment. For example, as shown in FIGS. 4E-4F, because the identified placement location 425A contains an object (e.g., a portion of the representation of the table 406'), the first set of criteria is not satisfied, and the first electronic device 460 displays the avatar 415 corresponding to the user of the second electronic device 470 at the updated placement location 425C in three-dimensional environment 450A.

It is understood that process 700 is an example and that more, fewer, or different operations can be performed in the same or in a different order. Additionally, the operations in process 700 described above are, optionally, implemented by running one or more functional modules in an information processing apparatus such as general-purpose processors (e.g., as described with respect to FIG. 2) or application specific chips, and/or by other components of FIG. 2.

Figure 8:
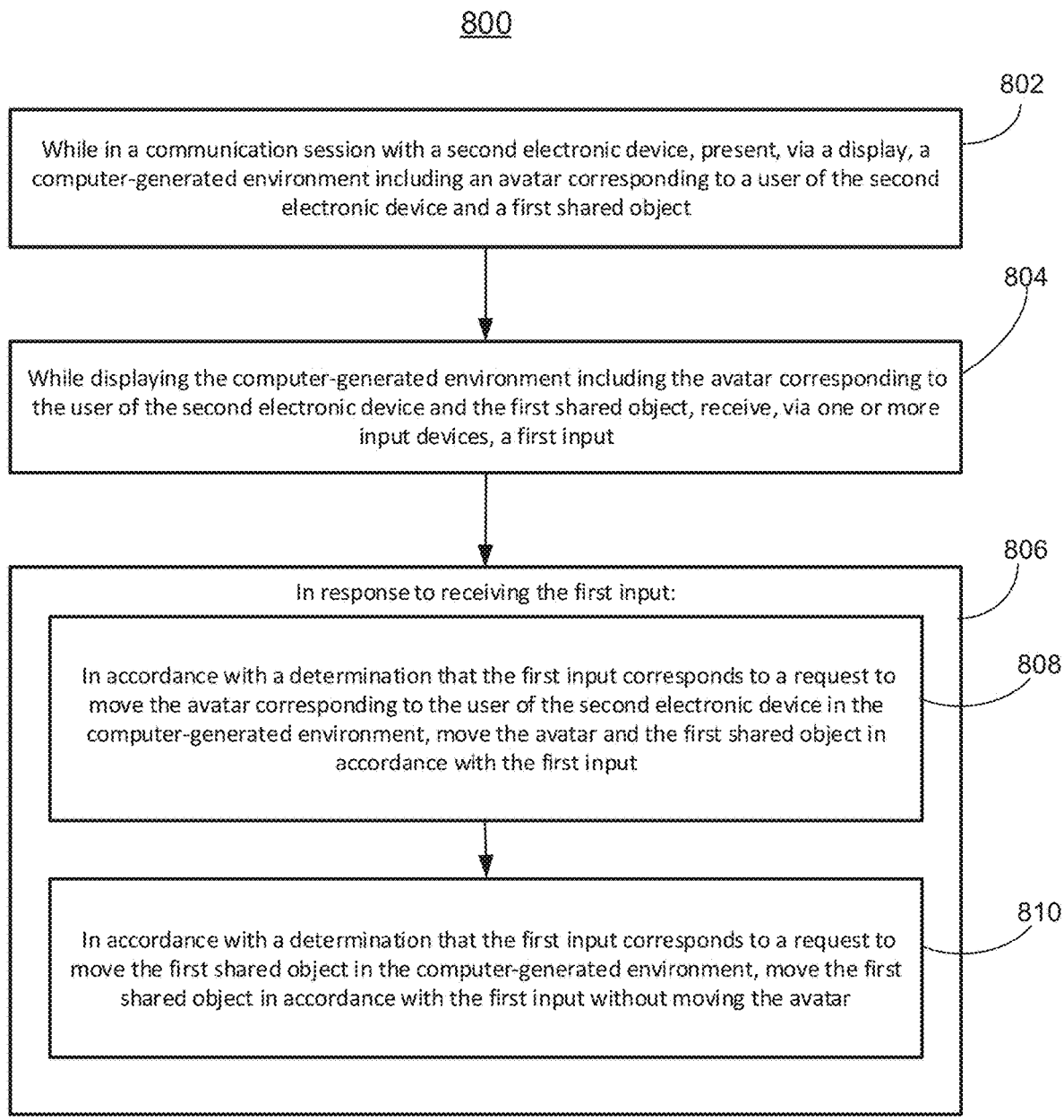
FIG. 8 illustrates a flow diagram illustrating an example process for spatial refinement in a multi-user communication session at an electronic device according to some examples of the disclosure.

FIG. 8 illustrates a flow diagram illustrating an example process for spatial refinement in a multi-user communication session at an electronic device according to some examples of the disclosure. In some examples, process 800 begins at a first electronic device in communication with a display, one or more input devices, and a second electronic device. In some examples, the first electronic device and the second electronic device are optionally a head-mounted display, respectively, similar or corresponding to devices 260/270 of FIG. 2. As shown in FIG. 8, in some examples, at 802, while in a communication session with the second electronic device, the first electronic device presents, via the display, a computer-generated environment including an avatar corresponding to a user of the second electronic device and a first shared object. For example, as shown in FIG. 5A, the first electronic device 560 may present the three-dimensional environment 550A including the avatar 515 corresponding to the user of the second electronic device 570 and a shared virtual tray 514. In some examples, at 804, while displaying the computer-generated environment including the avatar corresponding to the user of the second electronic device and the first shared object, the first electronic device receives, via the one or more input devices, a first input. For example, as shown in FIG. 5B, the first electronic device 560 receives a selection input 572A followed by a movement input 574A.

As shown in FIG. 8, in some examples, at 806, in response to receiving the first input, at 808, in accordance with a determination that the first input corresponds to a request to move the avatar corresponding to the user of the second electronic device in the computer-generated environment, the first electronic device moves the avatar and the first shared object in accordance with the first input. For example, as shown in FIG. 5D, in response to receiving the selection input 572B and the movement input 574B directed to the avatar 515 corresponding to the user of the second electronic device 570, the first electronic device 560 moves the avatar 515 and the shared virtual tray 514 in three-dimensional environment 550A in accordance with the movement input 574B, as shown in FIG. 5E. Additionally, in some examples, representations of private content and/or applications of other users also move in accordance with the movement of the avatar. However, private content and/or applications of the user of the first electronic device (e.g., the device receiving the user input) optionally do not move in accordance with the movement of the avatar. In some examples, if the input received by the first electronic device corresponds to movement of a representation of a private application of another user, the first electronic device optionally moves the avatar, the first shared object, and the representation of the private application in accordance with the movement of the representation of the private application. On the other hand, in some examples, if the input received by the first electronic device corresponds to movement of a private application of the user of the first electronic device, the first electronic device moves the private application without moving the avatar, the first object, and the representations of private applications of other users.

In some examples, at 810, in accordance with a determination that the first input corresponds to a request to move the first shared object in the computer-generated environment, the first electronic device moves the first shared object in accordance with the first input without moving the avatar. For example, as shown in FIG. 5B, in response to receiving the selection input 572A and the movement input 574A directed to the shared virtual tray 514, the first electronic device 560 moves the shared virtual tray 514 in three-dimensional environment 550A in accordance with the movement input 574A without moving the avatar 515, as shown in FIG. 5C. In some examples, the first shared object is moved in the computer-generated environment without moving other shared objects, the avatar, and representations of private applications of other users.

It is understood that process 800 is an example and that more, fewer, or different operations can be performed in the same or in a different order. Additionally, the operations in process 800 described above are, optionally, implemented by running one or more functional modules in an information processing apparatus such as general-purpose processors (e.g., as described with respect to FIG. 2) or application specific chips, and/or by other components of FIG. 2.

Figure 9:
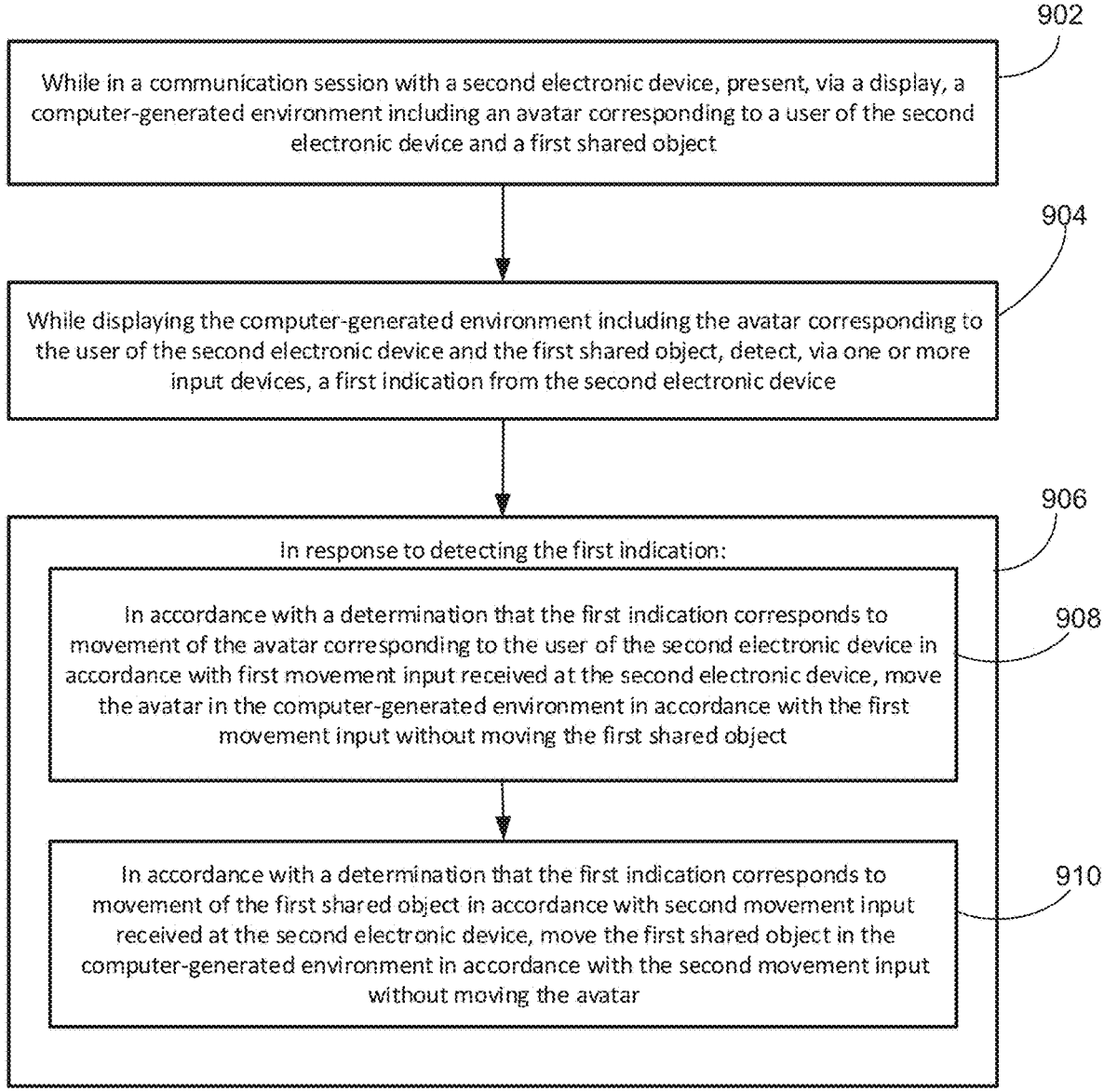
FIG. 9 illustrates a flow diagram illustrating an example process for spatial refinement in a multi-user communication session at an electronic device according to some examples of the disclosure.

FIG. 9 illustrates a flow diagram illustrating an example process for spatial refinement in a multi-user communication at an electronic device according to some examples of the disclosure. In some examples, process 900 begins at a first electronic device in communication with a display, one or more input devices, and a second electronic device. In some examples, the first electronic device and the second electronic device are optionally a head-mounted display, respectively, similar or corresponding to devices 260/270 of FIG. 2. As shown in FIG. 9, in some examples, at 902, while in a communication session with the second electronic device, the first electronic device presents, via the display, a computer-generated environment including an avatar corresponding to a user of the second electronic device and a first shared object. For example, as shown in FIG. 5A, the electronic device 570 may present three-dimensional environment 550B including the avatar 517 corresponding to the user of the electronic device 560 and a shared virtual tray 514.

In some examples, at 904, while displaying the computer-generated environment including the avatar corresponding to the user of the second electronic device and the first shared object, the first electronic device detects, via the one or more input devices, a first indication from the second electronic device. For example, the first electronic device receives an indication from the second electronic device that the second electronic device has received user input, such as selection input 572A and/or movement input 574A in FIG. 5B. In some examples, at 906, in response to detecting the first indication, at 908, in accordance with a determination that the first indication corresponds to movement of the avatar corresponding to the user of the second electronic device in accordance with first movement input received at the second electronic device, the first electronic device moves the avatar in the computer-generated environment in accordance with the first movement input without moving the first shared object. For example, as shown in FIG. 5D, in response to the electronic device 560 receiving the selection input 572B and/or the movement input 574B directed to the avatar 515 corresponding to the user of the electronic device 570, the electronic device 570 moves the avatar 517 corresponding to the user of the electronic device 560 in three-dimensional environment 550B based on the movement input 574B without moving the shared virtual tray 514, as shown in FIG. 5E.

As shown in FIG. 9, in some examples, at 910, in accordance with a determination that the first indication corresponds to movement of the first shared object in accordance with second movement input received at the second electronic device, the first electronic device moves the first shared object in the computer-generated environment in accordance with the second movement input without moving the avatar. For example, as shown in FIG. 5B, in response to the electronic device 560 detecting the selection input 572A and/or the movement input 574A directed to the shared virtual tray 514, the electronic device 570 moves the shared virtual tray 514 in three-dimensional environment 550B based on the movement input 574A without moving the avatar 517, as shown in FIG. 5C.

It is understood that process 900 is an example and that more, fewer, or different operations can be performed in the same or in a different order. Additionally, the operations in process 900 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method comprising, at a first electronic device in communication with a display, one or more input devices, and a second electronic device: presenting, via the display, a computer-generated environment including portions of a physical environment surrounding the first electronic device; while presenting the computer-generated environment, receiving, via the one or more input devices, a first input corresponding to a request to enter a communication session with the second electronic device; and in response to receiving the first input, scanning at least a portion of the physical environment surrounding the first electronic device, determining a first location in the computer-generated environment, and entering the communication session with the second electronic device, including, in accordance with a determination that a first set of criteria is satisfied based on the scanning of at least a portion of the physical environment, displaying, via the display, a virtual object representing a user of the second electronic device at the first location in the computer-generated environment, and in accordance with a determination that the first set of criteria is not satisfied based on the scanning of at least a portion of the physical environment, displaying the virtual object representing the user of the second electronic device at a second location, different from the first location, in the computer-generated environment.

Additionally or alternatively, in some examples, displaying the virtual object representing the user of the second electronic device includes displaying an avatar corresponding to the user of the second electronic device.

Additionally or alternatively, in some examples, the first electronic device and the second electronic device each include a head-mounted display.

Additionally or alternatively, in some examples, determining the first location in the computer-generated environment includes determining a location that toward a center of a field of view of a user of the first electronic device.

Additionally or alternatively, in some examples, the first set of criteria include a criterion that is satisfied when the first location does not include an object, the second location does not include an object, and the second location is within the field of view of the first electronic device.

Additionally or alternatively, in some examples, determining the first location in the computer-generated environment includes determining a location that is at a predetermined distance from a viewpoint the first electronic device.

Additionally or alternatively, in some examples, the first set of criteria include a criterion that is satisfied when the first location does not include an object, the second location does not include an object, and the second location is a respective distance, different from the predetermined distance, from the viewpoint of the first electronic device.

Additionally or alternatively, in some examples, scanning at least a portion of the physical environment surrounding the first electronic device includes identifying one or more physical objects in a field of view of the first electronic device, and the first set of criteria include a criterion that is satisfied when the first location does not include a physical object.

Additionally or alternatively, in some examples, the method further comprises, in response to receiving the first input, identifying one or more virtual objects in the computer-generated environment. Additionally or alternatively, in some examples, the first set of criteria include a criterion that is satisfied when the first location does not include a virtual object.

Additionally or alternatively, in some examples, the method further comprises, in response to receiving the first input, transmitting a request to the second electronic device to enter the communication session with the first electronic device. Additionally or alternatively, in some examples, the second electronic device scans at least a portion of a physical environment surrounding the second electronic device, and the second electronic device determines a third location in the computer-generated environment.

Additionally or alternatively, in some examples, in accordance with the determination that the first set of criteria is satisfied, a virtual object representing a user of the first electronic device is displayed at the third location in the computer-generated environment at the second electronic device, and in accordance with the determination that the first set of criteria is not satisfied, the virtual object representing the user of the first electronic device is displayed at a fourth location, different from the third location, in the computer-generated environment at the second electronic device.

Additionally or alternatively, in some examples, in accordance with the determination that the virtual object representing the user of the second electronic device is displayed at the first location and the virtual object representing the user of the first electronic device is displayed at the third location, the first location is a predefined distance from the third location in the computer-generated environment, and in accordance with the determination that the virtual object representing the user of the second electronic device is displayed at the second location and the virtual object representing the user of the first electronic device is displayed at the fourth location, the second location is the predefined distance from the fourth location in the computer-generated environment.

Additionally or alternatively, in some examples, the first set of criteria include a first criterion that is satisfied when the first location does not include an object and a second criterion that is satisfied when the third location does not contain an object. Additionally or alternatively, in some examples, the method further comprises, in response to receiving the first input, before entering the communication session with the second electronic device: transmitting, to the second electronic device, a first indication that the first criterion is satisfied because the first location does not contain an object, wherein the first location is a predefined distance from the viewpoint of the first electronic device; and in response to receiving, via the one or more input devices, a second indication from the second electronic device that the second criterion is not satisfied because the third location contains an object in the computer-generated environment at the second electronic device, transmitting, to the second electronic device, a third indication that the first criterion is satisfied because the second location does not contain an object, wherein the second location is a first distance, different from the predefined distance, from the viewpoint of the first electronic device.

Additionally or alternatively, in some examples, the method further comprises, in response to receiving, via the one or more input devices, a fourth indication from the second electronic device that the second criterion is satisfied because the fourth location does not contain an object, wherein the fourth location is the first distance from the viewpoint of the second electronic device, entering the communication session with the second electronic device, including displaying the virtual object representing the user of the second electronic device at the second location in the computer-generated environment that is the first distance from the viewpoint of the first electronic device. Additionally or alternatively, in some examples, the virtual object representing the user of the first electronic device is displayed at the fourth location in the computer-generated environment at the second electronic device that is the first distance from the viewpoint of the second electronic device.

Additionally or alternatively, in some examples, the computer-generated environment at the second electronic device includes a first object, and entering the communication session with the second electronic device further includes displaying the virtual object representing the user of the second electronic device with a representation of the first object.

Some examples of the disclosure are directed to a method, comprising, at a first electronic device in communication with a display, one or more input devices, and a second electronic device: while in a communication session with the second electronic device, presenting, via the display, a computer-generated environment including an avatar corresponding to a user of the second electronic device and a first shared object; while displaying the computer-generated environment including the avatar corresponding to the user of the second electronic device and the first shared object, receiving, via the one or more input devices, a first input; and in response to receiving the first input, in accordance with a determination that the first input corresponds to a request to move the avatar corresponding to the user of the second electronic device in the computer-generated environment, moving the avatar and the first shared object in accordance with the first input, and in accordance with a determination that the first input corresponds to a request to move the first shared object in the computer-generated environment, moving the first shared object in accordance with the first input without moving the avatar.

Additionally or alternatively, in some examples, the first electronic device and the second electronic device each include a head-mounted display.

Additionally or alternatively, in some examples, the computer-generated environment further includes a second shared object.

Additionally or alternatively, in some examples, in response to receiving the first input, in accordance with a determination that the first input corresponds to a request to move the second shared object in the computer-generated environment, moving the second shared object in accordance with the first input without moving the avatar and the first shared object.

Additionally or alternatively, in some examples, the method further comprises, in response to receiving the first input, in accordance with the determination that the first input corresponds to the request to move the avatar corresponding to the user of the second electronic device in the computer-generated environment, moving the avatar, the first shared object and the second shared object in accordance with the first input.

Additionally or alternatively, in some examples, the first input includes a pinch gesture provided by a hand of a user of the first electronic device, and movement of the hand of the user while holding the pinch gesture with the hand.

Additionally or alternatively, in some examples, the first input includes a first pinch gesture provided by a first hand and a second pinch gesture provided by a second hand of a user of the first electronic device at least partially concurrently, and movement of the first hand or the second hand of the user while holding the pinch gesture with the first hand or the second hand.

Additionally or alternatively, in some examples, the method further comprises, in response to receiving the first input, in accordance with the determination that the first input corresponds to the request to move the avatar corresponding to the user of the second electronic device in the computer-generated environment: displaying, via the display, a planar element below the avatar and the first shared object in the computer-generated environment; and moving the planar element with the avatar and the first shared object in accordance with the first input.

Additionally or alternatively, in some examples, the method further comprises, in response to receiving the first input, in accordance with the determination that the first input corresponds to the request to move the first shared object in the computer-generated environment, forgoing display of the planar element below the avatar and the first shared object in the computer-generated environment.

Additionally or alternatively, in some examples, the method further comprises: after detecting an end of the first input, receiving, via the one or more input devices, a second input corresponding to a request to move the avatar corresponding to the user of the second electronic device to a respective location in the computer-generated environment; and in response to receiving the second input, in accordance with a determination that the respective location contains an object, restricting movement of the avatar and the first shared object to the respective location in the computer-generated environment, and in accordance with a determination that the respective location does not contain an object, moving the avatar and the first shared object to the respective location in the computer-generated environment.

Additionally or alternatively, in some examples, the avatar corresponding to the user of the second electronic device has a first orientation relative to the first shared object in the computer-generated environment. Additionally or alternatively, in some examples, the method further comprises, in response to receiving the first input, in accordance with the determination that the first input corresponds to the request to move the avatar corresponding to the user of the second electronic device in the computer-generated environment, maintaining display of the avatar with the first orientation while the avatar and the first shared object are moved in accordance with the first input.

Additionally or alternatively, in some examples, before receiving the first input, the computer-generated environment further includes a first unshared object.

Additionally or alternatively, in some examples, the method further comprises, in response to receiving the first input, in accordance with the determination that the first input corresponds to the request to move the avatar corresponding to the user of the second electronic device in the computer-generated environment, moving the avatar and the first shared object in accordance with the first input without moving the first unshared object.

Additionally or alternatively, in some examples, the first shared object includes video content configured to be played in the computer-generated environment.

Additionally or alternatively, in some examples, the avatar corresponding to the user of the second electronic device has a first orientation in the computer-generated environment. Additionally or alternatively, in some examples, the method further comprises: after detecting an end of the first input, receiving, via the one or more input devices, a second input corresponding to a request to move the avatar corresponding to the user of the second electronic device to a respective location in the computer-generated environment; and in response to receiving the second input, in accordance with a determination that the respective location is within a threshold distance and within a threshold angle from a viewpoint of a user of the first electronic device, moving the avatar corresponding to the user of the second electronic device to the respective location in the computer-generated environment, and displaying the avatar corresponding to the user of the second electronic device with a second orientation, different from the first orientation, that faces toward the shared first object.

Some examples of the disclosure are directed to a method, comprising, at a first electronic device in communication with a display, one or more input devices, and a second electronic device: while in a communication session with the second electronic device, presenting, via the display, a computer-generated environment including an avatar corresponding to a user of the second electronic device and a first shared object; while displaying the computer-generated environment including the avatar corresponding to the user of the second electronic device and the first shared object, receiving, via the one or more input devices, a first indication from the second electronic device; and in response to receiving the first indication, in accordance with a determination that the first indication corresponds to movement of the avatar corresponding to the user of the second electronic device in accordance with first movement input received at the second electronic device, moving the avatar in the computer-generated environment in accordance with the first movement input without moving the first shared object, and in accordance with a determination that the first indication corresponds to movement of the first shared object in accordance with second movement input received at the second electronic device, moving the first shared object in the computer-generated environment in accordance with the second movement input without moving the avatar.

Additionally or alternatively, in some examples, the first electronic device and the second electronic device each include a head-mounted display.

Additionally or alternatively, in some examples, before receiving the first indication, the computer-generated environment includes a representation of a first unshared object.

Additionally or alternatively, in some examples, the method further comprises, in response to receiving the first indication, in accordance with the determination that the first indication corresponds to movement of the avatar corresponding to the user of the second electronic device in accordance with the first movement input received at the second electronic device, moving the avatar and the representation of the first unshared object in the computer-generated environment in accordance with the first movement input without moving the first shared object.

Some examples of the disclosure are directed to an electronic device, comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods of claims.

Some examples of the disclosure are directed to an electronic device, comprising: one or more processors; memory; and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described in order to best explain the principles of the invention and its practical applications, to thereby enable others skilled in the art to best use the invention and various described examples with various modifications as are suited to the particular use contemplated.

What is claimed is:

1. A method comprising:
at a first electronic device in communication with a display, one or more input devices, and a second electronic device:
presenting, via the display, a three-dimensional environment including portions of a physical environment surrounding the first electronic device;
while presenting the three-dimensional environment, receiving, via the one or more input devices, a first input corresponding to a request to enter a communication session with the second electronic device; and
in response to receiving the first input:
scanning at least a portion of the physical environment surrounding the first electronic device;
determining a first location in the three-dimensional environment that is at a predetermined distance from a viewpoint of the first electronic device; and
entering the communication session with the second electronic device, including:
in accordance with a determination that a first set of criteria is satisfied, including a criterion that is satisfied when the first location does not include an object based on the scanning of at least a portion of the physical environment, displaying, via the display, a virtual object representing a user of the second electronic device at the first location in the three-dimensional environment; and
in accordance with a determination that the first set of criteria is not satisfied, displaying the virtual object representing the user of the second electronic device at a second location, different from the first location, that is the predetermined distance from the viewpoint of the first electronic device in the three-dimensional environment.

2. The method of claim 1, wherein:
scanning at least a portion of the physical environment surrounding the first electronic device includes identifying one or more physical objects in a field of view of the first electronic device; and
the first set of criteria include a criterion that is satisfied when the first location does not include a physical object.

3. The method of claim 1, further comprising:
in response to receiving the first input:
identifying one or more virtual objects in the three-dimensional environment;
wherein the first set of criteria further include a second criterion that is satisfied when the first location does not include a virtual object based on the identifying one or more virtual objects in the three-dimensional environment.

4. The method of claim 1, further comprising:
in response to receiving the first input:
transmitting a request to the second electronic device to enter the communication session with the first electronic device, wherein:
the second electronic device scans at least a portion of a second physical environment surrounding the second electronic device;
the second electronic device determines a third location in a second three-dimensional environment presented at the second electronic device;
in accordance with the determination that the first set of criteria is satisfied, a virtual object representing a user of the first electronic device is displayed at the third location in the second three-dimensional environment at the second electronic device; and
in accordance with the determination that the first set of criteria is not satisfied, the virtual object representing the user of the first electronic device is displayed at a fourth location, different from the third location, in the second three-dimensional environment at the second electronic device.

5. The method of claim 4, wherein:
in accordance with the determination that the virtual object representing the user of the second electronic device is displayed at the first location in the three-dimensional environment and the virtual object representing the user of the first electronic device is displayed at the third location in the second three-dimensional environment, the first location is a predefined distance from a viewpoint of the first electronic device in the three-dimensional environment and the third location is the predefined distance from a viewpoint of the second electronic device in the second three-dimensional environment; and
in accordance with the determination that the virtual object representing the user of the second electronic device is displayed at the second location in the three-dimensional environment and the virtual object representing the user of the first electronic device is displayed at the fourth location in the second three-dimensional environment, the second location is the predefined distance from the viewpoint of the first electronic device in the three-dimensional environment and the fourth location is the predefined distance from the viewpoint of the second electronic device in the second three-dimensional environment.

6. The method of claim 5, wherein the first set of criteria include a second criterion that is satisfied when the third location does not contain an object in the second three-dimensional environment, the method further comprising:
in response to receiving the first input:
before entering the communication session with the second electronic device:
transmitting, to the second electronic device, a first indication that the first criterion is satisfied because the first location does not contain an object in the physical environment, wherein the first location is a predefined distance from the viewpoint of the first electronic device; and
in response to receiving, via the one or more input devices, a second indication from the second electronic device that the second criterion is not satisfied because the third location contains an object second in the three-dimensional environment at the second electronic device, transmitting, to the second electronic device, a third indication that the criterion is satisfied because the second location does not contain an object in the physical environment, wherein the second location is a first distance, different from the predefined distance, from the viewpoint of the first electronic device.

7. The method of claim 6, further comprising:
in response to receiving, via the one or more input devices, a fourth indication from the second electronic device that the second criterion is satisfied because the fourth location does not contain an object in the second three-dimensional environment, wherein the fourth location is the first distance from the viewpoint of the second electronic device:
entering the communication session with the second electronic device, including:
displaying the virtual object representing the user of the second electronic device at the second location in the three-dimensional environment that is the first distance from the viewpoint of the first electronic device;
wherein the virtual object representing the user of the first electronic device is displayed at the fourth location in the second three-dimensional environment at the second electronic device that is the first distance from the viewpoint of the second electronic device.

8. The method of claim 1, wherein determining the first location in the three-dimensional environment includes determining a location that is toward a center of a field of view of a user of the first electronic device.

9. A first electronic device comprising:
one or more processors;
memory; and
one or more programs stored in the memory and configured to be executed by the one or more processors, the one or more programs including instructions for performing a method comprising:
presenting, via a display, a three-dimensional environment including portions of a physical environment surrounding the first electronic device;
while presenting the three-dimensional environment, receiving, via one or more input devices, a first input corresponding to a request to enter a communication session with a second electronic device; and
in response to receiving the first input:
scanning at least a portion of the physical environment surrounding the first electronic device;
determining a first location in the three-dimensional environment that is at a predetermined distance from a viewpoint of the first electronic device; and
entering the communication session with the second electronic device, including:
in accordance with a determination that a first set of criteria is satisfied, including a criterion that is satisfied when the first location does not include an object based on the scanning of at least a portion of the physical environment, displaying, via the display, a virtual object representing a user of the second electronic device at the first location in the three-dimensional environment; and in accordance with a determination that the first set of criteria is not satisfied, displaying the virtual object representing the user of the second electronic device at a second location, different from the first location, that is the predetermined distance from the viewpoint of the first electronic device in the three-dimensional environment.

10. The first electronic device of claim 9, wherein:
scanning at least a portion of the physical environment surrounding the first electronic device includes identifying one or more physical objects in a field of view of the first electronic device; and
the first set of criteria include a criterion that is satisfied when the first location does not include a physical object.

11. The first electronic device of claim 9, wherein the method further comprises:
in response to receiving the first input:
identifying one or more virtual objects in the three-dimensional environment;
wherein the first set of criteria further include a second criterion that is satisfied when the first location does not include a virtual object based on the identifying one or more virtual objects in the three-dimensional environment.

12. The first electronic device of claim 9, wherein the method further comprises:
in response to receiving the first input:
transmitting a request to the second electronic device to enter the communication session with the first electronic device, wherein:
the second electronic device scans at least a portion of a second physical environment surrounding the second electronic device;
the second electronic device determines a third location in a second three-dimensional environment presented at the second electronic device;
in accordance with the determination that the first set of criteria is satisfied, a virtual object representing a user of the first electronic device is displayed at the third location in the second three-dimensional environment at the second electronic device; and
in accordance with the determination that the first set of criteria is not satisfied, the virtual object representing the user of the first electronic device is displayed at a fourth location, different from the third location, in the second three-dimensional environment at the second electronic device.

13. The first electronic device of claim 12, wherein:
in accordance with the determination that the virtual object representing the user of the second electronic device is displayed at the first location in the three-dimensional environment and the virtual object representing the user of the first electronic device is displayed at the third location in the second three-dimensional environment, the first location is a predefined distance from a viewpoint of the first electronic device in the three-dimensional environment and the third location is the predefined distance from a viewpoint of the second electronic device in the second three-dimensional environment; and
in accordance with the determination that the virtual object representing the user of the second electronic device is displayed at the second location in the three-dimensional environment and the virtual object representing the user of the first electronic device is displayed at the fourth location in the second three-dimensional environment, the second location is the predefined distance from the viewpoint of the first electronic device in the three-dimensional environment and the fourth location is the predefined distance from the viewpoint of the second electronic device in the second three-dimensional environment.

14. The first electronic device of claim 13, wherein the first set of criteria include a second criterion that is satisfied when the third location does not contain an object in the second three-dimensional environment, the method further comprising:
in response to receiving the first input:
before entering the communication session with the second electronic device:
transmitting, to the second electronic device, a first indication that the criterion is satisfied because the first location does not contain an object in the physical environment, wherein the first location is a predefined distance from the viewpoint of the first electronic device; and
in response to receiving, via the one or more input devices, a second indication from the second electronic device that the second criterion is not satisfied because the third location contains an object in the second three-dimensional environment at the second electronic device, transmitting, to the second electronic device, a third indication that the criterion is satisfied because the second location does not contain an object in the physical environment, wherein the second location is a first distance, different from the predefined distance, from the viewpoint of the first electronic device.

15. The first electronic device of claim 14, wherein the method further comprises:
in response to receiving, via the one or more input devices, a fourth indication from the second electronic device that the second criterion is satisfied because the fourth location does not contain an object in the second three-dimensional environment, wherein the fourth location is the first distance from the viewpoint of the second electronic device:
entering the communication session with the second electronic device, including:
displaying the virtual object representing the user of the second electronic device at the second location in the three-dimensional environment that is the first distance from the viewpoint of the first electronic device;
wherein the virtual object representing the user of the first electronic device is displayed at the fourth location in the second three-dimensional environment at the second electronic device that is the first distance from the viewpoint of the second electronic device.

16. The first electronic device of claim 9, wherein determining the first location in the three-dimensional environment includes determining a location that is toward a center of a field of view of a user of the first electronic device.

17. A non-transitory computer readable storage medium storing one or more programs, the one or more programs comprising instructions, which when executed by one or more processors of a first electronic device, cause the first electronic device to perform a method comprising:

presenting, via a display, a three-dimensional environment including portions of a physical environment surrounding the first electronic device;

while presenting the three-dimensional environment, receiving, via one or more input devices, a first input corresponding to a request to enter a communication session with a second electronic device; and in response to receiving the first input:
- scanning at least a portion of the physical environment surrounding the first electronic device;
- determining a first location in the three-dimensional environment that is at a predetermined distance from a viewpoint of the first electronic device; and
- entering the communication session with the second electronic device, including:
  - in accordance with a determination that a first set of criteria is satisfied based on the scanning of at least a portion of the physical environment, including a criterion that is satisfied when the first location does not include an object, displaying, via the display, a virtual object representing a user of the second electronic device at the first location in the three-dimensional environment; and
  - in accordance with a determination that the first set of criteria is not satisfied, displaying the virtual object representing the user of the second electronic device at a second location, different from the first location, that is the predetermined distance from the viewpoint of the first electronic device in the three-dimensional environment.

18. The non-transitory computer readable storage medium of claim 17, wherein:
- scanning at least a portion of the physical environment surrounding the first electronic device includes identifying one or more physical objects in a field of view of the first electronic device; and
- the first set of criteria include a criterion that is satisfied when the first location does not include a physical object.

19. The non-transitory computer readable storage medium of claim 17, wherein the method further comprises:
- in response to receiving the first input:
  - identifying one or more virtual objects in the three-dimensional environment;
- wherein the first set of criteria further include a second criterion that is satisfied when the first location does not include a virtual object based on the identifying one or more virtual objects in the three-dimensional environment.

20. The non-transitory computer readable storage medium of claim 17, wherein determining the first location in the three-dimensional environment includes determining a location that is toward a center of a field of view of a user of the first electronic device.

* * * * *